US009148627B2

(12) United States Patent
Anderson et al.

(10) Patent No.: US 9,148,627 B2
(45) Date of Patent: Sep. 29, 2015

(54) SYSTEM AND METHOD FOR INTERACTIVE INTERNET VIDEO CONFERENCING

(71) Applicants: Eric C. Anderson, Gardnerville, NV (US); Michael Noriega, Sacramento, CA (US)

(72) Inventors: Eric C. Anderson, Gardnerville, NV (US); Michael Noriega, Sacramento, CA (US)

(73) Assignee: VIDEOCONNECT, LLC, Peterborough, NH (US)

( * ) Notice: Subject to any disclaimer, the term of this patent is extended or adjusted under 35 U.S.C. 154(b) by 0 days.

(21) Appl. No.: 14/138,951

(22) Filed: Dec. 23, 2013

(65) Prior Publication Data

US 2014/0111597 A1 Apr. 24, 2014

Related U.S. Application Data

(63) Continuation of application No. 13/008,001, filed on Jan. 17, 2011, now abandoned.

(51) Int. Cl.
*H04N 7/15* (2006.01)
*H04L 29/06* (2006.01)
*G06F 3/0481* (2013.01)
*H04L 12/18* (2006.01)

(52) U.S. Cl.
CPC ............ *H04N 7/157* (2013.01); *G06F 3/04817* (2013.01); *H04L 12/1827* (2013.01); *H04L 65/1073* (2013.01); *H04L 65/4038* (2013.01); *H04L 65/4046* (2013.01); *H04N 7/15* (2013.01); *H04L 12/1822* (2013.01)

(58) Field of Classification Search
CPC ............ H04L 12/1827; H04L 65/4038; H04L 65/4046; H04L 65/1073; H04L 12/1822; H04N 7/15; H04N 7/157; G06F 3/04817
USPC .......................... 348/14.01–14.16; 709/204; 370/260–261; 715/753
See application file for complete search history.

(56) References Cited

U.S. PATENT DOCUMENTS

2006/0164507 A1* 7/2006 Eshkoli et al. ............. 348/14.09
2011/0069643 A1* 3/2011 Yoakum et al. ............. 370/261
2011/0276629 A1* 11/2011 Canning et al. ............. 709/204

* cited by examiner

*Primary Examiner* — Melur Ramakrishnaiah
(74) *Attorney, Agent, or Firm* — Harness, Dickey & Pierce, P.L.C.

(57) ABSTRACT

A system and method for Internet video conferencing is provided. The method includes, generating a facilitator user interface on a display associated with a facilitator user device comprising a plurality of participant icons corresponding to a plurality of participant user devices for a conference, forming a plurality of subgroups comprising a first subgroup of the plurality of participant user devices and a second subgroup of the plurality of participant user devices, generating a participant user interface on each screen display associated with the first subgroup and the second subgroup for controlling interaction with a respective subgroup, linking each participant user device within the first subgroup with a second video signal, linking each participant user device in the second subgroup with a second video signal and intercommunicating between the first subgroup at the participant user devices without intercommunicating to the second subgroup.

20 Claims, 36 Drawing Sheets

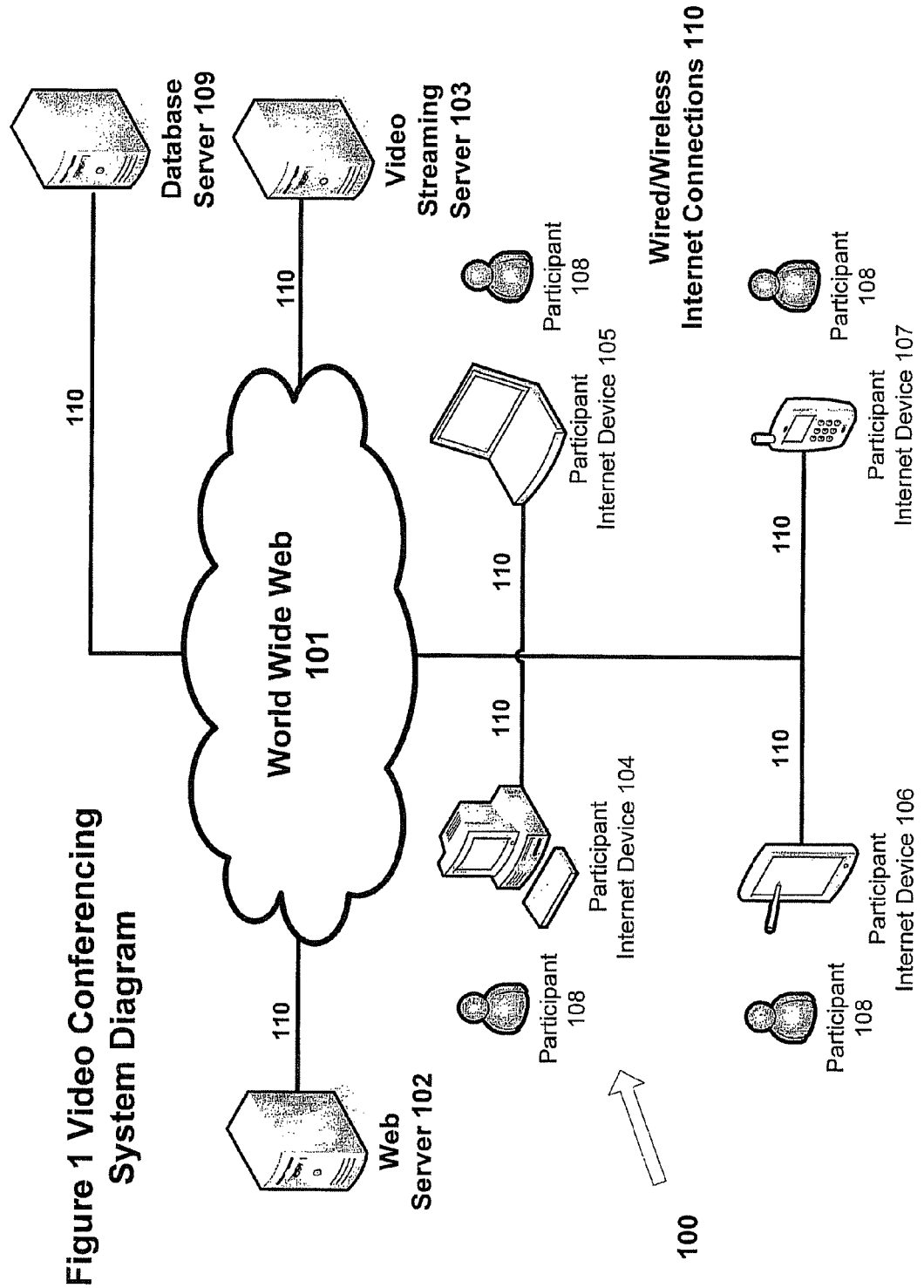

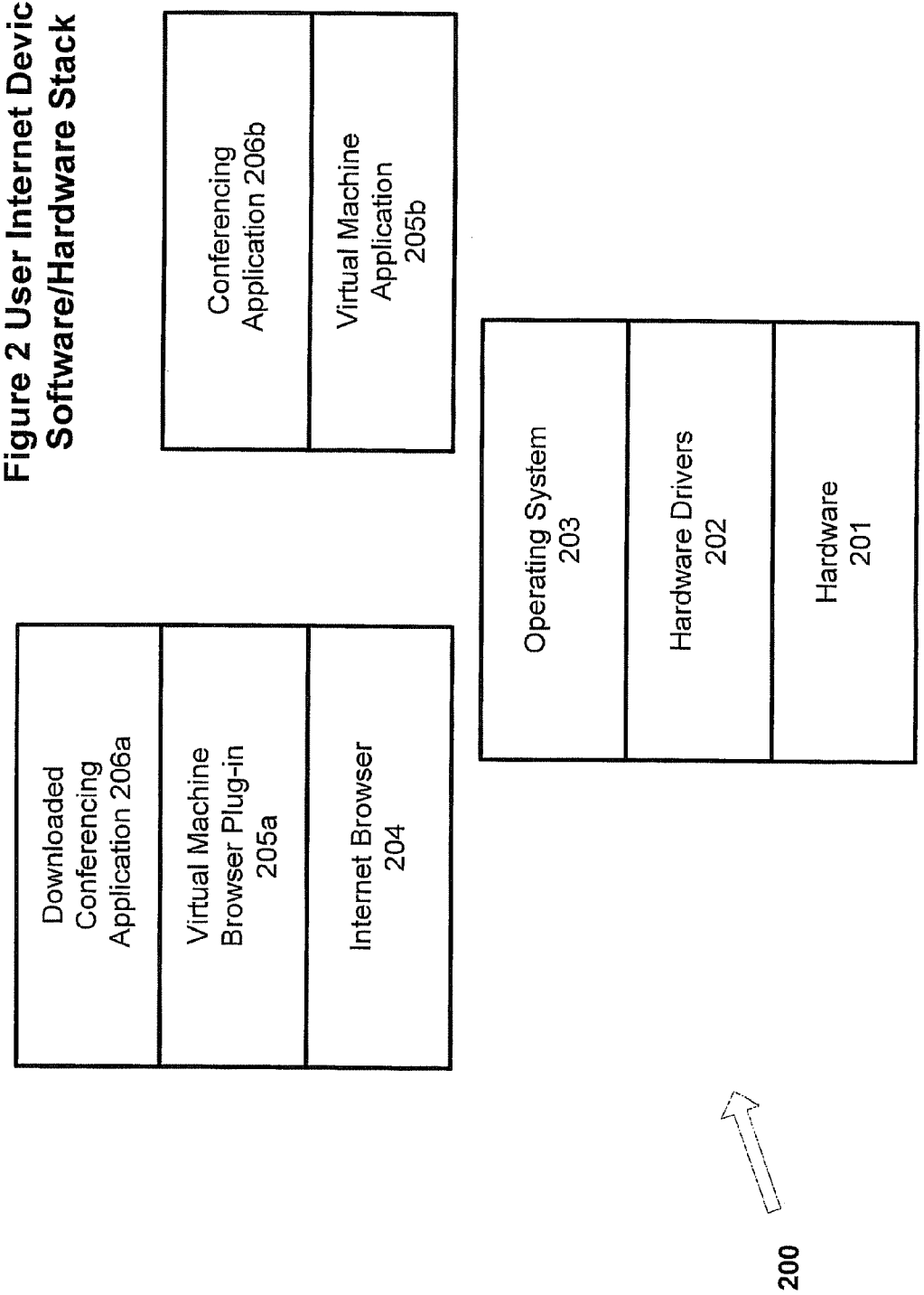

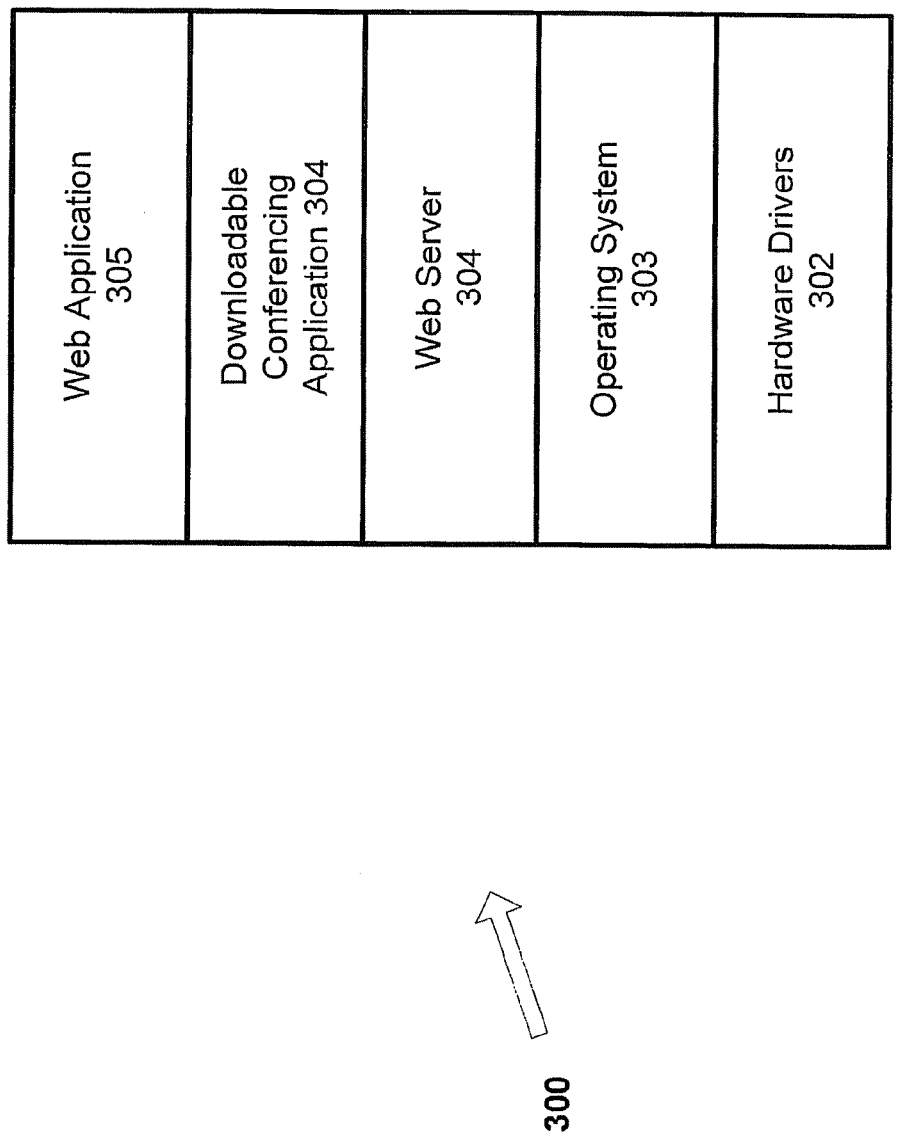
Figure 3 Web Server Software Stack

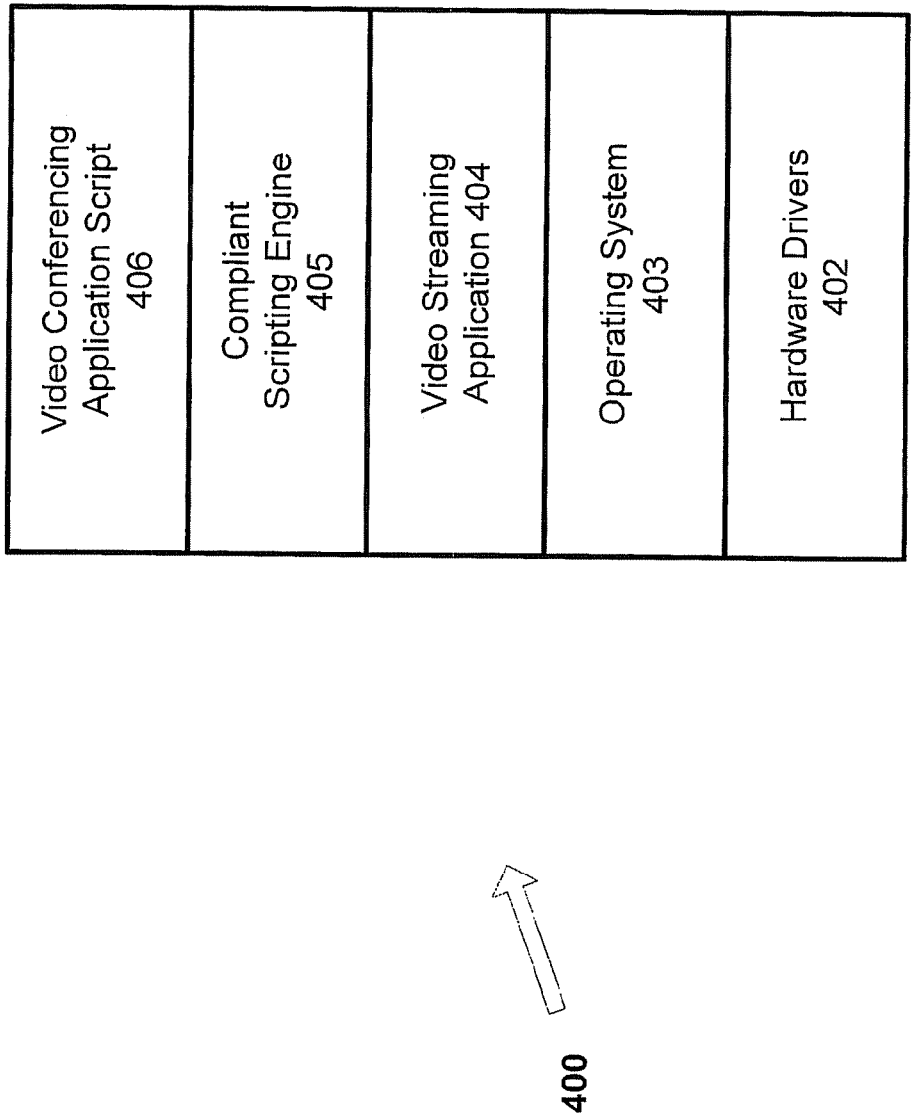
Figure 4 Streaming Video Server Software

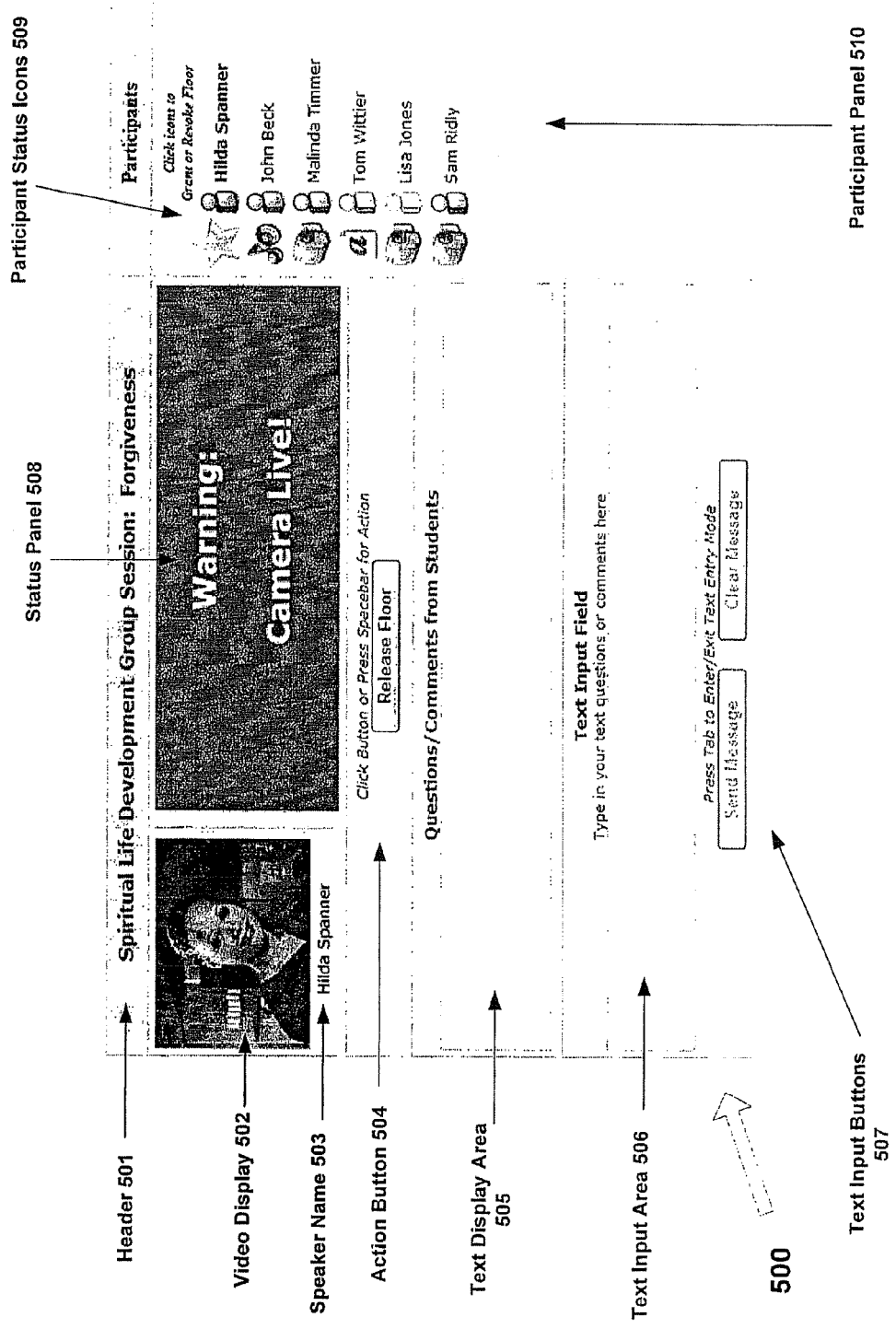
Figure 5: Facilitator Interface (speaking)

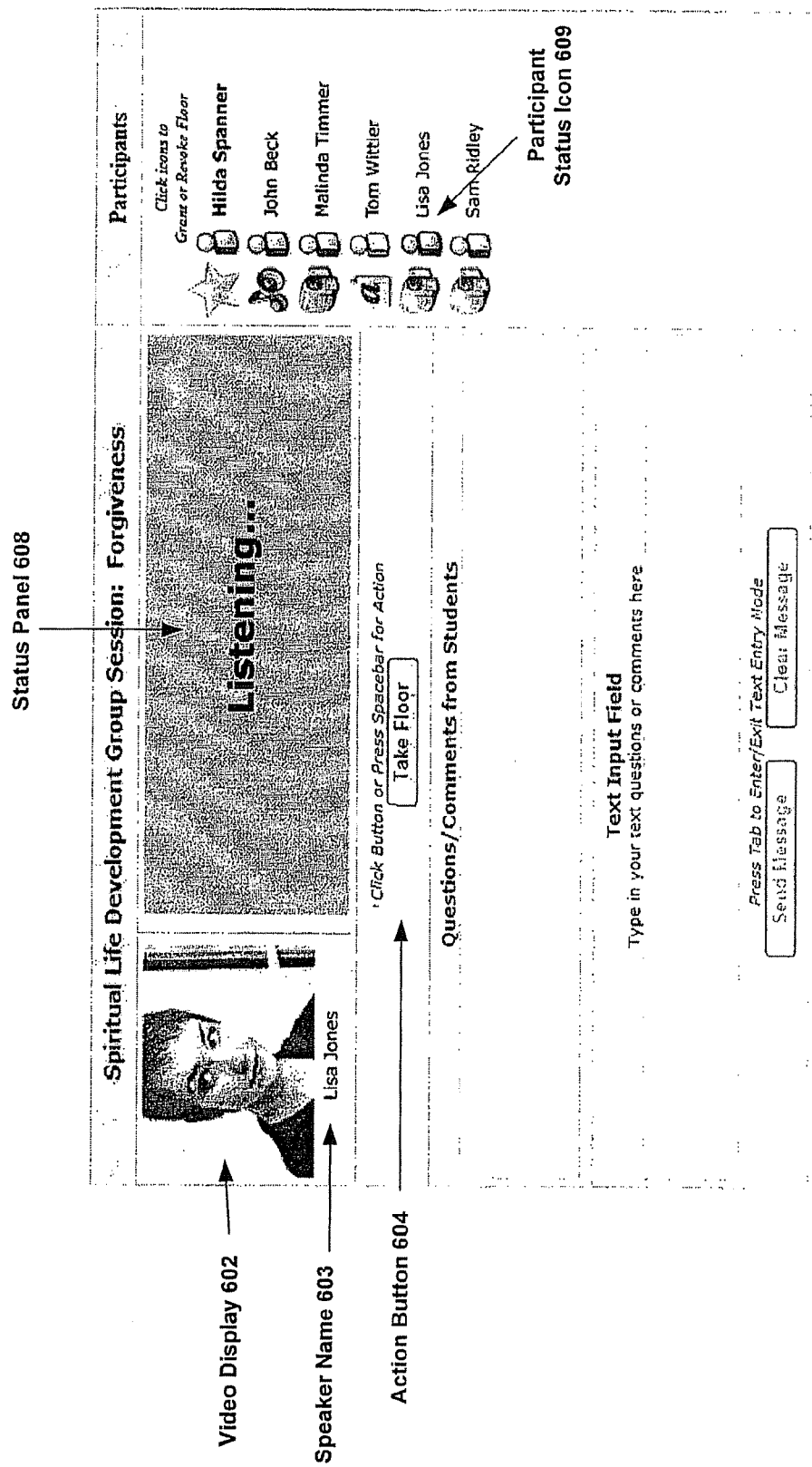
Figure 6: Facilitator Interface (listening)

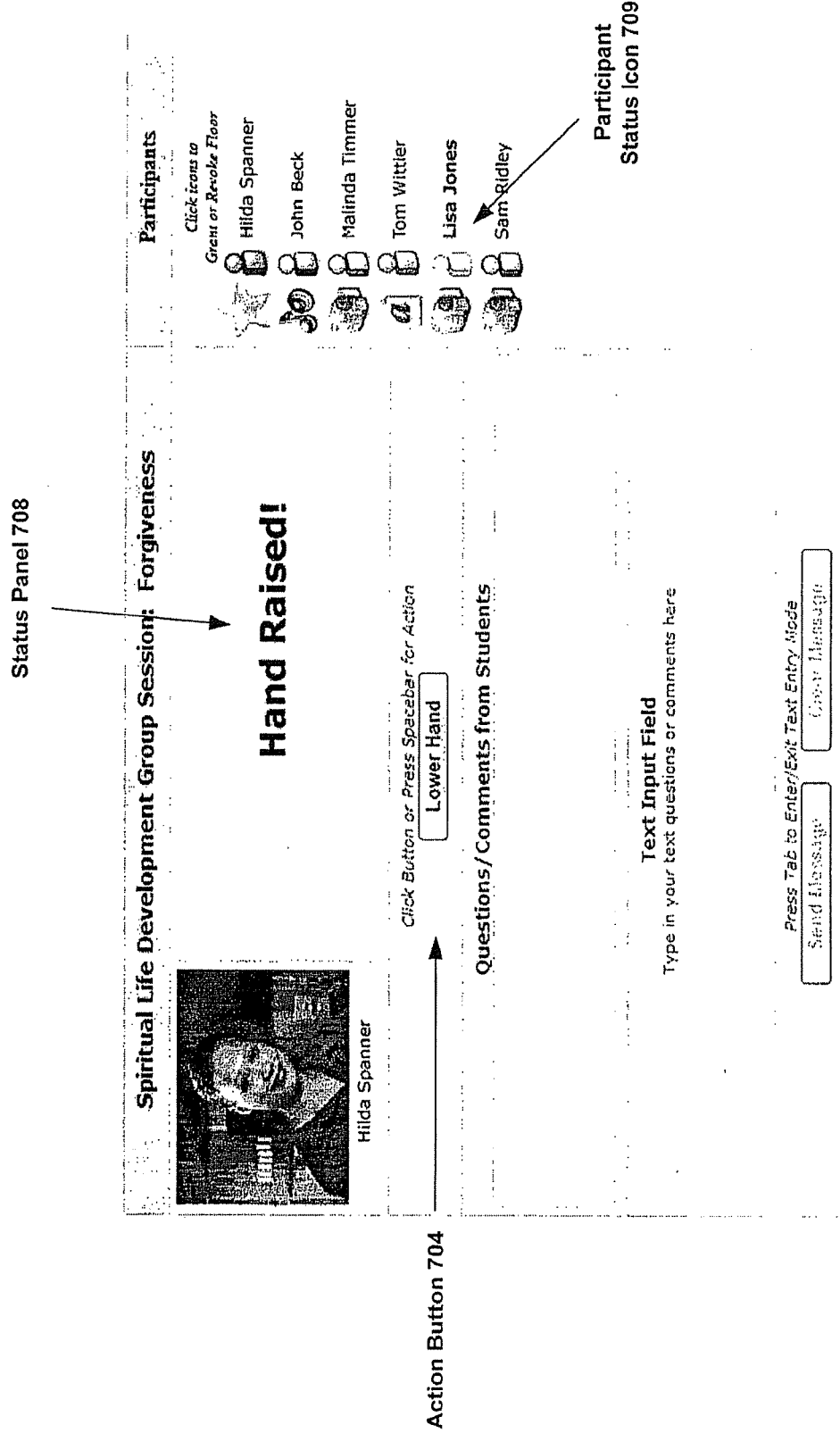
Figure 7: Participant Interface (Hand Raised)

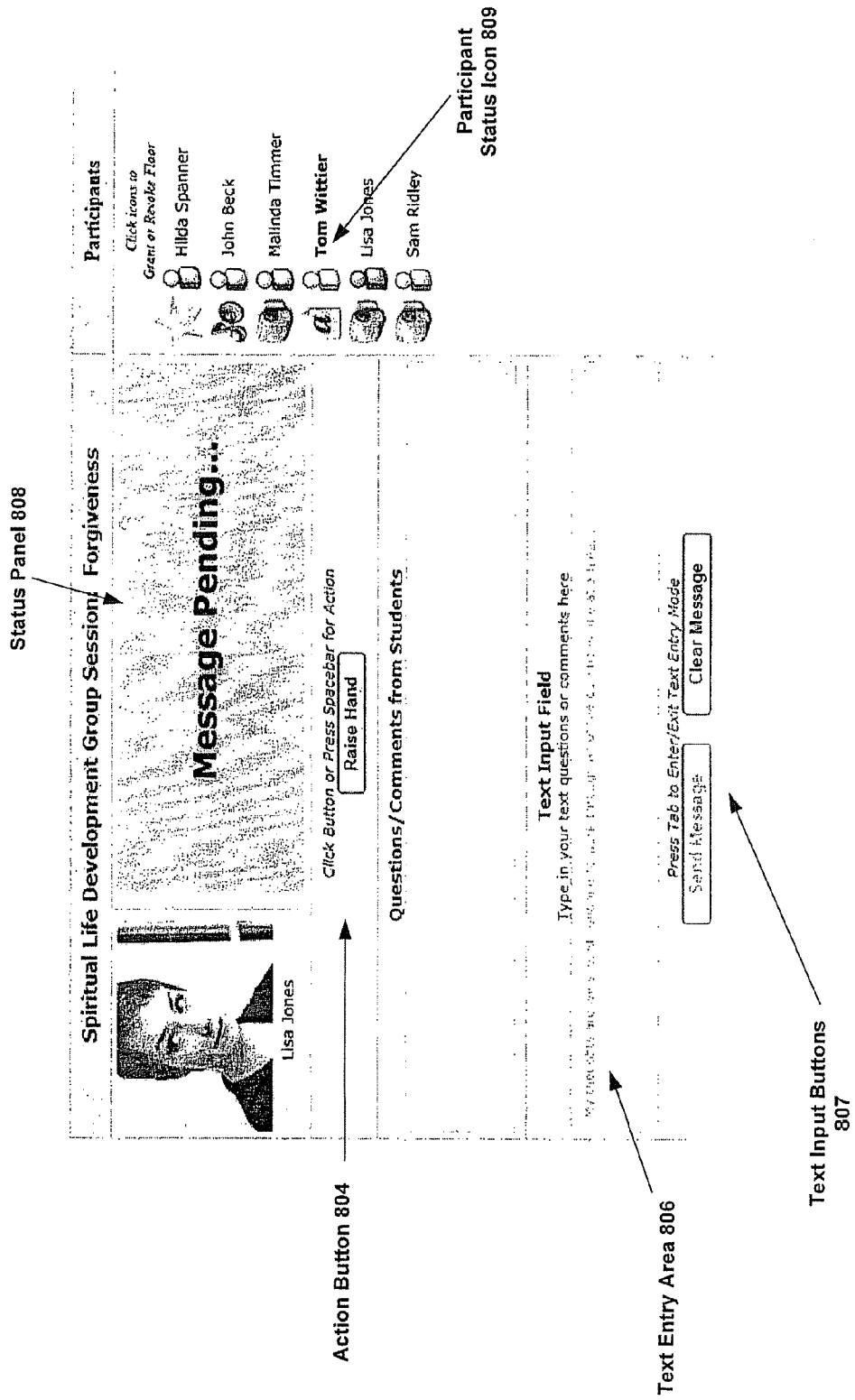
Figure 8: Participant Interface (Message Pending)

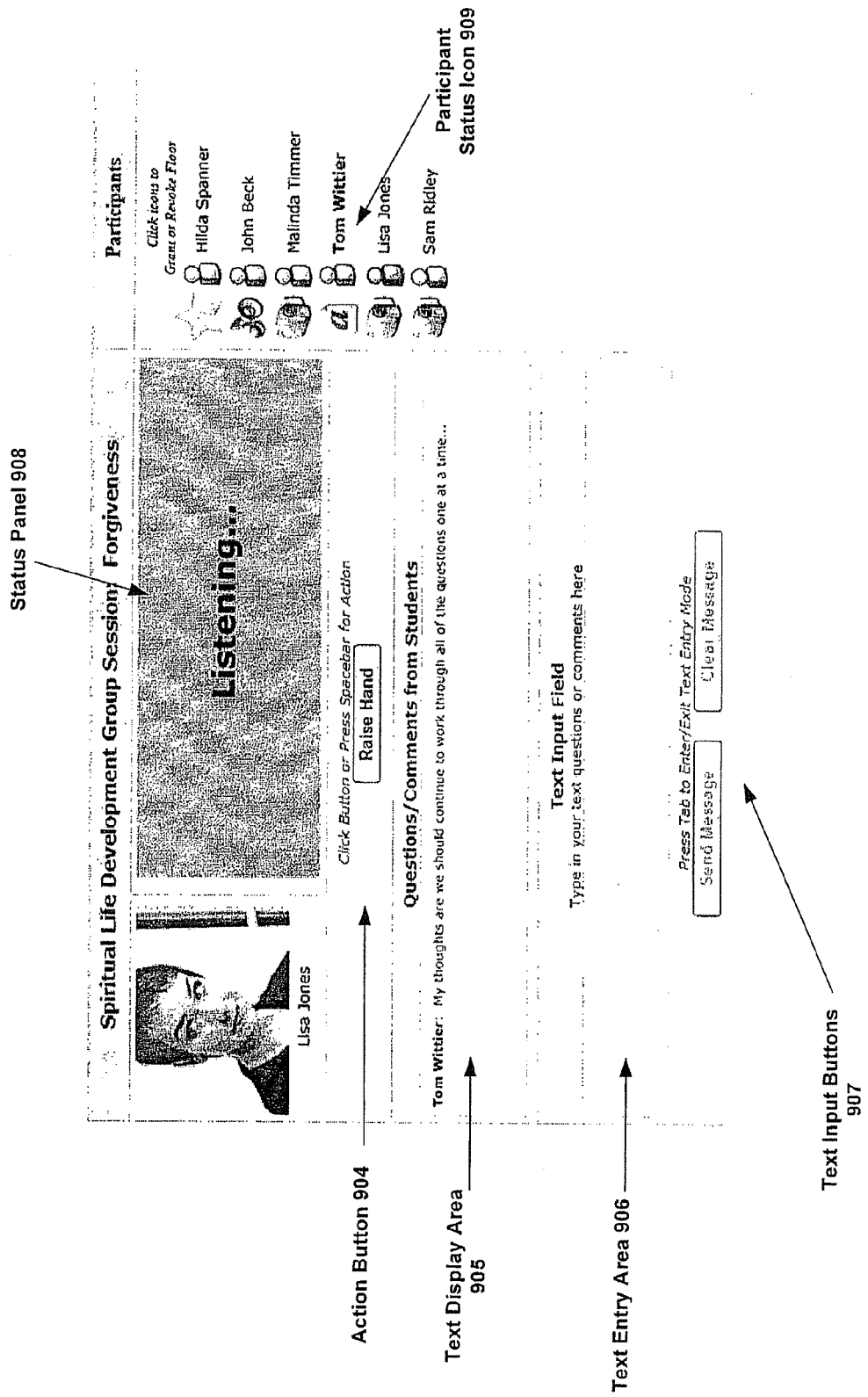
Figure 9: Participant Interface (Message Displayed)

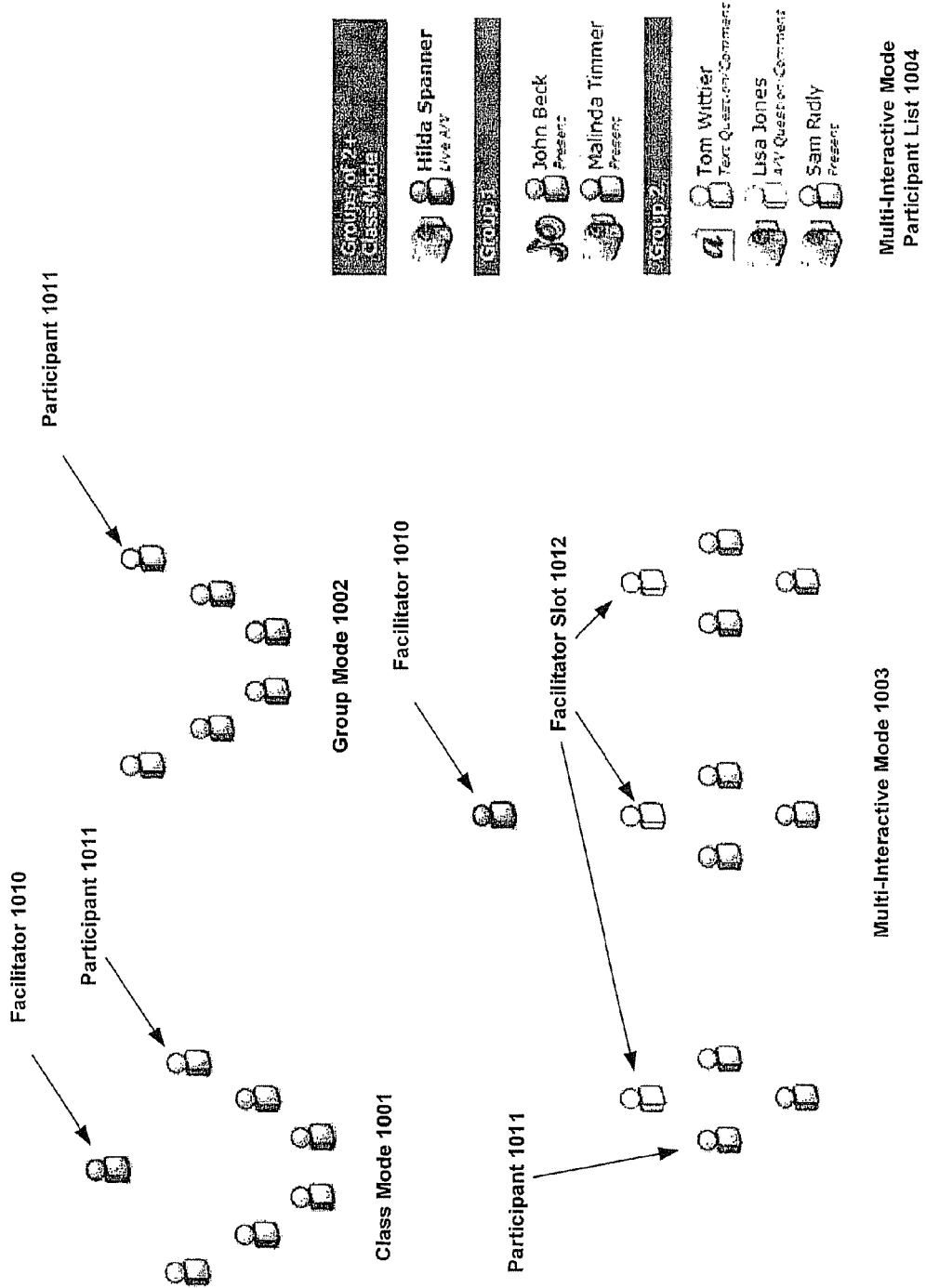

Figure 11: Action Commands

X shows allowed commands

| Request | Facilitator VAT Preferred | Participant Data Stream Type | | |
|---|---|---|---|---|
| | | VAT | AT | T |
| Conference Start | X | X | X | X |
| Add Participant | X | X | X | X |
| Raise Hand | X (5) | X | X | X (4) |
| Lower Hand | X (5) | X | X | X |
| Give Floor (transfer) | X | X | X | |
| Release Floor | X | X | X | |
| Take Floor | X | X (1) | X (1) | |
| Text Message | X | X | | X |
| Answer Text | X | X (6) | X (6) | |
| Extension | X | | | |
| Lock | X | | | |
| Drop (3) | X | X | X | X |
| Subgroup Done | | X | X | X |
| Create Subgroups | X | | | |
| Breakout Subgroups | X | | | |
| Join Subgroup | X | | | |
| Exit Subgroup | X | | | |
| Reconvene | X | | | |
| Unlock | X (2) | | | |
| Move Participant | X | | | |
| Clear Hands | X | | | |

Notes
1) Only when no one has the floor
2) Only when subgroups not active
3) Generated by system when participant disconnects
4) Text only participant can only send text messages and not take floor
5) Optional - not included in preferred embodiment
6) Only when they have the floor

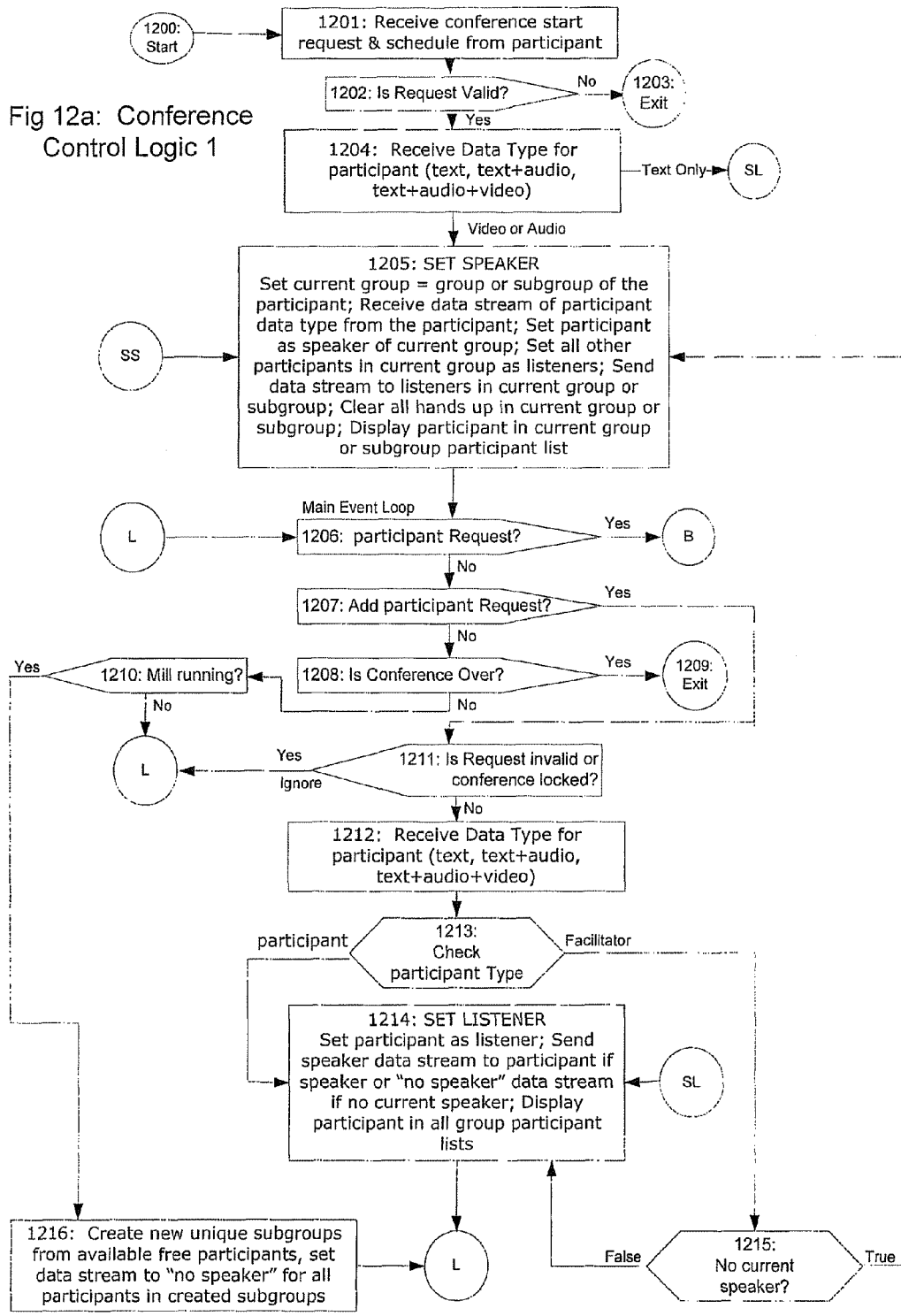

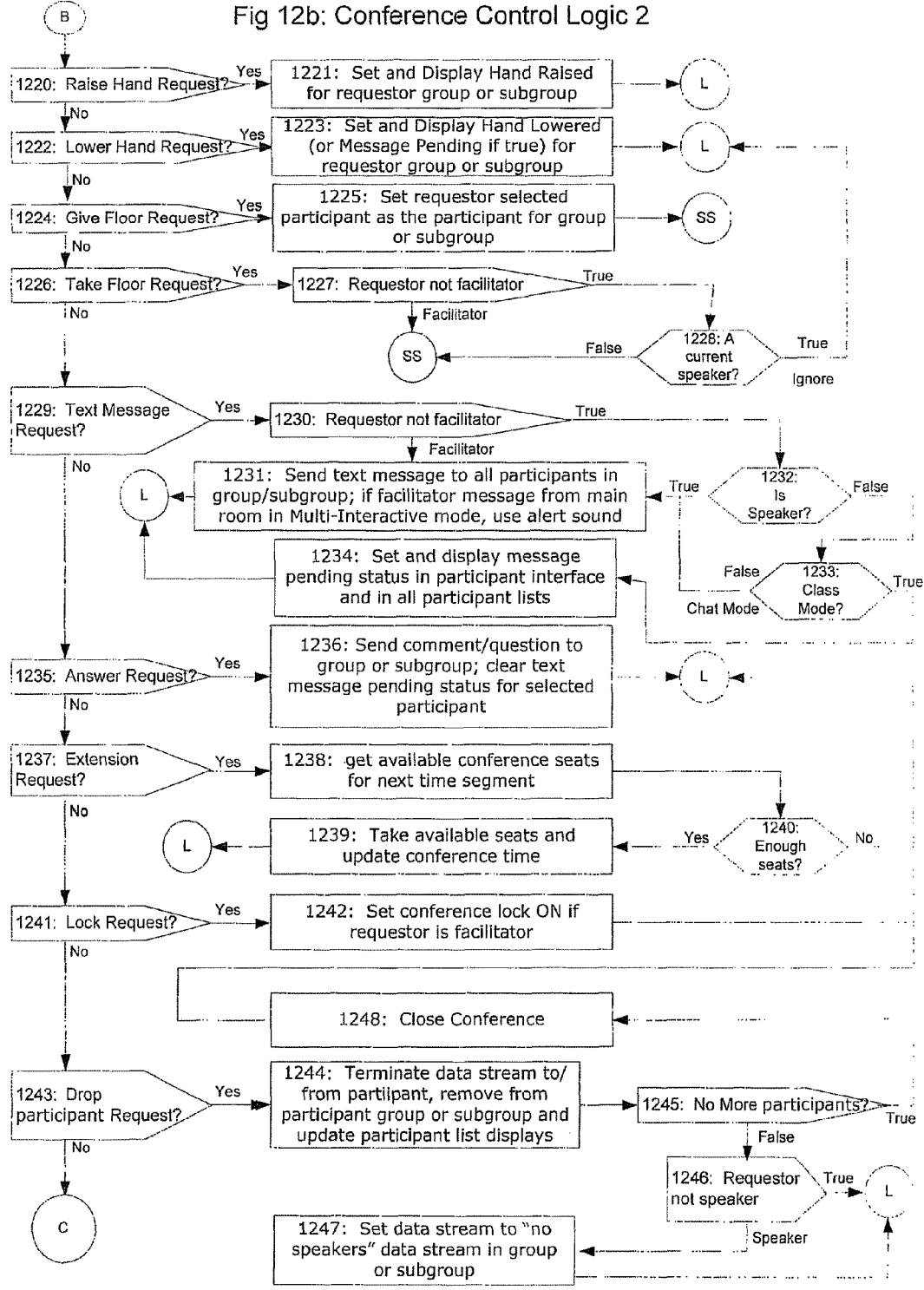

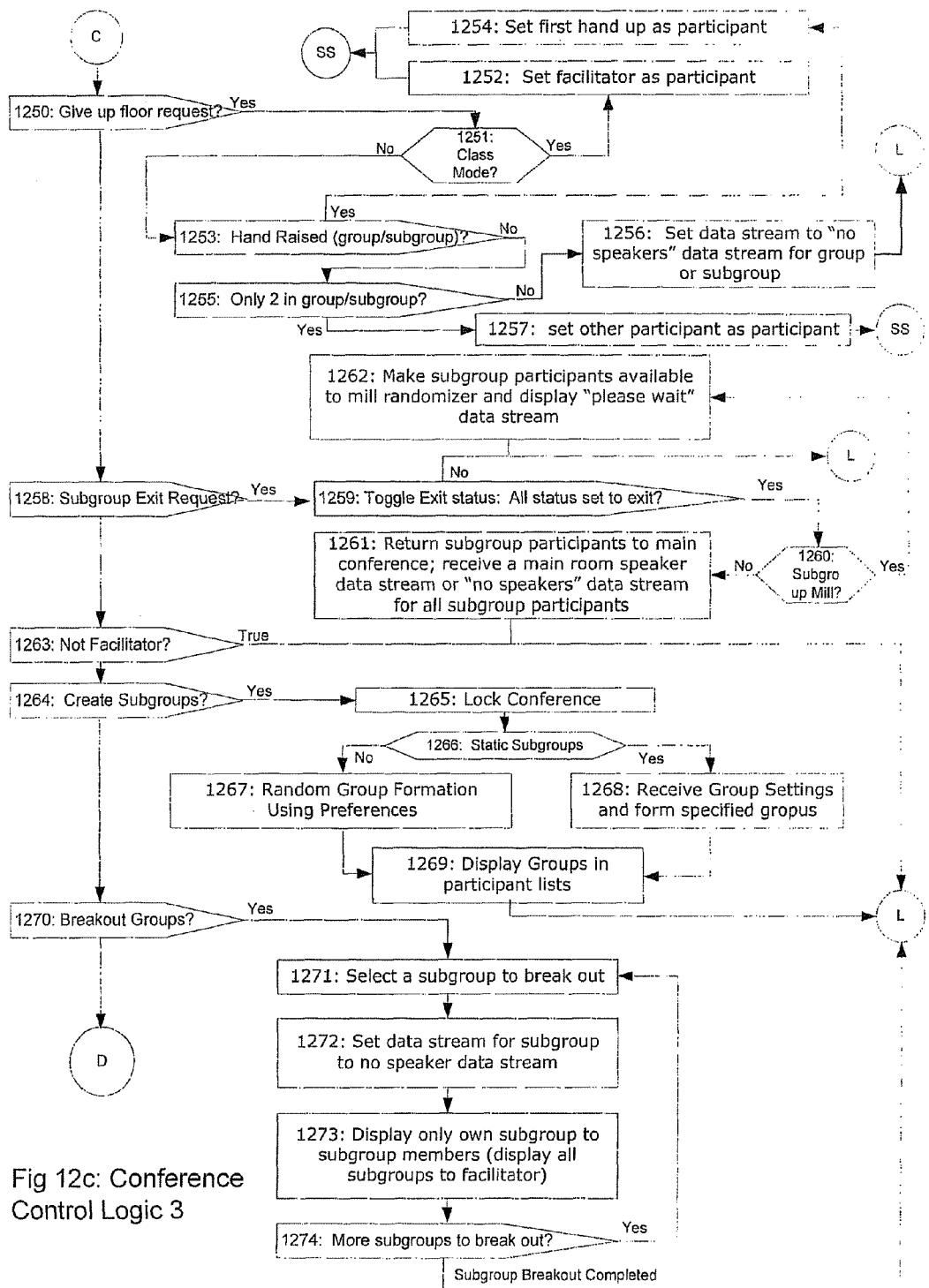
Fig 12c: Conference Control Logic 3

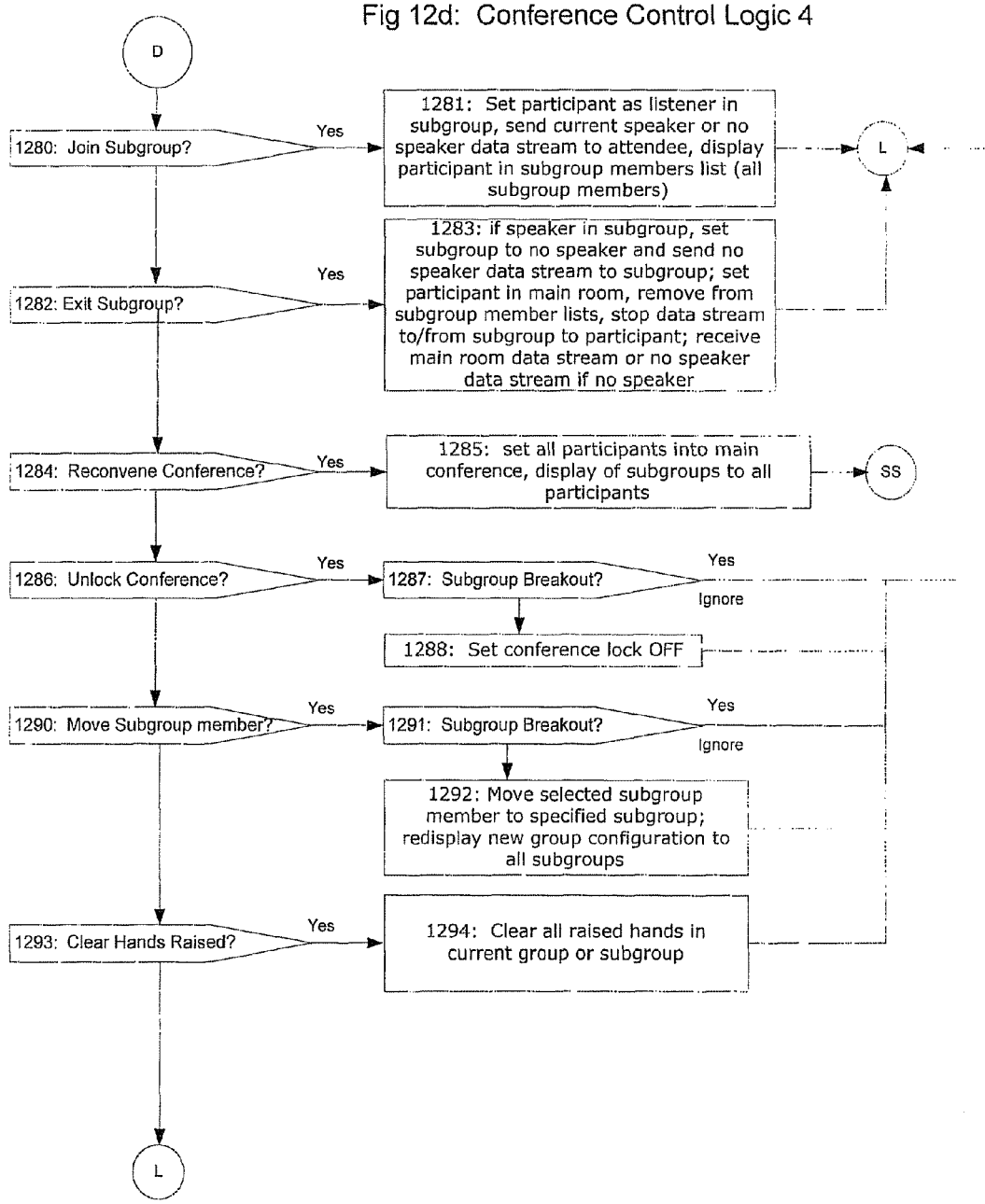

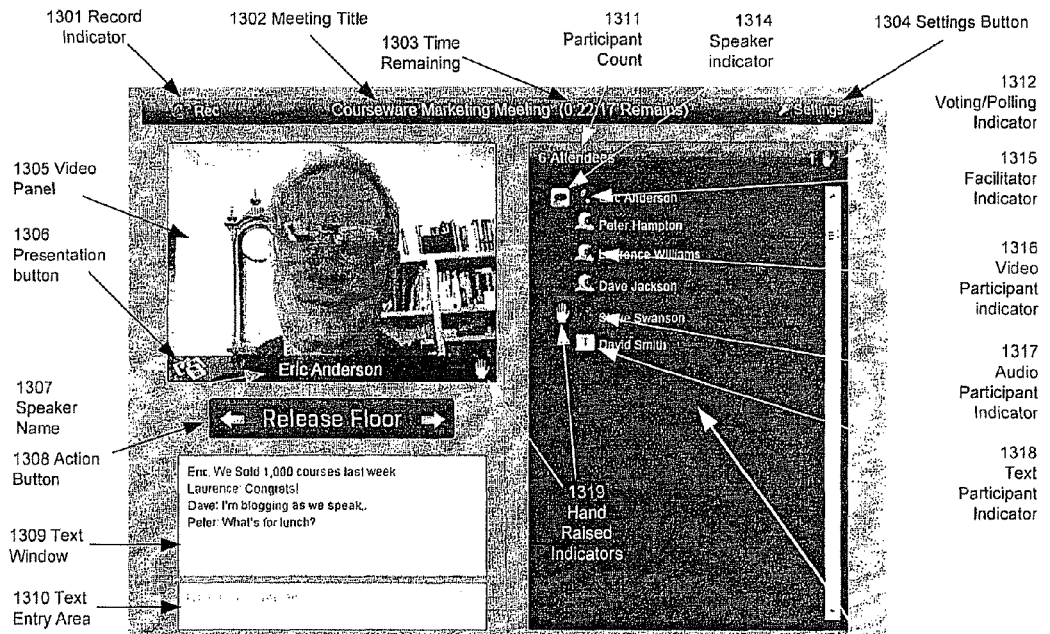
Figure 13a: Alternate Interface Embodiment
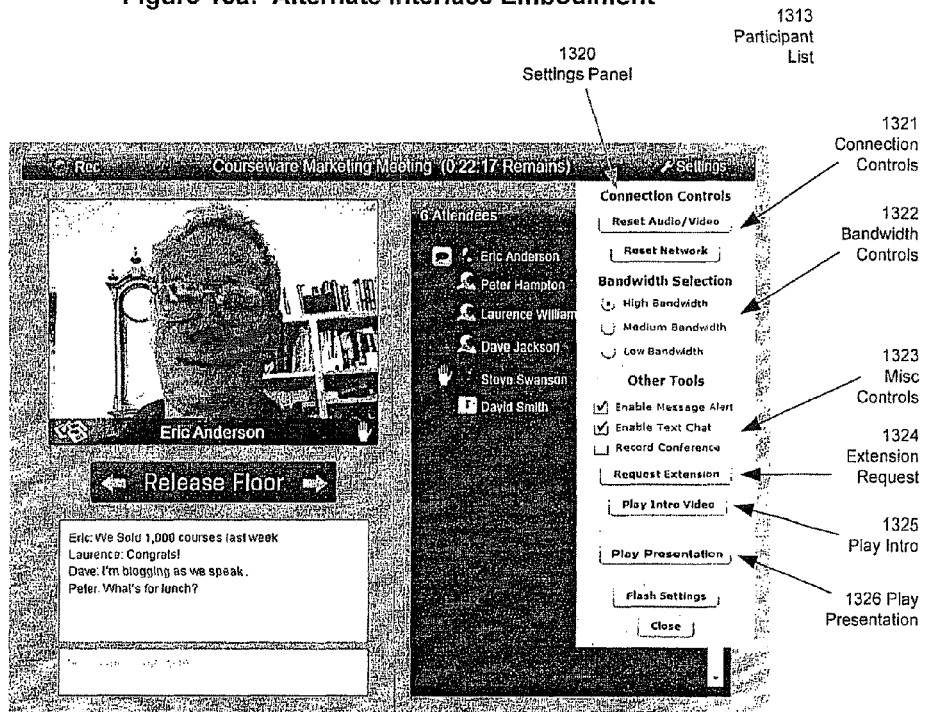
Figure 13b: Alternate Embodiment Interface Settings Panel

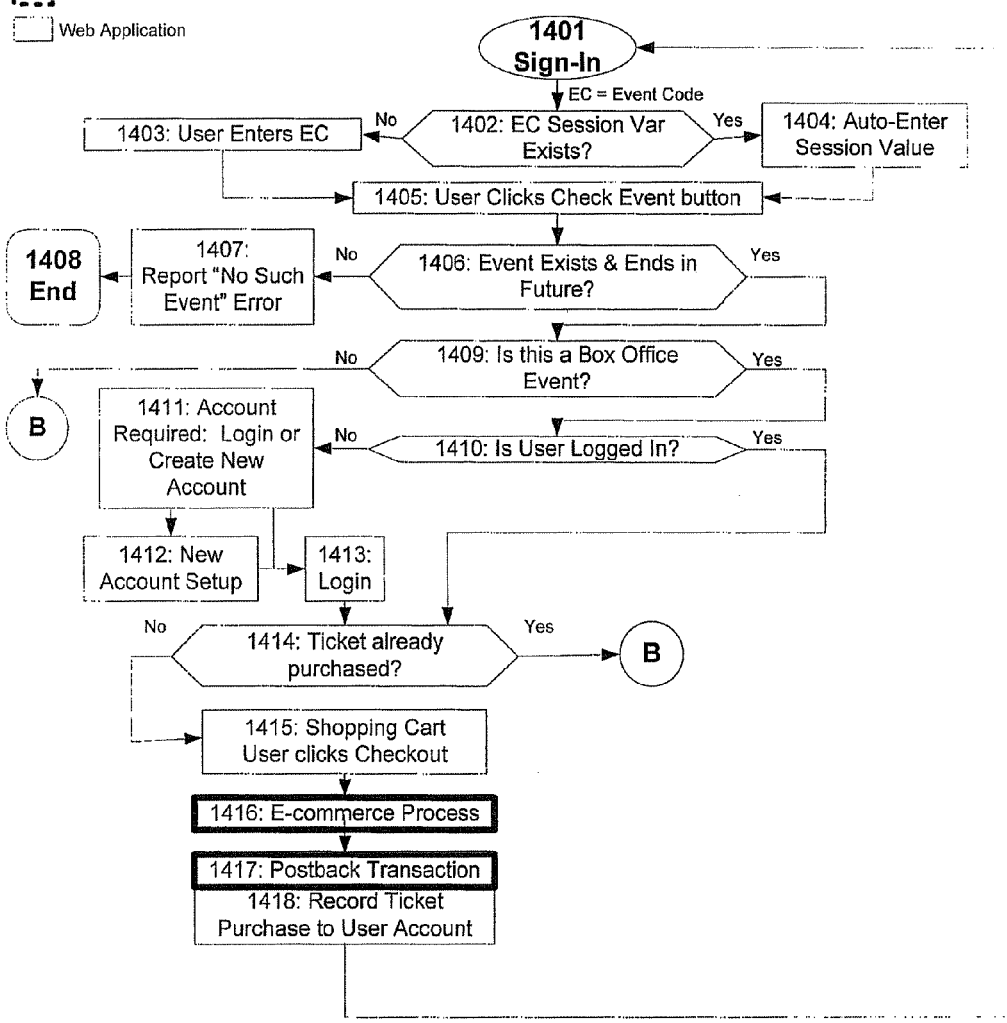
Figure 14a: Video Conference Event Sign-In Flow Diagram

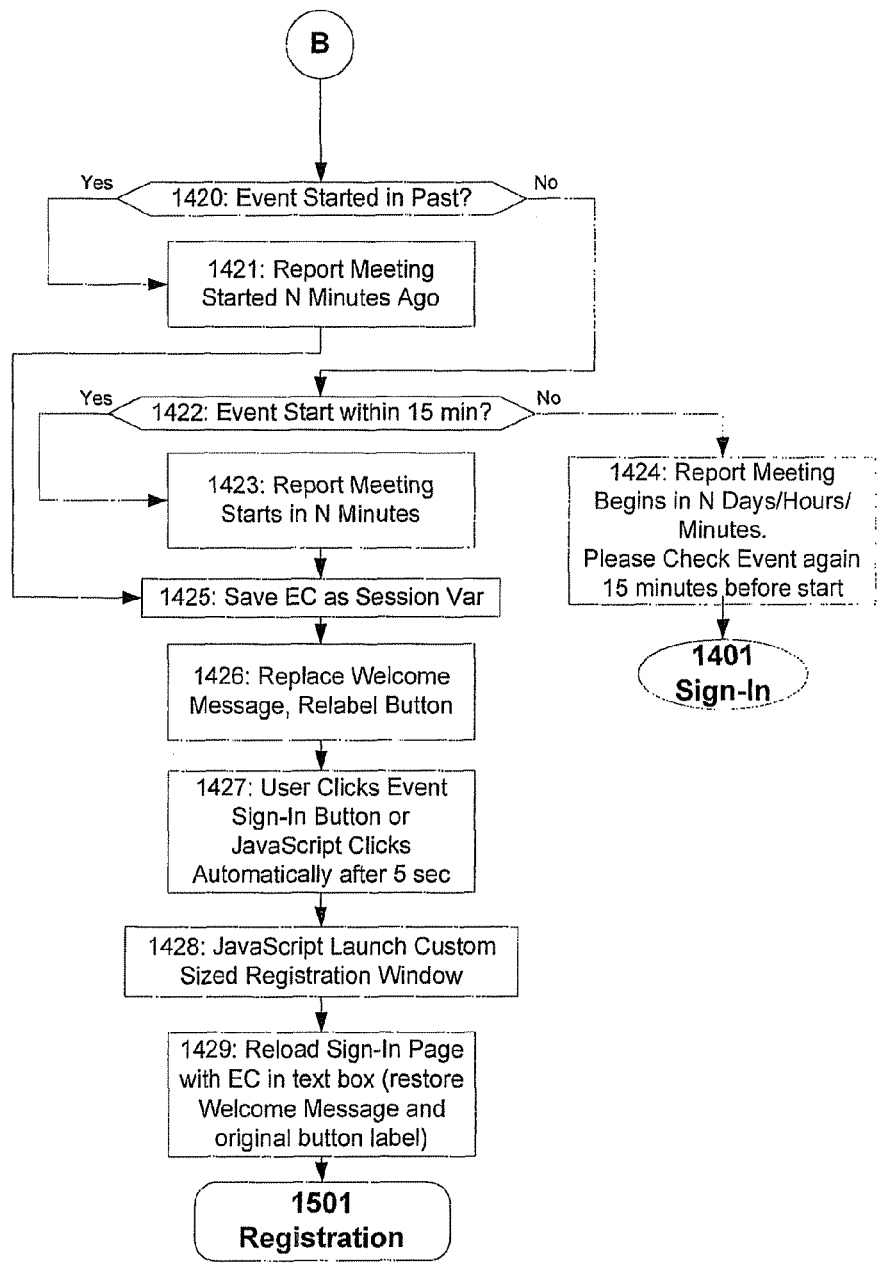
Figure 14b: Video Conference Event Sign-In Flow Diagram

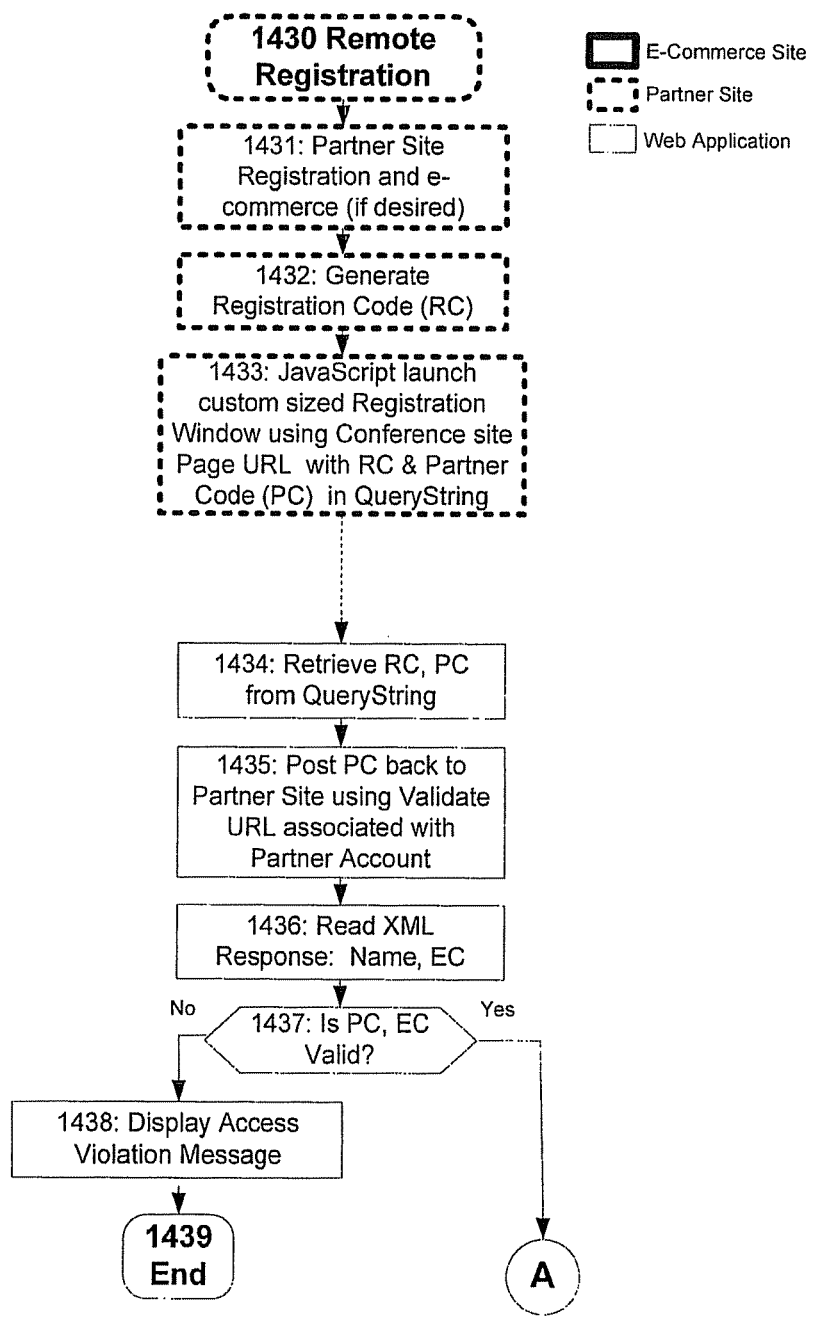
Figure 14c: Video Conference Event Sign-In Flow Diagram

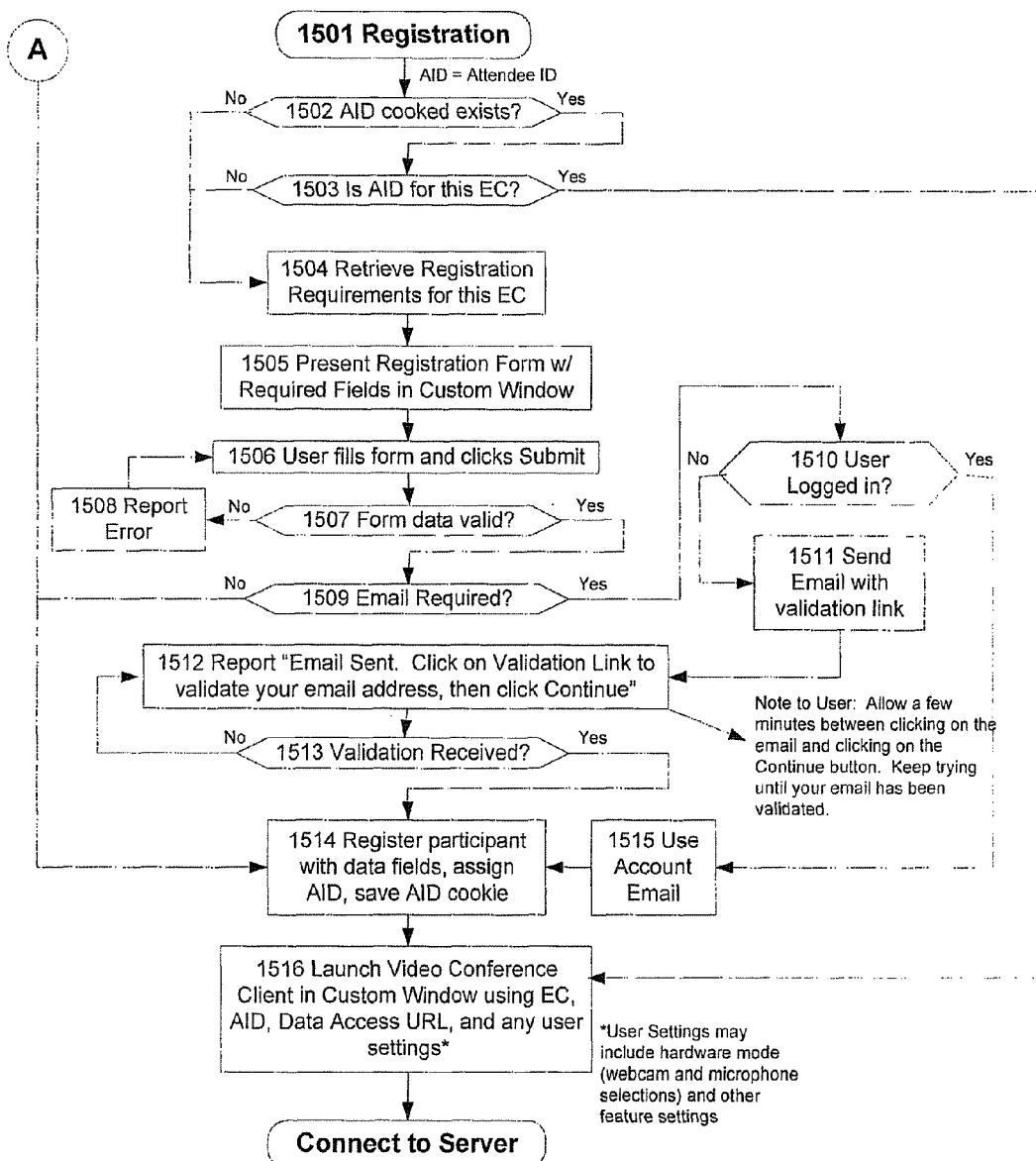
Figure 15: Registration Procedure

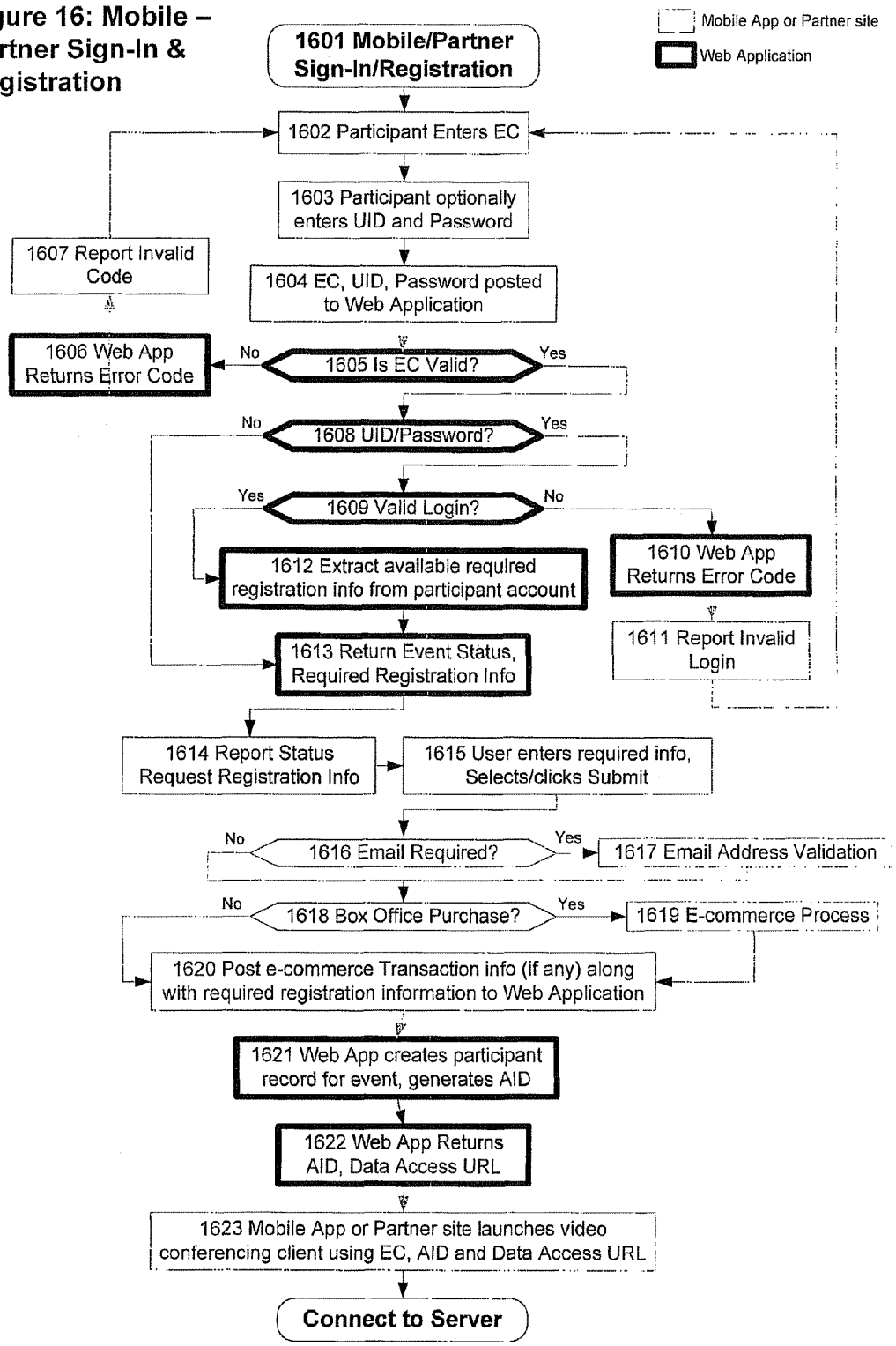

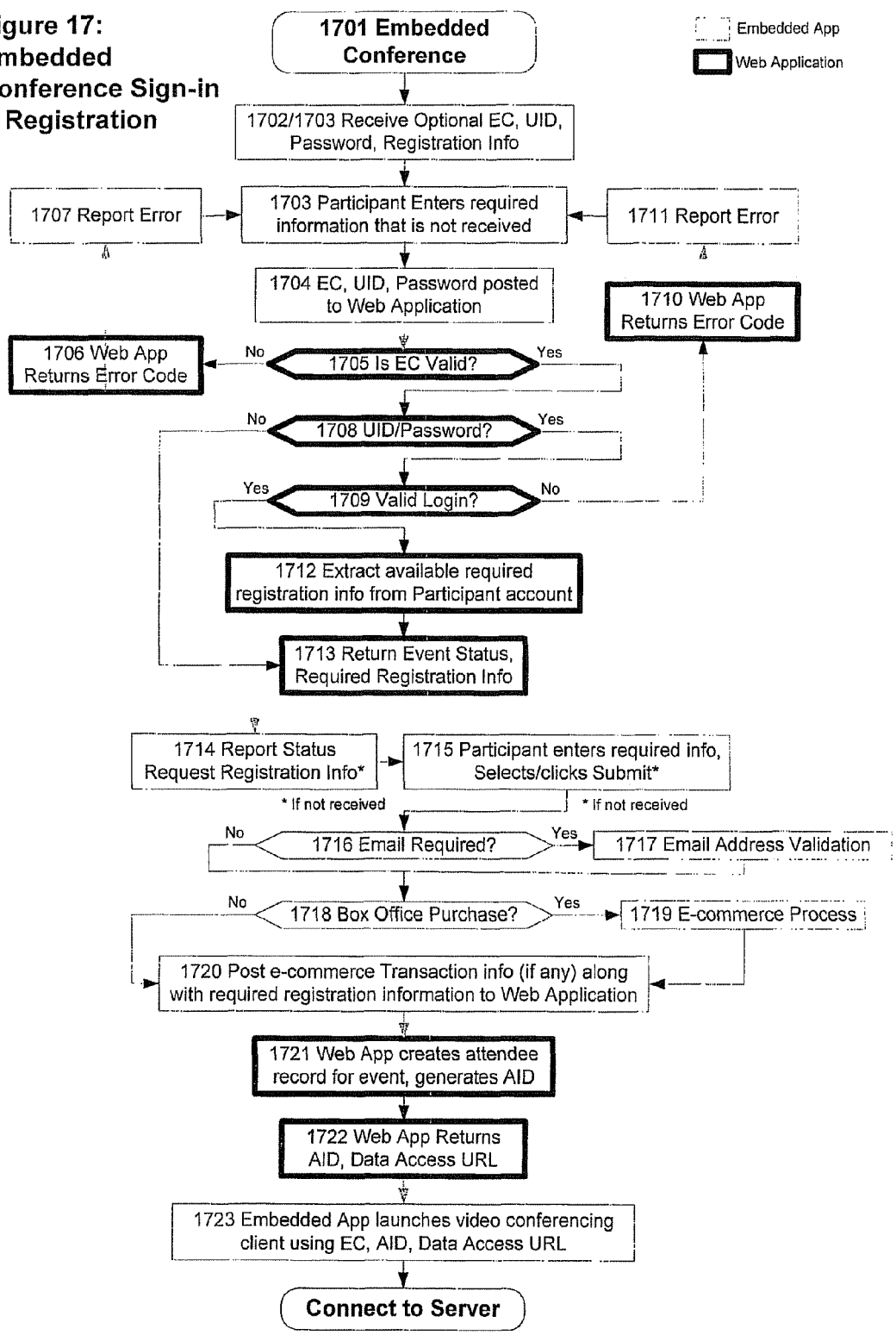

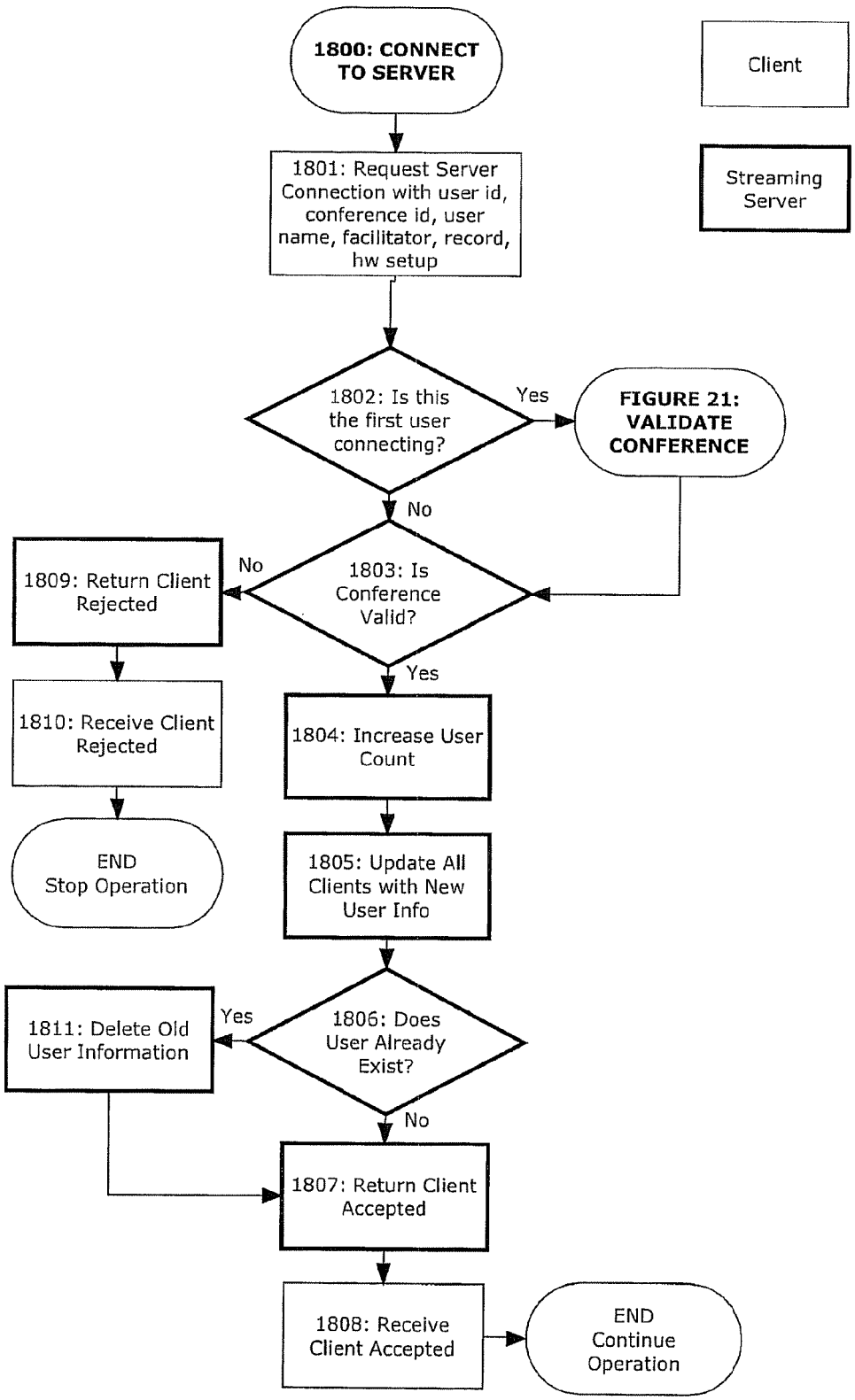
FIGURE 18 - CLIENT CONNECT TO SERVER

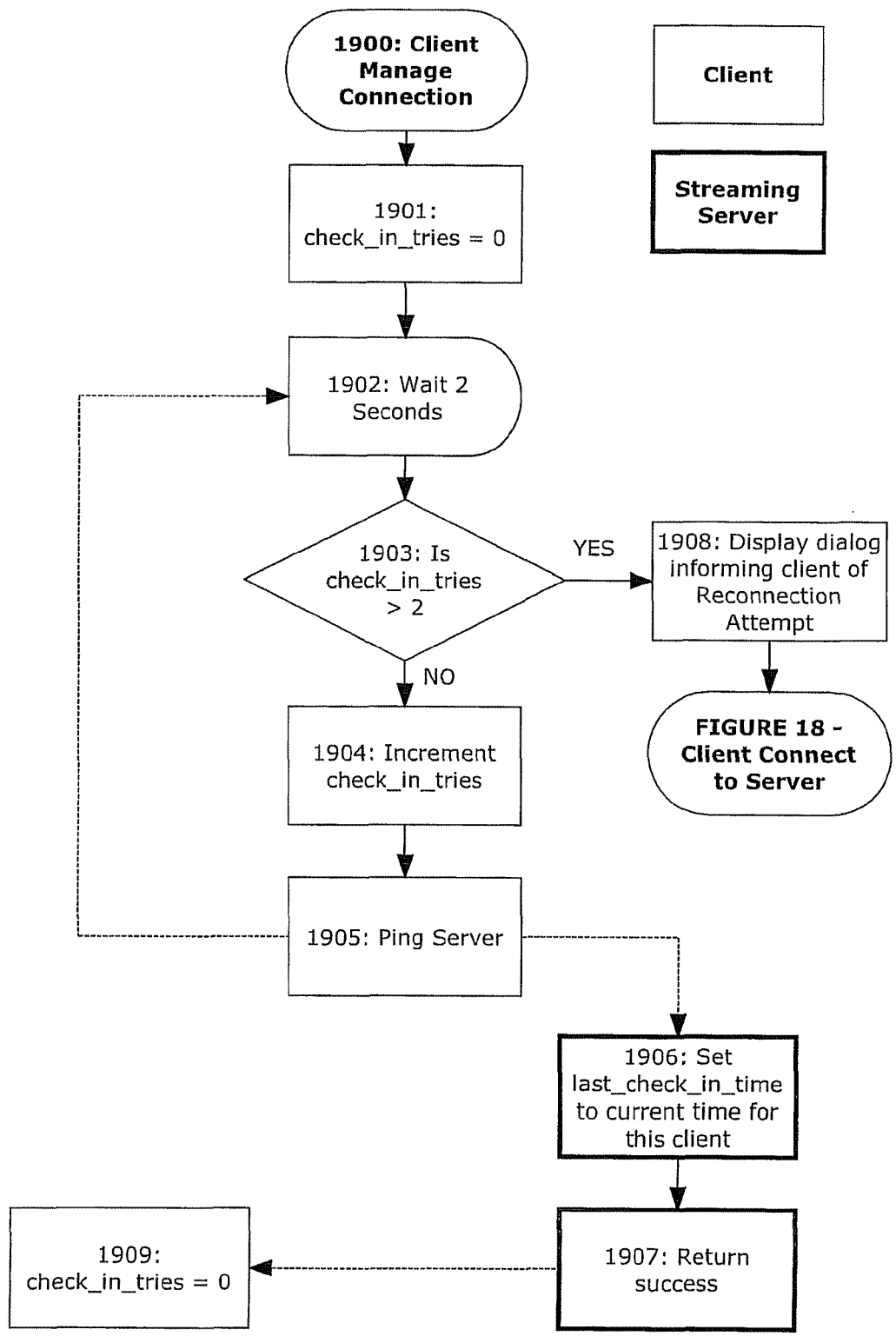
FIGURE 19 - CLIENT MANAGE CONNECTION

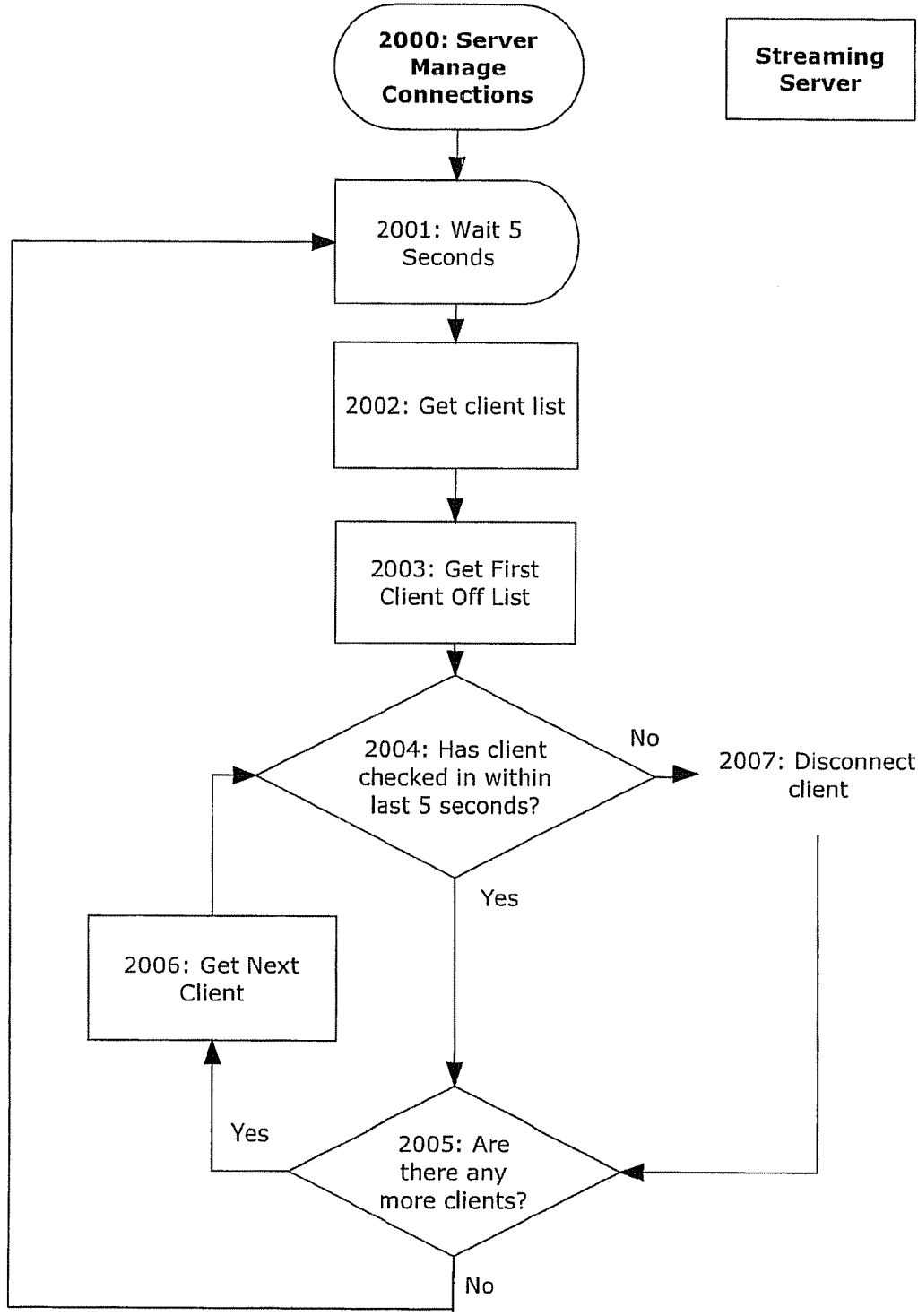
FIGURE 20 - Server Manage Connections

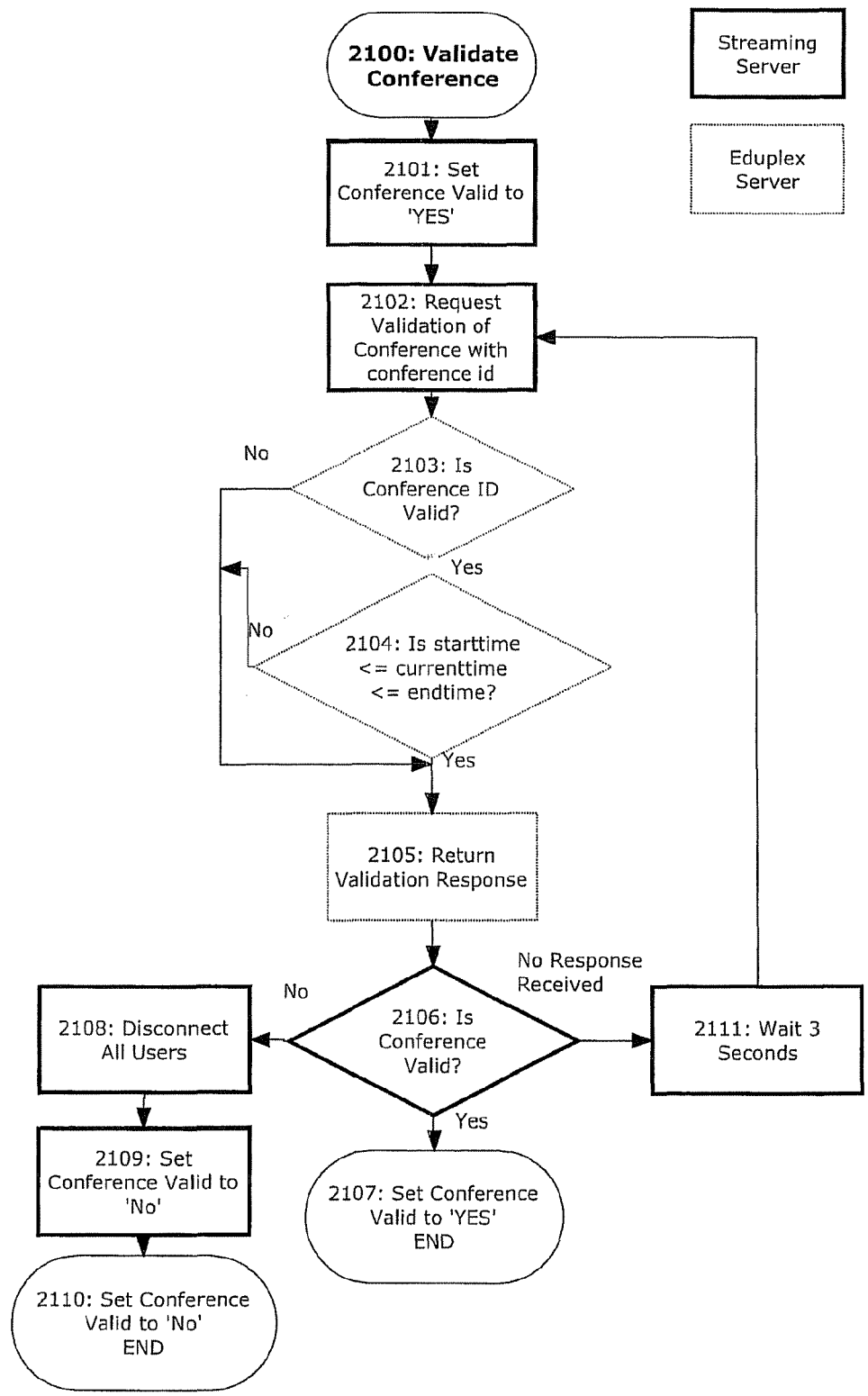
FIGURE 21 - VALIDATE CONFERENCE

Figure 22: Control Stream Data Flow 1
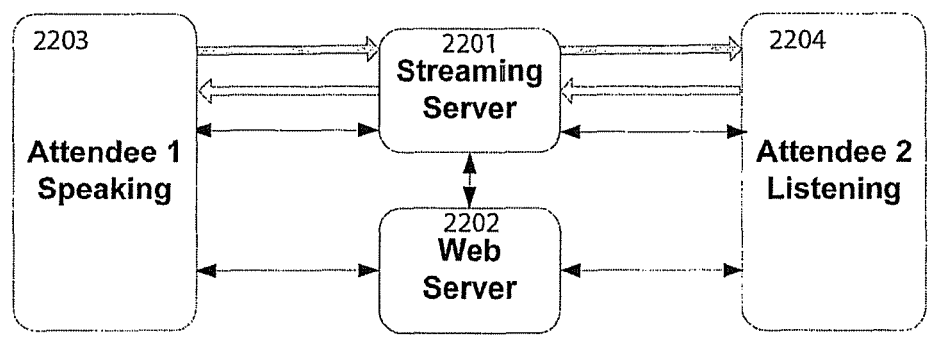
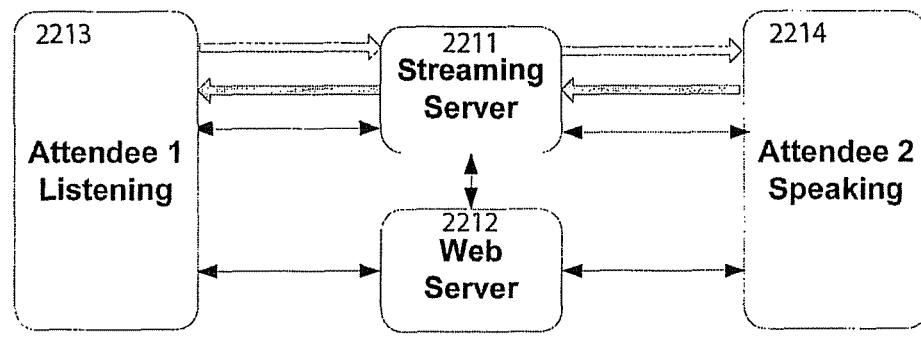

Figure 23: Control Stream Data Flow 2
Active A/V Stream
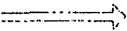
Inactive A/V Stream
Control.Status
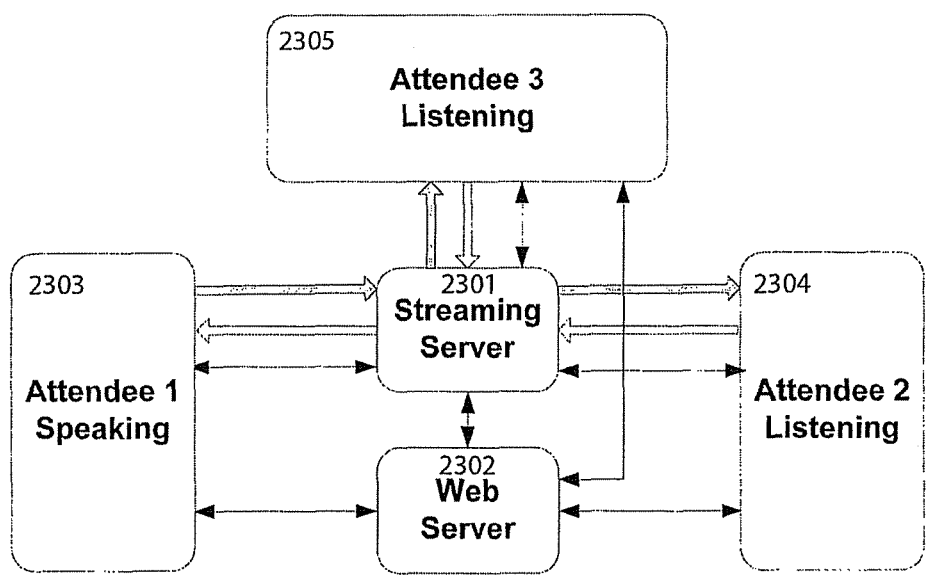
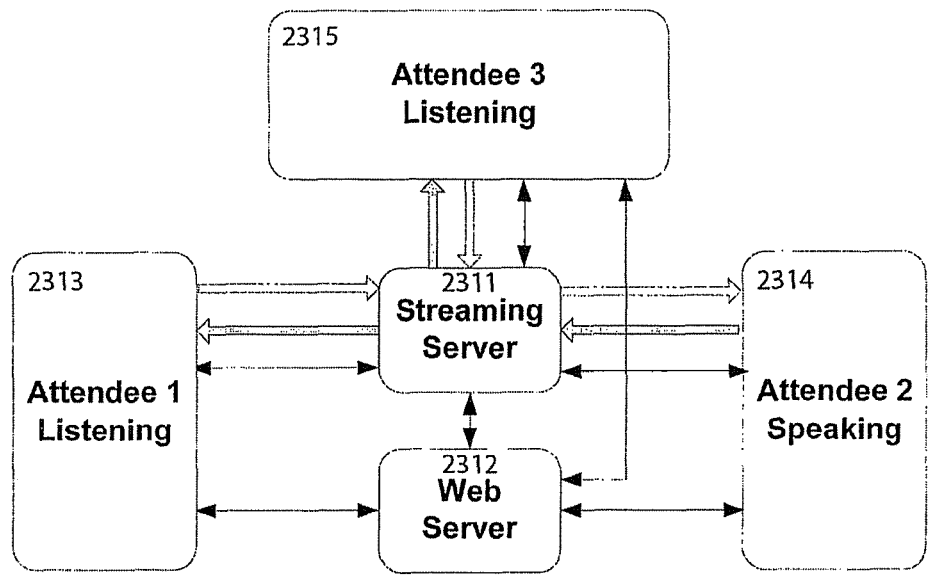

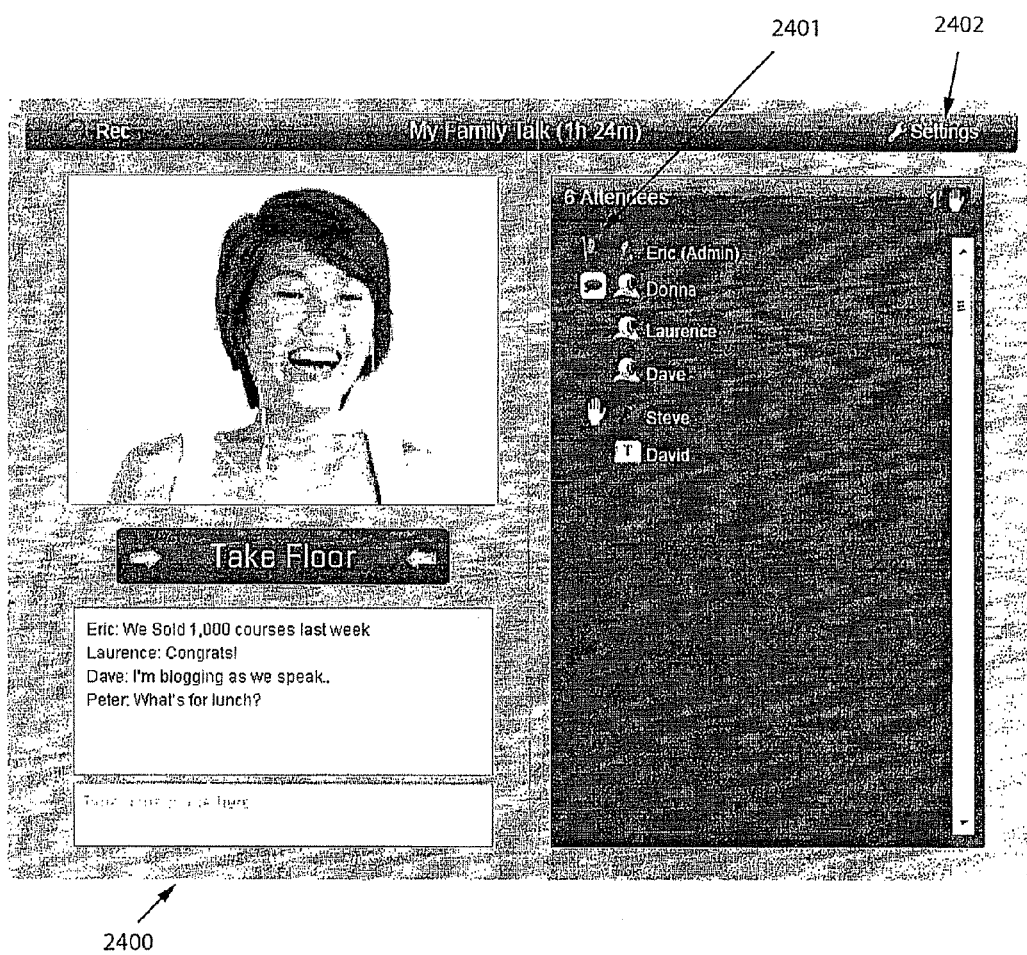
Figure 24: Full Color Embodiment

Figure 25: Settings Panel
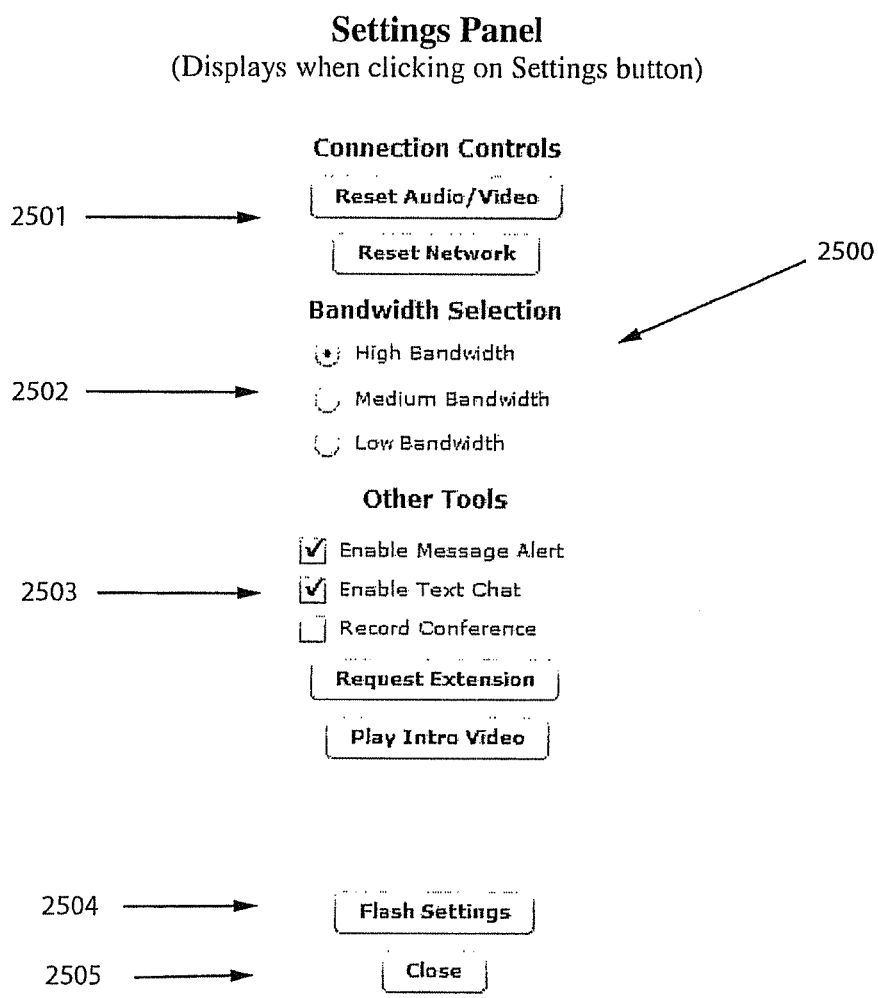
(Additional buttons not shown include Play Presentation button)

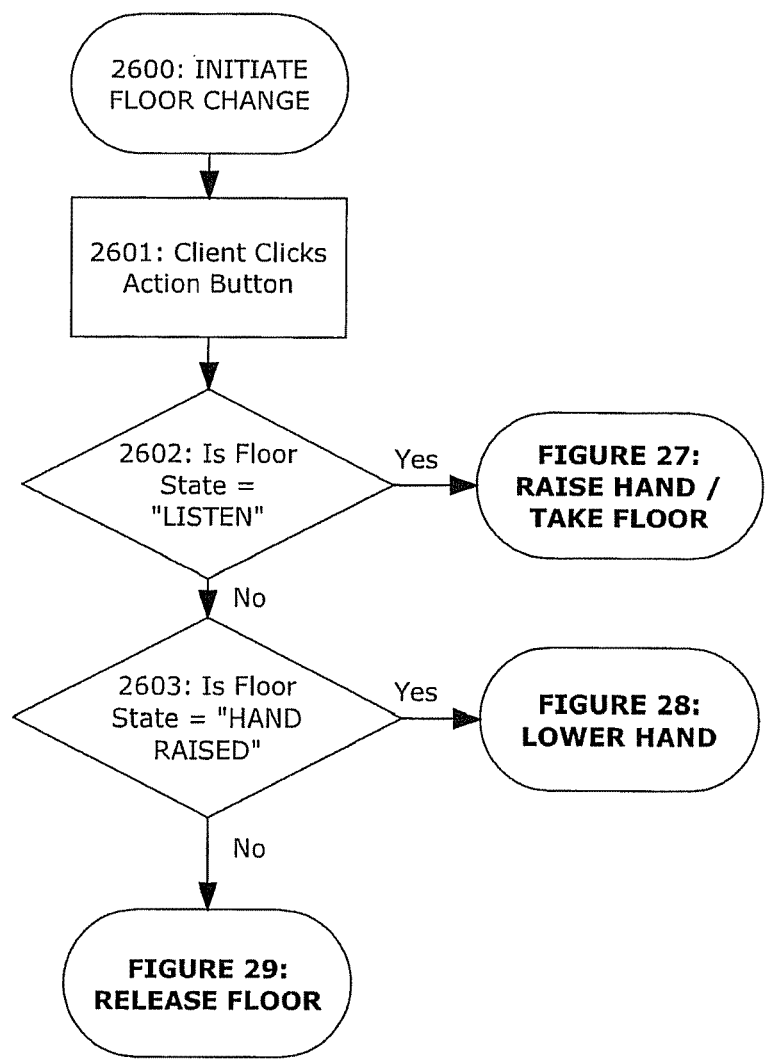
FIGURE 26 - Initiate Floor Change

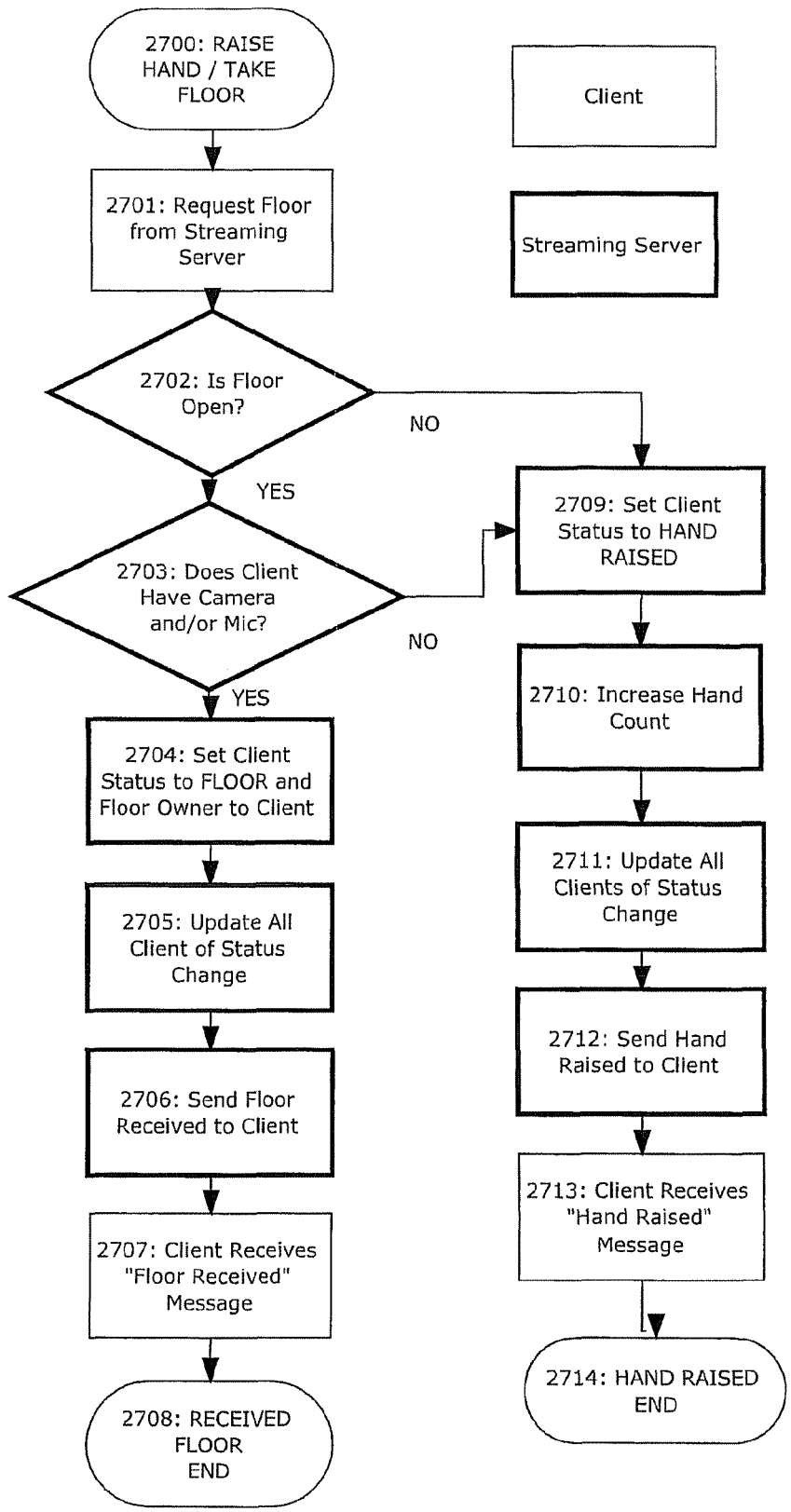

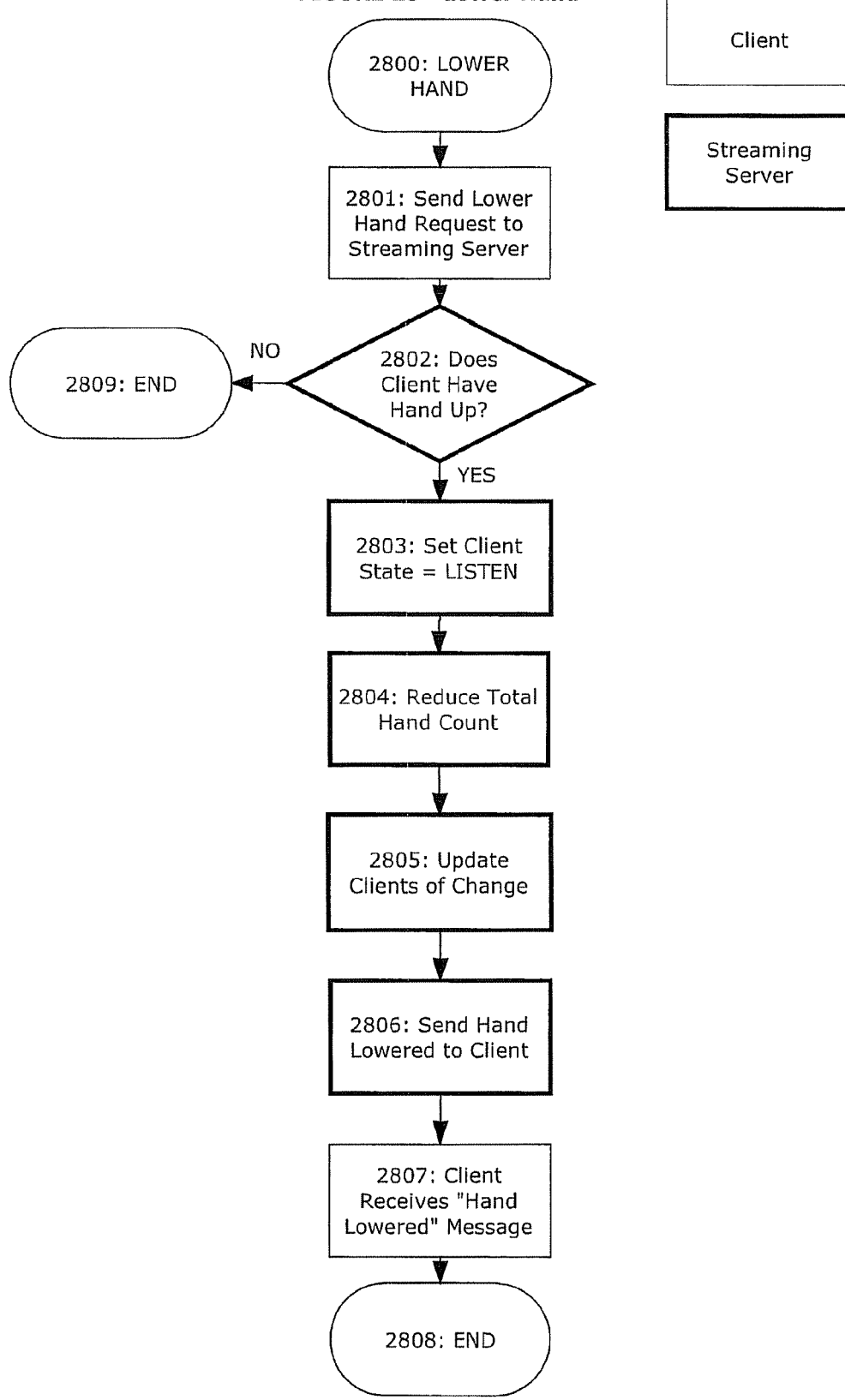

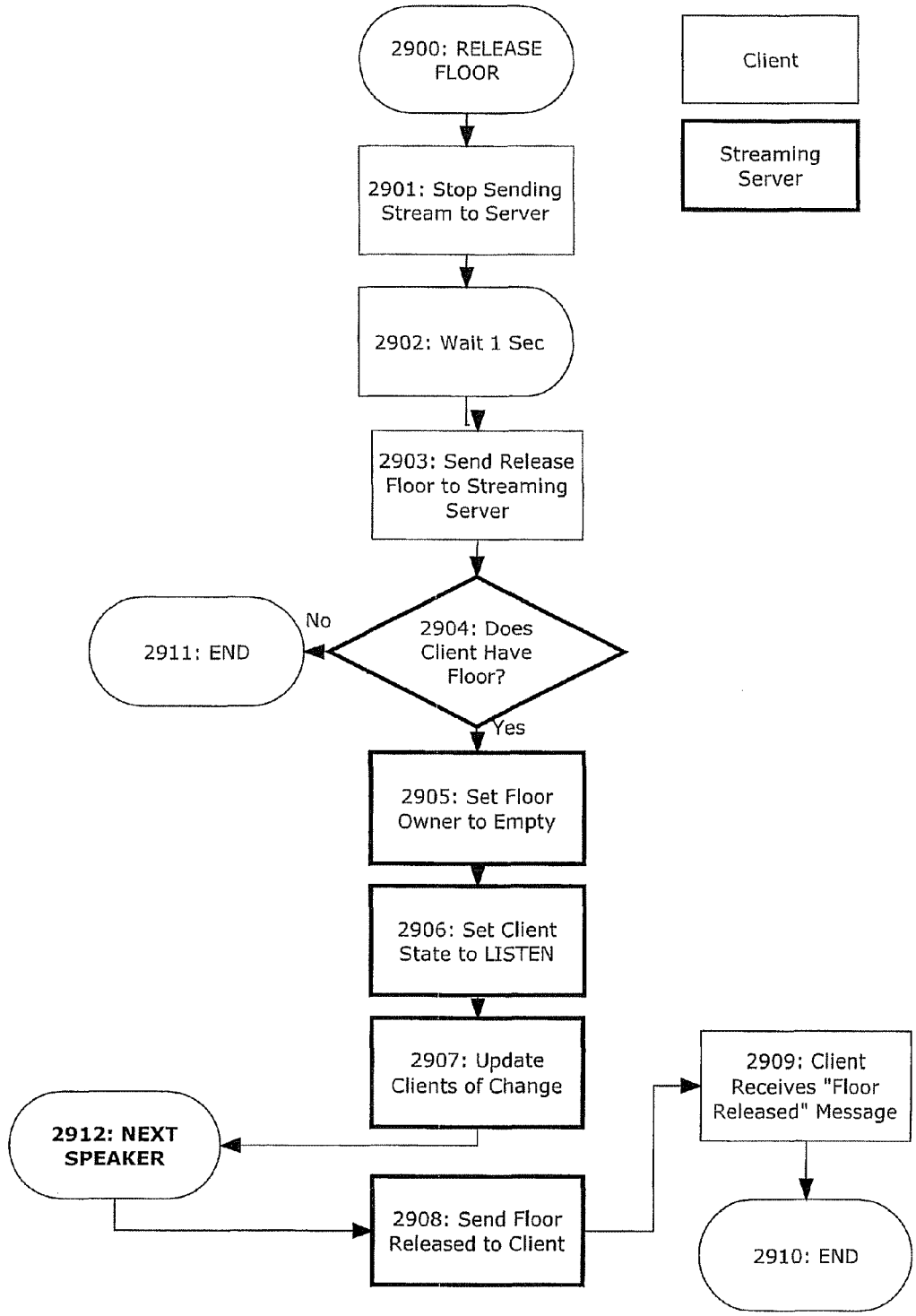

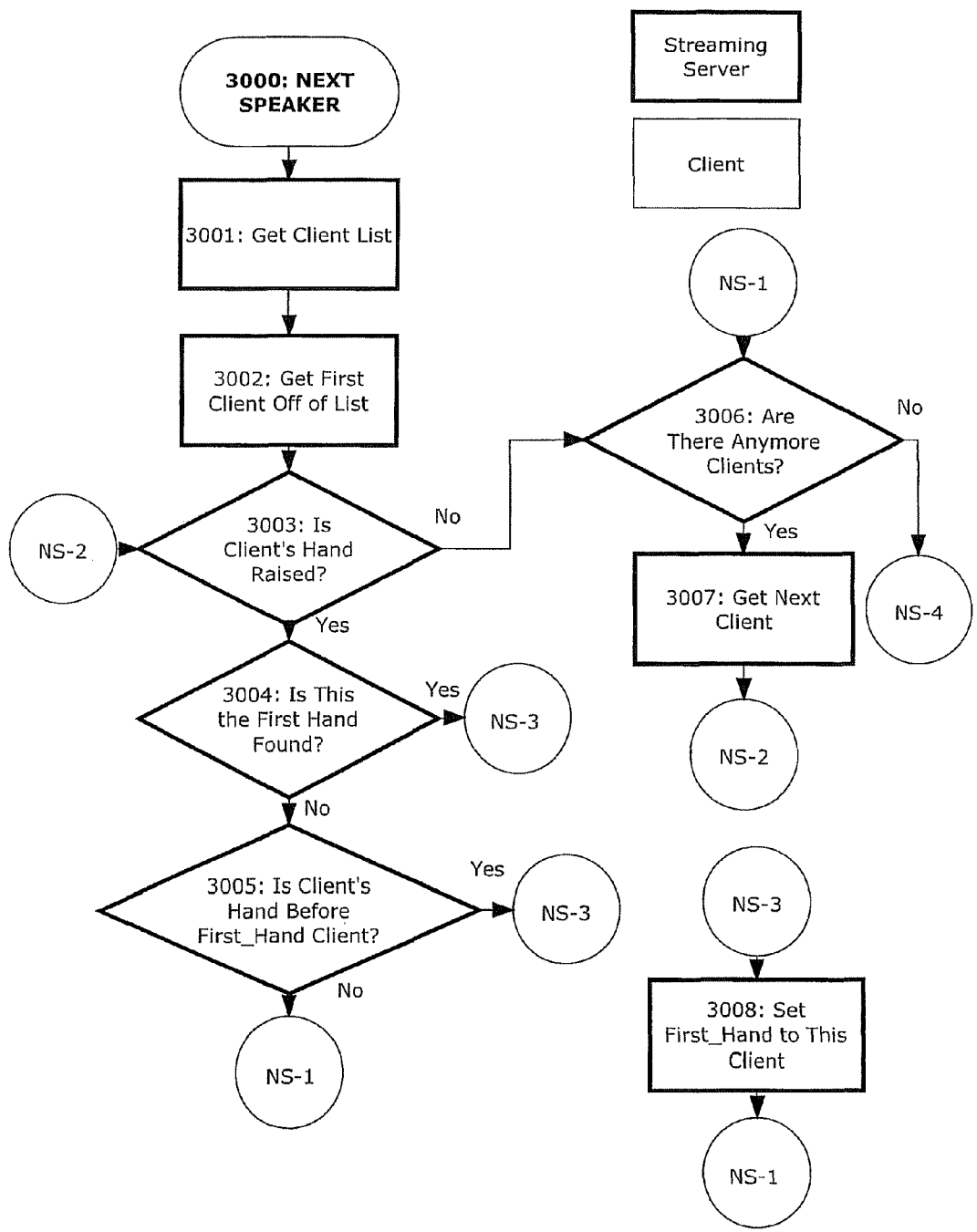
FIGURE 30a - Next Speaker

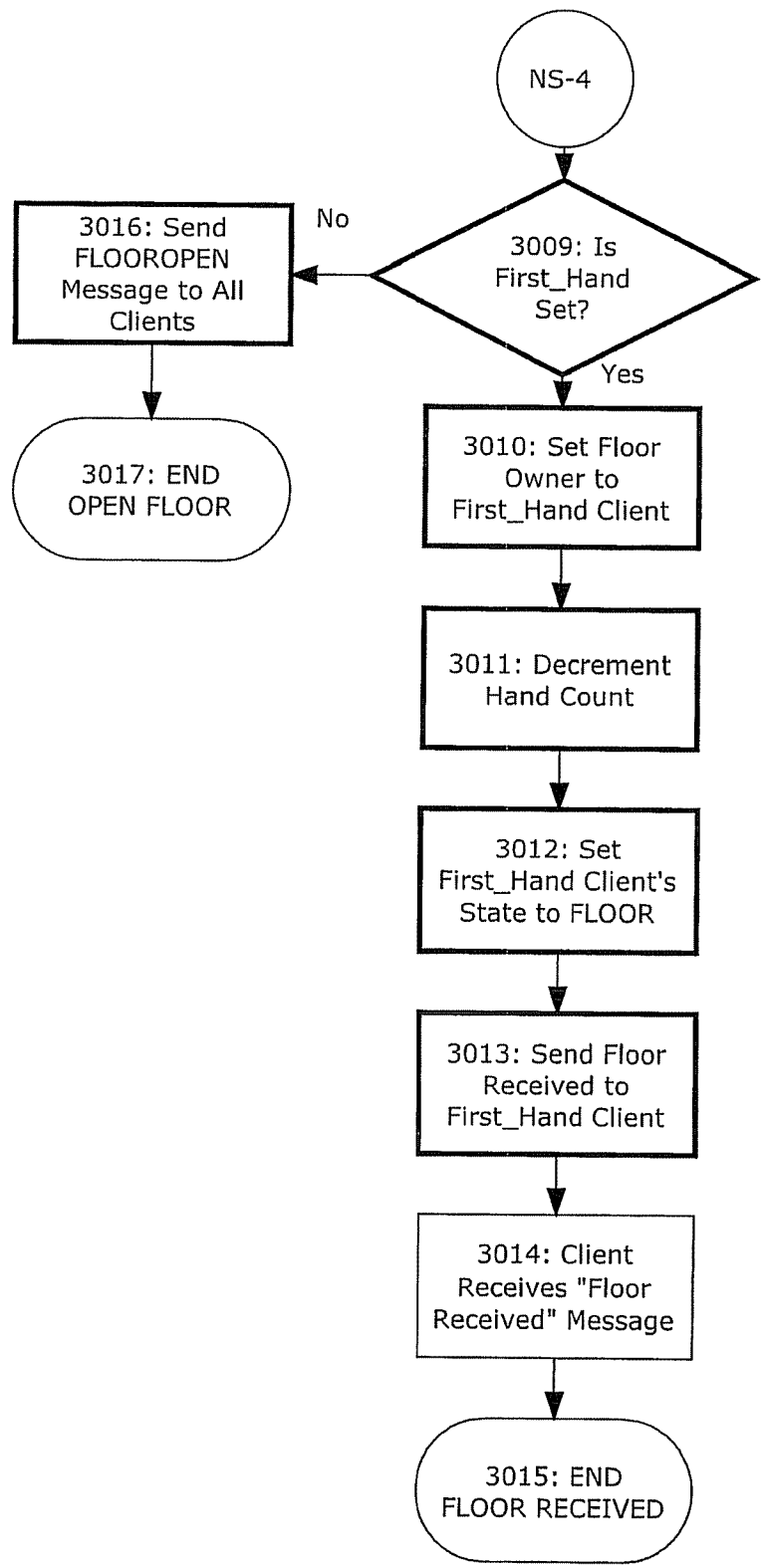
FIGURE 30b - Next Speaker

SYSTEM AND METHOD FOR INTERACTIVE INTERNET VIDEO CONFERENCING

CROSS-REFERENCE TO RELATED APPLICATIONS

This application is a continuation application of U.S. application Ser. No. 13/008,001, filed Jan. 17, 2011, which is incorporated by reference herein.

TECHNICAL FIELD

The present disclosure relates generally to person-to-person and person-to-group conferencing, using video and audio over the Internet. This technology is referred to as video conferencing.

BACKGROUND

Growth of Video Conferencing

Video conferencing over the Internet is growing more and more popular, especially as the processing power of available Internet devices such as desktop, netbook and laptop computers, Smartphones and tablets, etc. increases, and even more importantly, as available Internet bandwidth to the Internet device, either wired or wireless, increases. It is clear that this trend for use of video for business or social interaction on the Internet will continue to increase over the foreseeable future.

Current implementations of video conferencing fall into several categories: A) webcasting (one-to-many), B) video phone (one-to-one), and C) multiple person simultaneous video conference (MPSVC).

Webcasting (One-to-Many)

The first category is referred to as webcasting. In this case, the video is one way, streaming from a central location to multiple receivers or participants. Typically, feedback from the participants is limited to text via a text chat function, and in some cases the ability of the student to raise their hand to ask a text question by clicking on a button. This approach is effective for business presentations to prospective clients or customers, as well as for online lectures. This implementation is sometimes offered in conjunction with a teleconference, where all participants are typically muted during the presentation, and are allowed to ask questions via the teleconference at specific points, or at any point in the conference. Teleconferencing is typically used instead of audio over the Internet because the technical challenges of using VOIP (Voice over Internet Protocol) for multiple simultaneous callers can result in a number of problems which can cause a business presentation to end up in chaos, such as problems with feedback and echo, poor audio level, lack of the required hardware on a participant's computer, multiple people talking at the same time, etc.

Video Phone (One-to-One)

The second category is a one-to-one videoconference (aka video phone), such as offered by Skype® or FaceTime® from Apple. In this case, two individuals can talk and see each other, assuming both have webcams with built-in or external microphones. Communication in this case is bi-directional, and in some cases (with use of speakers rather than headphones) echo problems will occur, causing some difficulty. An easy solution is the use of earphones, but often the user does not have earphones available. In this case, they must reduce speaker volume, which often makes it hard to hear the other person. Some systems also exhibit sufficient delay to cause talk-over, even with only two people talking. Another solution that reduces this problem is echo cancellation done in software or hardware.

Multiple Person Simultaneous Video Conference (MPSVC)

Finally, the third category (growing in popularity), is the multiple person simultaneous videoconference (MPSVC). Here, more than two people are in a video meeting. For example, ooVoo.com offers a service that supports up to 6 people at once. Other services allow 8 or more. All of the participants can see the other participants, as well as hear them. This type of service can be utilized by a group of friends in a free-for-all discussion or meeting, or alternatively for an interactive conference. An interactive conference allows a facilitator as well as other participants to speak, hear, and be seen by the others. A facilitator (or moderator or leader) is generally a participant with extra powers.

This MPSVC category has many problems. First, it may require a very high processing performance and Internet bandwidth, as each participant must receive a separate video stream from each of the participants. There are two types of MPSVC: peer-to-peer, and central server. Alternatively, very small, low quality videos at a low frame rate may be used.

For peer-to-peer MPSVC conferencing, where no central server is involved, a group of 8 participants requires that every individual participant support 7 outgoing video streams (one to each of the other peers, all the same) and 7 incoming video streams (one distinct stream from each of the other peers). While the 7 outgoing streams are just rebroadcasts (copies) of the same stream, and thus only require being generated once by the processor, the total load on the CPU is 8 distinct streams (7 distinct incoming plus 1 distinct outgoing), there are 14 total streams on the Internet.

For central server MPSVC conferencing, typically the server receives a single incoming stream from each of the participants and resends it to all other participants. Thus, the central server receives 8 distinct streams (one from each participant), and transmits 8 outgoing streams (one from each participant).

This central server conferencing reduces the load on an individual participant computer to 8 incoming streams from the central server, and 1 outgoing stream to the central server, in the example being discussed. Thus, the central server conferencing has some scaling up advantages over the peer-to-peer conferencing.

However, in both the central server and the peer-to-peer conferencing, there are serious loads on both the participant's computer and Internet connection. These loads (in combination with the loads on the central server if used) contribute to a noticeable delay between when a participant speaks and when they are heard. The process of compressing and decompressing the video streams also contributes to the noticeable delay between the original speech and when it is heard at the destination, as does the time to transmit the audio/video stream over the internet.

In addition to the enormous load on the Internet connection and computers, the audio echo problem is dramatically increased in MPSVC conferencing. Rather than just one set of speakers and microphone (for a webcast), there are eight sets of them, each one capable of generating echoes. The time delays between when someone speaks and when the other participants hear what they are saying (typically longer for a central server solution) results in many "start-stop" conversations.

"Start-stop" conversations occur when participants hear a dead space (a silent pause), and start speaking. It can be more than a full second before a speaker realizes that a second speaker also started speaking at around the same time. Then they both stop speaking Neither of the speakers realizes this for another second or so. Thus, the cycle continues, until one decides to not speak, or tells the other to go ahead.

The combination of: a) dropped video streams from bandwidth overload, b) computer crashes from computer overload, c) echo problems causing interference with voices, and d) delays causing stop-start conversations, creates a less than stellar experience of having a multi-person simultaneous videoconference (MPSVC).

The frustration caused by these problems often leads to reverting to the tried-and-true teleconference, wherein dropouts and delays are reduced, and wherein echo problems have been solved (start-stop conversations and talk-over is still a problem in this case). While the multi-person simultaneous videoconference (MPSVC) may be feasible for chats with a few friends, it is not at all acceptable for serious use in business or for online interactive seminars.

Thus, very expensive hard-wired solutions are typically used in business situations to reduce these problems. These hard-wired solutions requiring elaborate conference room setups at all locations of the conference. While this is an option for Fortune 500 companies, it is not a viable approach for most small businesses or non-profit organizations.

Conferencing Summary

In summary, one-on-one video conferencing solutions (videophone) or one-to-many (webcast) video conferencing solutions exist and work well. In contrast, multiple participant (MPSVC) solutions are frustrating and difficult to use successfully, with the possible exception of high cost hardwired elaborate conference room setups.

Other Interactions Such as Subgroups

There are a number of types of interactions that are common in physical conferences that are not available currently for online conferences. For example, a very useful and often used approach in physical conferences or seminars is the ability to break the conference up into small groups (subgroups) for discussions or exercises. Once the discussion or exercise is completed, the conference is reassembled by the leader or facilitator into a single meeting. This may occur multiple times during a single conference, either with assigned subgroups or ad hoc subgroups. Subgroups may be static or dynamic: the meeting facilitator may request that subgroups stay together once formed for the duration of the conference (static subgroups), or may request that a new set of ad hoc subgroups be formed for each break-out (dynamic subgroups). Also, it is common for the facilitator to move around and listen in on subgroup proceedings, and in some cases interject comments to help the subgroup process along.

Multiple participant conferences can be single events, or can be a series of events over a period of time, such as part of an extended course or training. In some cases, static subgroups are maintained over multiple sessions or conferences within a larger context, such as an educational training course. In other cases, each session or conference creates a new set of subgroups. There are no known videoconference systems available that offers full dynamic and static subgroup support, including for extended, multi-event settings.

Another important issue is that most video conferencing systems are complex, and often intimidate non-expert users. This results in lost time while users are trying to figure out how to use the system, and often requires coaching via telephone to help new users get onto a conference.

What is Needed

What is needed is an easy to use mechanism for providing interactive video conferencing for a group of people that reduces the CPU and Internet bandwidth load, and addresses the echo problems and start-stop delay problems described above, while still allowing for each participant to speak, be heard, and be seen.

Secondly, what is needed is a system and method for rapid switching between speakers, automatically and easily controlled via a simple and easy to understand interface, thus allowing the system to automatically control conversation flow, and enhance interactivity. This approach is called Automatic Flow Control Video Conferencing (AFCVC). The system also should provide a way for manual override of conversation flow by a facilitator.

Thirdly, what is needed is a mechanism for creating subgroups within an interactive videoconference to enable effective discussions and small group exercises. Additionally, what is needed is a mechanism to enable group size to be independent of the load on a participant's Internet device and Internet connection, thus allowing any number of participants, only limited by the central server's ability to support conference "seats" or video streams. Additionally, what is needed is a system and method for managing both static and dynamic subgroups, both within a single event and in an extended multi-event. Finally, what is needed is an interactive video conferencing system that supports at least two methods for conference control: a facilitator central control over who has the floor, and group control of who has the floor. The latter is most suited to operation within subgroups or ad hoc conferences.

SUMMARY

Improvements

The teachings herein improve over conventional techniques by modeling the complex relationship information of an operation of an entity.

In accordance with the present disclosure, a system and method is disclosed for providing a video conferencing system that eliminates the echo problem (and its attendant earphone requirement), reduces each participant's CPU and Internet bandwidth load to a single incoming or outgoing video stream no matter how many participants are in the conference, and provides for the creation, use, and disposal of static or dynamic subgroups during an ongoing conference, including the recreation of static subgroups in multi-event cases. Additionally, the present disclosure eliminates the problem of start-stop conversations (due to delays between the speaker and the listener brought on by server, Internet, and processing delays). Finally, the present disclosure allows for both facilitator and group control of the conference in an easy to use manner.

In one example, a system and method for Internet video conferencing is provided. The method includes, generating a facilitator user interface on a display associated with a facilitator user device comprising a plurality of participant icons corresponding to a plurality of participant user devices for a conference, forming a plurality of subgroups comprising a first subgroup of the plurality of participant user devices and a second subgroup of the plurality of participant user devices, generating a participant user interface on each screen display associated with the first subgroup and the second subgroup for controlling interaction with a respective subgroup, linking each participant user device within the first subgroup with a second video signal, linking each participant user device in the second subgroup with a second video signal and intercommunicating between the first subgroup at the participant user devices without intercommunicating to the second subgroup.

Class Mode, Group Mode, and Multi-Interactive Mode

In one illustrative example with a facilitator, the facilitator controls who is speaking at any given time. This is referred to as Class Mode.

A second mode of the illustrative example provides for shared or group control of which participant is speaking. This is referred to as Group Mode. In Group Mode, each participant has less control over who is speaking at any given time (as compared to a facilitator in Class Mode).

A third mode, referred to as Multi-Interactive Mode, allows a facilitator to break up a conference into subgroups for the purpose of discussions or exercises. In this third mode, one or more facilitators can visit any subgroup to listen in or interact. Alternatively, one or more of the subgroups may be private, and exclude the facilitator from listening or interacting.

The various modes of operation will be described in greater detail below. The present disclosure permits one person at a time to speak, or have the floor, per group or subgroup. This permission may be rapidly switched between participants under the control of a facilitator, or under control of the participants, or both. Conversations within groups are private to each group.

The present disclosure allows participants to connect to the conference using: a webcam and keyboard (audio, video and text input), or just a microphone and keyboard (audio and text input), or with a keyboard (just text input). In the last case, the participant with only a keyboard cannot take the floor to audibly speak because they do not have the hardware (microphone) required for that purpose.

However, a participant with only a keyboard can send text messages (either comments or questions) to the facilitator (and/or optionally to other participants), as described below. In one example, a text-only participant can also "raise their hand" using a graphical user interface in response to a question or poll, but if selected by the current speaker, the floor will not be given to them. Instead, their "hand raised" status will be simply cleared, and if they also have a message pending then the message may be displayed to all participants. In other words, raising the hand for a text participant can only be used for responding to a poll, vote, or other form of signaling, and does not represent a request to take the floor and audibly speak. This difference may be indicated by a different graphic than used for a participant that can take the floor and raises their hand, such as a question mark or other graphic

Special Cases (Deaf Participants)

Further, these procedures may be modified for special cases (such as deaf participants), so that "taking the floor" by a participant with only a keyboard may result in text from a selected participant being continuously displayed in an image window (similar to a video image). Additionally, audio inputs from a deaf participant may be deleted or blocked, in order to prevent undesired background noise of which the deaf participant may be unaware. Blind participants may not need incoming visual streams. Additionally, word recognition software may provide continuous text to accompany the video image (and optional audio sound) of a speaker (so that deaf participants can read along, and/or to provide a text record of the conference). Although not yet commercially available, gesture recognition software may soon provide continuous text (or machine generated audio) to accompany the video of a deaf speaker who is "speaking" in sign language (such as American Standard Sign Language). The point is that a person of ordinary skill in the art will, based upon the present disclosure, understand configurations and procedures that are not expressly stated in the specification.

Facilitated Conferences

For facilitated conferences, the facilitator (or moderator, or leader) can close the conference to new participants at any time (lock the door). This feature is useful when a series of planned interactions require the participant to be present from some point forward in the conference, and having new participants join the conference after that point would be distracting and require covering ground multiple times, thus punishing participants that arrived on time. In other words, the facilitator can lock the door against new participants.

As described above, conference participants may indicate the desire to speak by raising their hand. Participants may also submit text messages (questions or comments) at any time, even if they also have video and/or audio capability. All participants may see a list of conference participants, as well as their status, such as if they are requesting permission to speak (raised hand) or have submitted a text message (message pending). Alternatively, text messages are automatically displayed in chat format. The facilitator may block such chat traffic if desired. A request to speak (hand raised condition) is generated by a control device, such as touching a button on a touchscreen, clicking on a button (in a graphical user interface), tapping on a specific key (or combination of keys) on a keyboard, or other control apparent to one skilled in the art.

As described above, the raising of hands is also a useful polling or voting mechanism, such as the facilitator asking "How many did the homework?" A way for the facilitator to clear all raised hands in a single operation is provided in one example, which facilitates additional votes, and which removes the burden on each participant to actively lower his hand after voting. Alternatively (or additionally), hands may be automatically lowered after a given period of time, such as 20 seconds.

The current speaker (the participant on the floor) can grant the floor, i.e., give another participant the opportunity to speak, to any participant with the exception of a text-only participant as described above. Alternatively, the current speaker may relinquish the floor by clicking on or touching a control such as a button or icon or by pressing a key or combination of keys. In this case, where one or more attendees have raised hands, the present disclosure will automatically transfer the floor to the first person that raised their hand (automatic flow control).

Granting permission to speak (transferring the floor) is thus performed by using a control such as touching or clicking on the selected participant in the participant list or by releasing or relinquishing the floor. Revoking permission, or taking back the floor, is performed by a facilitator using a control such as clicking or touching their own icon or name in the participant list, or other manners of control. Generally, only a facilitator has this ability to force termination of another participant's position on the floor.

Additionally, a participant that has the floor can return the floor back to the facilitator by a control device such as clicking or touching a button, pressing the space bar or by some other control. When multiple facilitators are present, the floor may be returned to the facilitator that most recently had the floor, or to the facilitator that set up the meeting (the owner). Alternatively, releasing the floor does not transfer the floor, rather, additional action must be taken by a participant to take the open floor. In a non-facilitated conference, this same action will release the floor without transferring the floor to another participant, unless one or more hands are raised (requests to speak). In that case, the first participant that raised their hand will receive the floor. Various control devices for these functions will be apparent to one skilled in the art. For example, in a non-facilitated conference including tenured teachers, the teacher with the longest tenure that has their hand raised may receive the floor. Alternatively, participants may bid money (through a credit card or similar) for the opportunity to speak next on the floor, where the highest bid receives the floor. The bid money may be donated to a charity.

As described above, multiple facilitators are also supported. In one example, all facilitators can assert the floor at any time, including taking the floor from another facilitator. Naturally, this feature should be used with restraint. This is referred to the "play nice" rule for facilitators.

An alternate example allows only one facilitator to have full control at one time (and the controlling facilitator may transfer the control to another facilitator). Or, somewhat similar to the tenured teachers, the facilitators may have a hierarchy of control wherein higher facilitators may take the floor from lower facilitators, but not the reverse.

The proposed system generally has a single video stream per participant Internet device, and that single video stream is either incoming (the participant is viewing and hearing another participant, or the facilitator, or a notification or instructional video, or similar), or outgoing (the participant has the floor, and is speaking and being viewed by other participants, or is playing a video for the other participants). The system also supports participants with audio input only (no webcam), wherein a photo of the participant, a placeholder icon, or a notification video may be displayed rather than a video of the participant speaking. Alternatively, if the current speaker is audio-only, a graphic "Audio Only" is displayed in place of the video. A "Floor Open" graphic may be displayed when no one has the floor.

In one example, the central server logic may be simplified by sending the speaker video stream to all participants (including the speaker). In this case, the speaking participant may use the speaker video stream from the central server for visual feedback (very useful), or may verify that the central server is properly sending the speaker video stream showing his face (verify that he is "on TV"), or may ignore the speaker video stream from the central server. In this case, only the speaking participant would have two streams (his speaking outgoing stream plus the repeated speaker stream from the central server), and all other participants would have a single stream only, as discussed above.

Even if the central server does not send the speaker video stream to all participants, the speaker may still receive visual feedback by monitoring his own outgoing speaker video stream. This is one example, because of the potential for confusion from the round-trip delay in the video if send to and received back from the server.

Subgroups

A Multi-Interactive conference that has broken into subgroups will also have a single video stream per participant Internet device. However, there will be multiple video sources to and multiple video sources from the central server during subgroups. For each subgroup, there will be a distinct video stream from the speaker in each subgroup (or a notification or instructional video) going to the other subgroup members in the same subgroup. Thus, the central server will receive one stream for each subgroup (the speaking subgroup member), and will transmit this same stream to the nonspeaking members of the same subgroup.

Eliminate Problems

Because the present disclosure utilizes one or more rapidly redirectable one-way video streams, the echo problems (and the attendant requirement for earphones) and the "start-stop" problems are eliminated completely. The delay when the floor is being transferred from one participant to another actually helps maintain a smooth flow of conversation because it is clear when you are to speak and when you are to listen. Specifically, graphical and other ways may be used to signal to a participant when they have the floor, such as a specific sound ("a rising beep sound") or a change in the displayed user interface (such as a flashing icon in a status panel). The present disclosure also eliminates talk-over and start-stop conversations, where multiple people are talking (or attempting to talk) at the same time. This is especially problematic for prior art multiple participant videoconferences (MPSVC) during discussions.

An additional feature of the present disclosure is the delayed video stream termination feature. This feature overcomes the problem of the differential in speed between the video stream and control signals between the client application and the server. Specifically, the user's action, such as clicking on a user interface element, will be nearly instantaneously transmitted to the server, while outgoing video is delayed by the compression, packing, and protocol management for transmission of the video stream. Thus, if the floor is revoked immediately upon receiving a transfer or release, the last portion of time in the streaming video will be cut off. The delayed video stream termination feature waits a set period of time after receiving the command before terminating the outgoing video stream. Other dynamic methods are available to one skilled in the art, such as watching the incoming data stream and looking for an end before taking action at the server.

Also, because only a single video stream is being either received or sent from each participant's Internet device at one time, the processing load and Internet bandwidth load for each participant's Internet device is very low (approximately half the load of a one-on-one video conference in the prior art, wherein both an incoming and an outgoing stream are simultaneously required). Additionally, the processing load and bandwidth load for each participant's device is completely independent of the number of participants in the conference.

Optionally, a listening participant's device may regularly (perhaps once a minute, or once every few seconds) transmit a small image so that a thumbnail image may be displayed and regularly updated on the graphical user interface adjacent to the name of the participant. This kind of data load is minimal, but may be useful for spotting when listeners are falling asleep during a classroom conference, or are not actively participating. An alternate example would be to enable a facilitator to access these images by a control device, such as hovering their cursor over the participant's name, or clicking or touching their name, for example. This feature may only be available to a facilitator, and the images may only be transmitted from a server to the facilitator's Internet device when so requested. In another example, the control device may send a request for a thumbnail image when activated by the facilitator. In this case, images may only be transmitted when requested by the facilitator. The drawback to this approach is the slight delay between activating the control device and receiving the image. The advantage is that no bandwidth is taken to send images unless specifically requested. In all cases, the ability of a facilitator to monitor participants is provided without requiring video streams from each participant simultaneously.

One example also includes a mechanism that manages connection interruptions and failures. This mechanism includes a polling technique, described in more detail below. This mechanism allows the client applications to detect a disconnect from the server caused by Internet traffic interruption, and automatically reconnect (or attempt to reconnect). Likewise, the server may use this mechanism to automatically detect lost connections to signal that a participant is no longer present, such as removing them from the attendee list, changing the color of the attendee's name, or other methods known to one of ordinary skill in the art.

Two Way Video Streams

Although less efficient, an alternative example may utilize two way video streams. For example, each attendee device may continuously output its outgoing video stream to the server. The server may select the appropriate video stream (the video stream from the speaker with the floor) and send the selected video stream to all of the attendees (or perhaps to all of the attendees except the speaker attendee). In this fashion, each attendee would receive one stream, and send one stream.

The server would receive many streams, but only needs to process (and send out) the stream of the speaker. This two way video streaming method requires about twice as much bandwidth as the one-way video streaming example.

This two way video stream example does have some minor advantages, such as not needing overhead (control) for switching on and off the video streams of the attendee devices (which can remain on). Also, this two-way example allows the server to more quickly switch from a first video stream to a second video stream, because the server does not have to send a command to the second attendee device to start sending the second video stream (and does not have to wait for the second attendee device to obey the command). However, the switchover must still take into account the time delay between the received command and the video streaming from the speaker, as well as the time delay of the next speaker receiving and viewing the same video. A switching delay must take into accounts both delays to avoid transmitting the last few words from the speaker heard via the microphone of the next speaker when switching to their video stream.

Finally, the server can monitor incoming video streams to detect the loss of connection or other technical problems more quickly, and automatically handle them in some cases. For example, a lost video stream may cause the attendee's name in the displayed list to turn red, indicating trouble. This approach would replace the polling mechanism of the previous example, thus simplifying both the server programming and the client programming and complexity.

However, these advantages generally do not justify the doubled bandwidth required for two way video in comparison to one-way video, and requires substantial increase in bandwidth at the server.

Downloaded Application

This present disclosure may utilize a central video-streaming server that receives the incoming video from the participant or facilitator currently having the floor, and sends the received video data out to the other participants in the conference. If no one has the floor, a "no speaker" notification video loop may be presented in place of a participant video, or a graphic may be displayed including the text Floor Open, for example. This central video-streaming server may be also responsible for switching the floor to the appropriate participant (or participants when multiple subgroups are involved) under the direction of control received from facilitators or participants. In one example, participant control and user interface are provided by a downloaded client application from the website providing the conferencing service. This downloaded client application then connects to the central server, and the downloaded client application is then responsive to the user actions and interactions with the central server. In an alternate example, an application may have been previously received or downloaded, and is launched for the purpose of connecting to the videoconference. An example of this would be a video conferencing application purchased in an online store and downloaded to a tablet or smartphone.

The processing load on the central server is approximately linearly proportional to the number of participants in the conference. This processing load may be controlled by limiting the number of participants (or "conference seats") that are allowed on the server at any given time as part of the conference scheduling function.

The downloaded application for use on the participant's Internet device can be provided using multiple technologies. Typically, however, a CPU-independent technology, such as Adobe Flash® or Sun Microsystems' Java®, is used to maximize the compatibility of the downloaded application to the various possible Internet devices that might be used by various participants. The alternate example, an installed application, may also be acquired by the Internet device owner and installed in the device prior to the use in a videoconference.

Dynamic Subgroups

Within a given conference, subgroups are formed by organizing a set of separate rooms for the subgroups dynamically. Each room has a predetermined number of participants, selected either by the system, by a facilitator, or by ad hoc grouping controlled by a facilitator. Each room becomes a separate (almost independent) videoconference, typically with control mechanisms to support subgroup control of the floor. A facilitator generally has the ability to "visit" any room to hear and see what is going on, and to interject comments.

Subgroup termination can be: automatic by "time out" based on a predetermined period of time, or by subgroup action, or by facilitator action, or by a combination of the above. Automatic termination may be controlled by a timer countdown optionally visible on all participant user interfaces, and termination may be instant, i.e., cutting off any in-process conversations within the subgroups.

Alternatively, the timer countdown is for reference only, and the facilitator can post a text message to finish up quickly and return to the main conference. In one example, such messages to the entire conference from a facilitator may be emphasized via the generation of an alert sound (and/or a flashing visual signal). When "finish up" message is received, the subgroups can choose when to return to the main conference. However, a facilitator can also force the return at any time of some or all participants. In either case, a facilitator generally automatically has the floor to continue the main conference. Alternatively, a facilitator takes the floor when they are ready to begin.

The present disclosure also supports requests to extend the time for a conference. Extensions generally are granted if sufficient conference seats are available at the central server (if the server has sufficient capacity, and perhaps if the conference participants have sufficient money or has pre-paid for seat time, or has an unlimited meeting account). In one example, only the facilitator has this capability for extending the time of the conference. In an alternate example, all participants have the ability to request an extension of the conference.

Options for Subgroup Formation

A facilitator generally has multiple options for subgroup formation, selectable in the facilitator user interface. The size and composition of subgroups will depend on what the facilitator is asking the subgroup to do. For example, some small group exercises work best with 2 participants (dyads), others with 3 participants (triads), etc. The present disclosure also supports the dynamic configuration of dyads, called a mill. A mill is a series of dyad interactions, where each participant interacts with as many other participants as time allows. In a mill, dyads are generally formed randomly by the system. Alternatively dyads may be formed in some non-random fashion. For example, in a dating mill, the dyads may be formed by an artificial intelligence engine that determines the dyads based on participant compatibility, such as by sex, age, or other factors.

Interactions within the dyad are controlled by the participants, and termination of the dyad is also controlled by the participants, by mutual agreement, as described below. Alternatively, dyads may be terminated by a single participant (effectively "leaving the room" or "ditching the date"), or by a predetermined period of time ending, or in other ways.

When a dyad is terminated within a mill, the system connects each available, unconnected participant to another available participant in a random manner. The system keeps track of which participant has connected with which other participant, so subsequent dyads are always "first time" with the other participant for the current mill. A mill is terminated by a timer countdown, or by facilitator action, or by a lack of new dyads, or in other ways. Text (or audio or graphic) warnings to finish up are also supported, as with normal subgroups.

One example automatically forms subgroups randomly, and allows facilitators to reconfigure the groups by a control, such as by dragging participant icons from one subgroup to another. Other control approaches will be apparent to one skilled in the art. The system may be set to automatically retain subgroups (static subgroup formation), or to create new subgroups each time that the main group breaks up within a given conference (dynamic subgroup formation) or within a related set of conferences. In one example, this static or dynamic condition is set as a preference by the facilitator when scheduling the conference. Also set by preference is the option to maintain the same subgroups in subsequent conferences with the same participants (for example, in the case of weekly conferences for a specific subject such as a college class, or for regular religious activities). Subgroups, once formed, can be reused within a single conference, or can be replaced with new subgroups of the same or different size, under the control of a facilitator. Subgroup information for static groups is maintained in a database, along with other information that controls the use of the conferencing system.

Static subgroups can be maintained while still allowing dynamic groups for specific occasions. This is a valuable tool when a conference facilitator wishes to create "home" groups that will work together throughout the conference, but allow dynamic groups for certain exercises, such as for a mill, or for certain purposes. The system may also support multiple types of static groups, and allow a facilitator to name them and choose between them and dynamic groups for each breakout session. Static groups also may be pre-defined and named prior to the conference or conference series by facilitators, and can be edited by a facilitator at any time.

Setting up and using subgroups requires a first step wherein a facilitator initiates the formation of the subgroups, while the full group is still present in the main conference room. The facilitators and other participants can view the subgroups in the provided attendee lists, allowing for adjustments for special cases by a facilitator, such as not wanting spouses to be in the same subgroup. Group auto-formation can also be controlled by age, sex, or any other item of information available from participant profiles. This is referred to as profile-based subgroup formation. This profile-based logic may also be applied to dyad formation.

Regarding terminology, a "facilitator" is generally a participant with special facilitation powers. An attendee is generally an ordinary participant without facilitation powers. Thus, there must be at least two participants for the system to function. However, generally the participants comprise at least one facilitator and at least two attendees.

Once satisfactory subgroups are formed, and the facilitator has instructed the participants on what they are supposed to do in their subgroups, then the facilitator commands the system to instantiate the subgroups (subgroup break-out) using a control, and subgroup interactions begin. If desired, the facilitator may specify the grouping as a static group, and assign a name so it can be invoked again in the future. The subgroup generally begins with no speaker selected. Alternatively, the system or the facilitator can select the first speaker. Each subgroup may have a sub-facilitator, which may be selected randomly, by the facilitator, or by some other logic such as profile based, or by agreement between the subgroup members.

Maintaining Static Groups Across Multiple Conferences

As stated earlier, a dynamic grouping can be saved for future use, and assigned a name. Within a given conference, a facilitator can reform this same group configuration by selecting it. This allows them, for example, to form static "home" groups that are reused multiple times, interspersed with dynamic and/or other static configurations.

In order to support static groups across multiple conferences, a Repeat Conference function is provided. This can be used with or without static groups, and allows a continuing meeting, such as a weekly staff meeting to use the same event code (or a similar event code, such as with a changed suffix). When repeating a conference, it copies all of the settings from the conference into the new conference, but moves the start date up one week. The start date can of course be changed, as desired. This repeat conference function is available from a Conference or Event History, which lists all conferences scheduled by the owner, including future events. Thus, a conference owner can set up a series of meetings all in the future, or set up the next meeting after the current one has completed.

If a series of conferences are set up using the same unique event code, all static group definitions saved will be available to each successive conference. Of course once loaded, they can be modified and resaved under the same or different name, as needed. Thus, static groups can persist over multiple conferences.

Additional Advantages

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

DRAWINGS

The drawing figures depict one or more implementations in accordance with the present teachings, by way of example only, not by way of limitation. In the figures, like reference numerals refer to the same or similar elements.

FIG. 1 is a block diagram of an interactive video conferencing system.

FIG. 2 is a block diagram of the software on the user Internet device.

FIG. 3 is a block diagram of the software stack on the web server.

FIG. 4 is a block diagram of the software on the video-streaming server.

FIG. 5 is a facilitator user interface, with a facilitator speaking to the attendees.

FIG. 6 is the facilitator user interface, with the facilitator listening to a student.

FIG. 7 is an attendee user interface, with a hand raised.

FIG. 8 is an attendee user interface, with a message pending.

FIG. 9 is an attendee user interface, with a message displayed.

FIG. 10 illustrates multiple conference modes.

FIG. 11 illustrates multiple action commands.

FIG. 12a illustrates a first portion of a conference start request diagram.

FIG. 12b illustrates a second portion of the conference start request diagram.

FIG. 12c illustrates a third portion of the conference start request diagram.

FIG. 12d illustrates a fourth portion of the conference start request diagram.

FIG. 13a illustrates a graphical user interface, with one hand counted.

FIG. 13b illustrates another graphical user interface.

FIG. 14a is a first portion of a sign-in diagram.

FIG. 14b is a second portion of a sign-in diagram.

FIG. 14c is a third portion of a sign-in diagram.

FIG. 15 is a registration diagram.

FIG. 16 is a mobile/partner sign-in/registration.

FIG. 17 is an embedded conference.

FIG. 18 is a client connecting to server.

FIG. 19 is a client manage connection diagram.

FIG. 20 is a server manage connection diagram.

FIG. 21 is a conference validation diagram.

FIG. 22 shows a first and second audio/video stream connection.

FIG. 23 shows a third and fourth audio/video stream connection.

FIG. 24 shows a take floor interface.

FIG. 25 is a settings panel.

FIG. 26 is a diagram to initiate a floor change.

FIG. 27 is a diagram to raise hand and take floor.

FIG. 28 is a diagram to lower hand.

FIG. 29 is a diagram to release the floor.

FIG. 30a shows a first portion of going to the next speaker.

FIG. 30b shows a second portion of going to the next speaker.

DETAILED DESCRIPTION

Stable Video Conferencing

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Terminology

The terms "attendee" and "participant" and "user" and "client" are used broadly throughout the specification and claims to include anyone who has connected to a given conference. This includes both facilitators as well as non-facilitators. Depending upon the context (such as in the context of the term "facilitator"), the terms "attendee" and "participant" may be used to indicate non-facilitators.

The terms "facilitator" and "moderator" are used broadly throughout the specification and claims to include a conference attendee that has additional capabilities, such as the ability to control who has the floor at any time, as well as other controls. Other similar terms include "teacher," "mentor," "instructor" for example.

An attendee can be either a facilitator or not a facilitator. Thus, the term "non-facilitator" is used broadly throughout the specification and claims to include an attendee that is not a facilitator.

The term "state" is used in the claims to describe, for example a first state wherein a first attendee is selected as a speaker, and a second state wherein a second attendee is selected as a speaker. Transitional states between the first state and the second state may be allowed. For example, releasing the floor transitions from the state of having the floor to the state where local transmission of video has been terminated, to the state where the message that the floor has been released is sent to the server, to the state where the server has terminated the incoming video stream, to the state where the server has sent out the message that the floor is open, to the state where each client application receives the message and displays the new state.

Additionally, the terms "selecting" and "deselecting" are used broadly. For example, an attendee may deselect themselves (yield the floor), and the system may enter a transitory state waiting for another attendee to select themselves (take the floor).

Further, a facilitator attendee may seize the floor by selecting themselves (and automatically deselecting the current speaker). For example, the facilitator may seize the floor by simply clicking a "take floor" button, or by clicking on their own name in the attendee list. Additionally, the facilitator may transfer the floor from the current speaker to another attendee by clicking on the desired attendee name in the list. Typically, this type of control is only available to a facilitator, and not to non-facilitators, and is included in the term "manual conversation flow control."

Stable Video Conferencing

The present disclosure relates to delivering stable video conferencing to multiple participants, allowing for subgroup formation and interaction under facilitator observation and control, or alternatively group control of a video conference, while at the same time reducing or eliminating the normal problems of multi-party video conferencing systems, including delays, overload of Internet devices and Internet connections, start-stop conversations, echoes and attendant requirements for use of earphones. The following description is presented to enable one of ordinary skill in the art to make and use the disclosure and is provided in the context of a patent application and its requirements. Various modifications to one example will be readily apparent to those skilled in the art and the generic principles herein may be applied to other examples. Thus, the present disclosure is not intended to be limited to the example shown but is to be accorded the widest scope consistent with the principles and features described herein. For example, the present disclosure applies to communication systems such as local area network and wireless systems, in addition to Internet communication systems.

The present disclosure comprises a system and method for providing a highly reliable and stable video conferencing system for an interactive, live conference with multiple participants, and to optionally provide for small group formation for subgroup interactions and exercises within a larger conference. The present disclosure is specifically designed to overcome the primary hurdles to use of video conferencing for such interactive conferences, including echoes, delays, start-stop conversations, and CPU and Internet bandwidth overload.

FIG. 1 (System)

FIG. 1 is a block diagram of an interactive video conferencing system.

Referring to FIG. 1, the Video Conferencing System Diagram 100 shows multiple participants 108 using various types of Internet devices 104, 105, 106, 107 to connect to the World Wide Web 101 via wired or wireless connections 110. The disclosure can also be practiced on a local or private network. Internet devices shown are desktop computer 104, laptop computer 105, touch-screen device 106, and Smartphone 107. Other types of Internet devices also can be used, as well. Each of the Internet devices 104-107 are connected to the World Wide Web 101, which is also connected to the web server 102, video streaming server 103, and optionally a database server 110. In an alternate example, the web server 102 and video server 103 functions can be combined on the same server, or can be distributed on any number of servers, using standard techniques well known in the art for configuring servers to handle loads beyond the capacity of a single server. In another alternate example, the database server 110 and web server 102 are combined and run on the same server hardware, and the video server 103 is hosted on a separate hardware platform. Many different configurations are possible and will be apparent to one skilled in the art, but the functionality of a web server 102 and video-streaming server 103 are required.

The functions of the database server 110 can be provided in various ways apparent to one skilled in the art. Alternate examples for the database server 110 include configurations where the required information normally stored in a database and provided via a defined programming interface or protocol in the one example is instead stored in temporary memory on the web server 102 or on the Internet device 104-107. Standard storage mechanisms include session variables on the web server 102, cookies on the participant Internet device 104-107, and query string values stored in web page requests sent from the Internet device 104-107 to the web server 102 from information originally delivered to the Internet device 104-107 within a requested web page from the web server 102. Other data storage and retrieval mechanisms are also possible in alternate examples of the present disclosure, and will be apparent to one skilled in the art.

In one example, the web server 102 communicates with the database server 110 in order to provide the integrated functions of the present disclosure, such as keeping track of scheduled conferences, keeping track of participants, limiting participants based on some criteria, such as participants who have signed up or fulfilled some other prerequisite for the conference, using profile-based subgroup formation, etc. The database server 110 maintains a database of information that can be accessed and modified by the web server 102, and also may include programming code that can be initiated by the web server 102. An example of programming code is Structured Query Language (SQL), available from companies such as Microsoft Corporation of Seattle Wash., as well as many others. This programming code can be transmitted to the database server 110 from the web server 102, or can be stored on the database server 110 as stored procedures that can be launched from the web server 102 using communication protocols apparent to one skilled in the art.

In the one example, the participant Internet device 104-107 also communicates with the video server 103. This communication is provided via a component of the video conferencing system 100, described below.

In alternate examples, other communication modes may be used, such as communication between the participant Internet device 104-107 and the database server 110, and between the video server 103 and the database server 110, or between the web server 102 and the video server 103.

The present disclosure operates within the environment 100 described above, interconnected via the World Wide Web 101 or alternatively, on a private network. The present disclosure, thus, may execute programming code on the Internet devices 104-107 that is downloaded from the web server 102 interacting with programming code executing on the web server 102, and also interacting with programming code executing on video streaming server 103. In one example, web server 102 also initiates programming code on the database server 110. Each of the components of the present disclosure will be described in association with FIGS. 2, 3, and 4 below. In an alternate example, programming on the Internet device 104, 105, 106, 107 may be acquired and pre-installed prior to a first videoconference, using standard methods known to one of ordinary skill in the art.

FIG. 2 (Software on Device)

FIG. 2 is a block diagram of the software on the user Internet device.

Referring to FIG. 2, User Internet Device Software/Hardware Stack 200 shows the configuration of the typical Internet device 104-107. Many other configurations are possible, depending on the cost point for the device, size and weight, and other considerations. However, all Internet devices have similar functionality as shown in FIG. 2.

Each Internet device 200 is based on specific hardware 201, which typically includes processors and memory, as well as a display device, control devices such as a touch screen or keyboard and function keys or keyboard and mouse, and a webcam and microphone. Other hardware components will also be included, depending on the target market for the device. For example, in the case of the Smartphone 107, a cellular radio transceiver will be included in the hardware. For a desktop computer 104, a hard drive or solid-state drive will be included, along with a wireless or wired Internet connection. Each of these configurations of Internet devices has a minimum configuration including a webcam, a microphone, a processor, memory, and an ability to connect to the Internet via Internet connections 110. Alternate minimum configurations include only a microphone (no webcam) and/or only text entry.

In the one example, Internet devices 104-107 will have a well-defined hardware driver layer 202 to separate from the operating system layer 203 functions that are dependent on the specific features and operation of the particular hardware devices included in hardware 201. This is also referred to as the "hardware abstraction layer" in that the interface provided by the hardware driver layer to the Operating System layer 203 above remains constant even when changing to different hardware, matched with its hardware driver.

The operating system (OS) 203 is responsible for handling the many I/O (input/output) services and functions that are typically required by the Internet device. This typically includes routines for displaying graphical user interfaces, processing control inputs from the participant, handling the interactions with the Internet connection, handling audio and video input and output, including video and audio compression and decompression, and adhering to various standards, such as Internet communications protocols and data protocols, such as MP3 for audio, MPEG for video, etc. The OS 203 may do these functions in software, or via a combination of driver and hardware, or even in some cases, entire functions may be implemented in hardware.

The OS 203 provides an Application Programming Interface (API) that is standardized, and typically widely available for programmers to utilize in creating Application Programs to execute on the Internet devices. This standardization is important because many tools and documentation are required to support programmers using the API effectively. Examples of several widely used operating systems include: Windows from Microsoft Corporation in Seattle, Wash., Mac OS X from Apple, Inc. in Cupertino, Calif., and Solaris from Sun Microsystems in Santa Clara, Calif. Smaller devices might use VxWorks from Wind River Corporation of Alameda, Calif., Palm OS from Palm, Inc. of Sunnyvale, Calif., or Android from Google in Mountain View, Calif., or iOS from Apple, Inc. in Cupertino, Calif., or other lightweight operating systems to reduce cost and improve performance. Other alternate examples include an integrated application that is designed specifically to execute directly on the hardware 201, or other blending of the various layers of the one example software stack shown in FIG. 2, all such variations apparent to one skilled in the art.

In one example, one application that is available to be executed on the OS 203 layer is an Internet browser 204. This application program is capable of connecting to web servers from many organizations and displaying documents according to standard languages, such as HTML, JavaScript, and others. The browser in one example connects to the web server 102 and displays an interface to the user that allows the user to launch the video conferencing application described herein. This operation is typically initiated via a hyperlink or via a button on a web page served to the Internet device 104-107 by web server 102.

One of the common functions of a browser 204 is the ability to support plug-ins to expand the function of the browser. One such plug-in utilized by the one example is called a Virtual Machine Browser plug-in 205a. An example of this type of plug-in is the Adobe Flash player, from Adobe Corporation of San Jose, Calif. The plug-in provides an Application Programming Interface (API) or a scripting language interpreter or some other standardized way for a custom application to be developed that runs within the plug-in 205a environment.

In one example, the conferencing application 206a is downloaded from the web server 102 in one of several ways apparent to one skilled in the art, and runs within the virtual machine browser plug-in 205a environment. One way to accomplish the download is to embed an object in the HTML code of a web page delivered to the Internet device 104-107 by the web server 102. Another way is for script programming embedded within the HTML page code to initiate the download. An alternate example is a conferencing application that directly communicates with the Operating System 203, and has been compiled into the instruction set of the specific Internet device's processor.

Once the conferencing application 206a is downloaded and launched, the participant 108 is able to view the user interface and functionality of the conferencing application 206a. The conferencing application 206a may communicate with the web server 102, the database server 110, and the video server 103. In one example, the conferencing application 206a receives information from the web server 102 during the launch of the application 206a in the form of query string variables, and once launched, primarily communicates with the video server 103. Additional information about the pending conference or the user may be requested by the conferencing application from the web server 102. This information may be retrieved from database server 110 or some other source, and returned to the conference application in various ways known to one skilled in the art, such as XML, for example. As described above, many other alternate examples are possible that utilize a larger set of the possible communication paths between the four primary components of the video conferencing application 100 (web server 102, optional database server 110, video server 103, and participant Internet device 104-107).

An alternate example of the present disclosure is shown in FIG. 2 via blocks 205b and 206b, which replace blocks 204, 205a, and 206a. In this case, a separate web browser 204 application is not required, although typically many of the functions of a web browser 204 will be included in the optional virtual machine application 205b or provided by the underlying OS layer 203. This example communicates with the video server 103 as in one example, and may or may not communicate with the web server 102 or a database server 110. In one example, the function of the web server 102 is to provide an interface to control the launch of and downloading of the conferencing application 206a. In this alternate example, a similar interface and control is provided within the OS 203 to launch the application 206b. An example of this alternate example is a conferencing application downloaded by the user from the application store, such as the Apple App Store® or Google Marketplace®, and launched by the user via a touch-screen button.

A database server 110 connection between either the conferencing application 206b or the video server 103 or both may exist in this alternate example. In the one example, the purpose of the database server 110 is to maintain and supply information to control access to the video conferencing services, such as limiting the number of participants using the video service at any given time, keeping track of scheduled conferences, and keeping track of valid participants. This function can be embedded in the video server 103, or can be provided as a separate function in a database server 110 as in one example. Another function that requires access to the conference schedule, typically stored in the database server 110, is the function to respond to a request to an extension of time in the conference. In one example, this type of request is granted if conference seats are available according to the schedule, and the requestor's account allows it. Other ways of determining suitability of extending a conference will be apparent to one skilled in the art.

The operation of an Internet device, such as Internet device 104-107 will be apparent to those skilled in the art, and will not be described in more detail herein.

FIG. 3 (Software on Web Server)

FIG. 3 is a block diagram of the software stack on the web server.

Referring to FIG. 3, Web Server Software Stack 300 shows the configuration of the web server 103 in one example. The stack 300 runs on a provided hardware platform (not shown), and includes the same type of hardware drivers 302 and Operating System 303 as described in FIG. 2. The specific OS 303 and drivers 302 are typically not the same as OS 203 and drivers 202. For example, the Internet device 200 may be using an operating system from Google, Inc. of Mountain View, Calif., and the web server may be using an operating system from Sun Microsystems, Inc. from Santa Clara, Calif. In fact, hardware 201 may use an entirely different processor instruction set than the Internet device 104-107, or the database server 110, or the video server 103. In fact, the purpose of the layered software and the various communication protocols and languages, such as HTML, JavaScript, and Java, for example, is to free implementations of the various components of the video conferencing system 100 from limitations such as requiring a specific processor instruction set or operating system.

Running on top of the OS 303 is the web server 304. This software receives requests from the Internet connection, such as HTTP requests, FTP requests, and other types of requests, and processes them. The result is delivered back to the requestor via the Internet connection. The specific operation of a web server will be apparent to those skilled in the art, and thus will not be described in more detail herein.

Resident on the web server 102, as shown in software stack 300 is the web application 305 and the downloadable conferencing application 304. The web application 305 is a collection of web pages, using technology such as Active Server Pages (ASP or ASP.NET) from Microsoft Corporation, utilizing various scripting languages, such as Visual Basic or C#, or PHP, a freeware scripting language. The purpose of such technology is to deliver dynamic web pages, i.e., web pages where content is derived from information, typically from a database or multiple databases and other information sources, such as cookies and session variables. A web application 305 will be apparent to those skilled in the art, and thus will not be described in more detail herein.

Also resident and available to the web application 305 is the Downloadable Conferencing Application 304. In the preferred example, this is created with tools from Adobe Corporation using their Flash® and/or Flex® technology. Other similar technologies exist, such as those based on Sun Microsystems's Java, for example. The choice of technology is primarily driven by the likely availability of the appropriate virtual machine browser plug-in on the participant's Internet device 104-107. The installed base for Flash® technology is well over 90%, thus making it a very good choice for the one example.

The Downloadable Conferencing Application 304 is automatically downloaded by the Internet Browser 204 in the one example using techniques described above. Once downloaded to the participant's Internet device 104-107, it becomes the Downloaded Conferencing Application 206a. This application then receives information from the web server 102 as described above, including values in the query string, cookies, or via a reference to the data stored in the database server 110. These various methods will be apparent to one skilled in the art, and will not be described in detail herein.

FIG. 4 (Software on Video Server)

FIG. 4 is a block diagram of the software on the video-streaming server.

Referring to FIG. 4, Streaming Video Server Software Stack 400 shows a similar software stack as shown for the web server 102, and is a block diagram of the software for the video server 103. This software stack 400 also includes a driver layer 402 to interface to the server hardware (not shown), an Operating System 403, and a video streaming application 404. The video streaming application 404 is provided from a supplier such as Adobe Corporation, and provides the capability for hosting multiple video and audio streams coming in and going out to the various participants' Internet devices 104-107. This video streaming application 404 also provides a compliant scripting engine 405, for the purpose of enabling conferencing applications to be created by programmers with features and capabilities of their own design and choosing. The Compliant Scripting Engine 405 and video streaming application 404 also provide mechanism for the various copies of the downloaded conferencing application 206a or the Conferencing Application 206b to communicate. The operation and function of the video streaming application 404 and the compliant scripting engine 405 will be apparent to one skilled in the art, and will not be described in detail herein.

Running on the Compliant Scripting Engine 405 is the Video Conferencing Application Script 406. This script, working in conjunction with the Downloaded Conferencing Application 206a or the Conferencing Application 206b provides the unique functions of the present disclosure, all of which are running on standard systems, such as the participants' Internet device 104-107 and video server 103. An alternate example is a compiled program as the Video Conferencing Application. Another example is a compiled program that includes both the Video Conferencing Application and Video Streaming Application functions combined, running on the Operating System 403.

In one example, once the Downloaded Conferencing Application 206a or the Conferencing Application 206b is launched, and any required information is provided, either from the web server 102 for application 206a, or in other ways for application 206b, such as the user providing the information, or the information extracted from a database server 110 using the user login information provided by the user, no additional interaction with the web server 102 is required. All interactions during the videoconference may take place within the application 206a or 206b in conjunction with the video server 103. An example of an exception to this may be the request to extend the conference, as described above.

In alternate examples, additional communications may be desired, such as informing the web server 102 or the database server 110, or the database server 110 via the web server 102 or the video server 103 when a user is quitting the application 206a or 206b. This information can also be generated by the video server 103 when the video stream or other control stream, such as the polling stream described below is terminated, and provided to the database server 110 and/or the web server 102 as another alternative example. This additional communication allows for more effective management of the limited resources of the video-streaming server 103. For example, if the video-streaming server only supports 50 video streams (50 participants), when a conference ends, these seats are now available for other participants to use. This information can be utilized by the web server 102 to allow or disallow additional participants' access to the video conferencing application 206a or 206b, or to allow or disallow participant access to a conference within the conferencing application 206a or 206b.

An additional communication that may be desired is a termination command or a notice of upcoming termination, sent from the web server 102 or the video server 103 to the conferencing application 206a or 206b. This type of capability allows the conferencing application 100 to terminate conferences that are going over their preset time limit. An alternate example is to provide the conference end time, and have the conference application 206a or 206b show remaining time, and automatically end the conference when the time runs out. Another alternative example would allow a conference to continue if there are no scheduled conferences that require the conference seats. One mechanism for this is to allow a facilitator to request additional time, as described above. Such an extension of time may update the remaining time displayed by the conferencing application 206a or 206b.

The following sections will describe one example implemented in a user interface in FIGS. 5, 6, 7, 8, and 9. The figures show both the facilitator and non-facilitator user interface view. Additional facilitator-only functions are also provided via drop-down right-click menus, or other menus or controls panels (not shown). These additional controls can be provided in many different ways apparent to one skilled in the art, and thus will only be referenced herein but not displayed in the interface diagrams. The key operation mechanisms of the present disclosure will be clear from the diagrams showing the universal features of the conferencing system interface for all participants, including facilitators.

FIG. 5 (Facilitator, Speaking)

FIG. 5 is a facilitator user interface, with a facilitator speaking to the attendees.

Referring to FIG. 5, the facilitator's user interface is shown with the facilitator "speaking" or "having the floor." "Speaking," in the context of the present disclosure, generally indicates that a participant "has the floor," and the speaker's outgoing video stream is being transmitted to a server, and then forwarded to all of the other participants.

Facilitator Interface Speaking

The interface 500 includes a header 501 that specifies the conference name, a video display 502 showing the current speaker (in this case, the facilitator), the current speaker's name 503 in close proximity to the video panel, an action button 504 indicating the primary current action available, a text display area 505 to display text messages from conference participants, a text input area 506 for entry of text messages, text input buttons 507 for controlling text message submission, an optional status panel 508 showing a color-coded or iconic indication of the state of the interface. One of ordinary skill in the art will understand there are other ways to convey the status information, including in the list of participants. In this example, the status panel 508 is red, with the text "Warning: Camera Live!" This reminds the facilitator that the video camera and microphone are live and transmitting video and audio from the facilitator to the conference attendees. The outgoing facilitator video is being "self" displayed in video display 502, and is being sent to the server to be forwarded to the other participants for display on all of the other participant interfaces in the current group or subgroup. The "self" display (of a speaker's video display 502 while the speaker is speaking) allows the speaker to adjust his/her position, expression, and lighting as required for best presentation.

The interface 500 also includes a participant panel 510 showing a list of the current conference participants, along participant type icons and participant status icons 509.

Specifically, the participant panel shows the following (from left to right) for each participant: a type icon, a status icon, and a name of the participant. Any other relevant information desired may also be displayed for each participant, such as an image or avatar of each participant. The participants may be ordered from top to bottom based on facilitators on top, or based on time of admission into the conference, in alphabetic order, or randomly or by some other logic.

Type Icons

In one example, type refers to the type of connection from the participant to the server: a) video (including audio and text, also known as full video, indicated by video camera icon), audio (including text, indicated by a music note and speaker icon), or only text (indicated by an icon with the letter "a"). A special type indicator for a facilitator is shown (509) as a star. In one example, facilitators are required to have a full video connection, and thus the type icon for a facilitator may merely indicate a facilitator type, which is inherently is also a video type in one example.

In one example, it is assumed (default) that the participant can receive video and audio (often called "full video"), can display the video, and can play the audio over earphones or speakers. Thus, the connection type only indicates how the participant can ask questions or make comments: by full video, by audio, or by text (only). It is assumed (default) that all participants can ask questions via text entry, unless the facilitator has deactivated that feature for the purpose of eliminating distracting chatter in large groups.

In the case where video cannot be displayed by a participant's Internet device, due to lack of processing resources (including lack of a display screen) or bandwidth, only the audio will be presented. This one example does not support participants that do not have the ability to at least play audio. A common audio-only device is a telephone.

Status Icons (Color)

The status icons in the participant list 510 display one of the several possible statuses for each attendee, such as: present, hand raised, text message pending, speaking, or others statuses described below. The status icons in FIGS. 5, 6, 7, 8, and 9 use color to display status. However, a combination of color and graphic elements, or graphic elements alone could be used as well. See FIG. 13 below for additional possibilities.

In an alternate example, a single combined icon (not shown) will show both the type of attendee (text, audio, video, or facilitator) as well as the status (present, hand raised, text message pending, speaking, etc.). For example, type may be indicated by the shape of the combined icon, and the status may be indicated by the color of the combined icon.

In one example, status for participants in the attendee list 510 is indicated by color: gray for present, yellow for hand raised (requesting the floor or responding to a poll or question), green for text message pending, and red for currently speaking. Other color assignments or use of graphical elements with or without color-coding will be apparent to one skilled in the art. The current speaker and facilitators may browse text messages by a control, such as cursor hover over the selected attendee, or by clicking or touching a message pending icon associated with the attendee list element. This allows the current speaker and facilitators to request questions or comments, and, without giving the floor to other attendees, respond to the question or comment, as desired, as described below. Many other possible arrangements will be apparent to one skilled in the art. In an alternate example, message browsing is available only to facilitators. In another alternate example, all text messages are displayed in the Text Display Area 505 only, as soon as they are sent.

In one example, pending messages are only possible in Class Mode (a facilitated group). Also in one example, in Group Mode (non-facilitated groups) and in Multi-Interactive Mode (subgroups) all text messages are automatically displayed to the current group or subgroup in a manner similar to a text chat. The term "pending messages" refers to messages that are received by the facilitator but not displayed in the Text Display Area 505, but only become visible to the facilitator in a pop-up area or other display via a control, such as hovering the cursor over an attendee's name in the list, or touching or clicking a message pending icon that appears next to the attendees name after they send a message. Such a pending message may be released to the Text Display Area 505 by another control, such as clicking or touching the pop-up message display. This technique allows the facilitator to receive questions and comments, but only release for general view those of interest. This type of example is especially useful in large conferences, where free-style messages posted directly into the Text Display Area 505 by the many participants is distracting. Additionally, the function of reviewing and selecting comments and questions is best handled by a second facilitator, allowing the primary facilitator to focus on answering questions or responding to comments.

In another example, text messages are simply automatically scrolled into the text display area for all to see. Text messages may travel independently of video streams, and thus require little overhead. However, this automatic scrolling tends to encourage "side discussions" among participants, and tends to detract from the conference (particularly with large groups).

Another example is to generate a short sound whenever a message is received and displayed in the Text Display Area 505. This sound informs the participant that a new message has arrived, allowing them to focus on the speaker or on the video camera if they are the speaker. Preferably, this sound can be enabled or disabled by the user. This technique of using specialized sounds to indicate status changes can be applied to other aspects of the interface, such as a sound when receiving the floor, a sound when hands are raised or lowered, or a sound when a new participant signs into or leaves the conference.

The Text Display Area 505 may become difficult to use if many text messages are displayed. One example is to provide a way to expand the Text Display Area 505 using a control, such as a clickable or touchable icon. The Text Display Area 505 could then be expanded, or displayed in a separate, larger window, or by expanding the size of the current window.

In many cases, attendees will want to send information out to the group, such as Internet URL's, names, addresses, or other text. This indicates that the participant who wants to use the information after it has scrolled out of the Text Display Area 505 must scroll up to find what they want. However, if the Text Area Display 505 automatically scrolls to the bottom of the list to show the new message every time a new message is received, the participant will become frustrated and not be able to locate and copy the information desired. One example to prevent this from happening only scrolls to the bottom of the messages in the Text Area Display 505 when a new message is received if and only if the Text Area Display 505 is essentially already displaying the last message at the time the new message is received. This can be determined by the scroll position at the time a new message is received. This technique allows the participant to scroll up the list of messages with impunity. The participant can scroll to the bottom of the list of messages to re-enable the normal action when new messages are received.

Colored Status Icons (Interaction)

The participant panel 510 in FIG. 5 shows: a red status icon (very dark grey in the black and white figure) for the facilitator Hilda Spanner (indicating a status of having the floor) a green status icon (medium grey in the black and white figure) for Tom (indicating a status of having a text message/comment waiting); and a yellow icon (light grey in the black and white figure) for Lisa (indicting a status of waiting to ask a verbal question or make a comment via video). All other icons are dark gray, indicating presence of the participant, but without a request for interaction.

Message Browsing

A facilitator or current speaker can view the status in the participant panel 510, and use a mouse or keyboard shortcuts or other controls such as a touch screen to respond to text messages or to grant the floor to another participant. Scanning and viewing text messages is referred to as "Message Browsing," and is accomplished by the controls as described above. The facilitator or current speaker will see a pop-up containing the text message sent by that participant. In this case, clicking, double tapping, right-clicking, or other control apparent to one skilled in the art on the participant icon, a message pending icon, or attendee list element will transfer the text message to the text area 505 on all other participant interfaces in the current group or subgroup, tagged with the name of the person who submitted the message. Once a text message has been displayed on all text display areas for the current group or subgroup, the speaker typically reads the text message aloud, or may only refer to it, or give a brief statement summarizing the message. Also, the "pending message" status for the attendee will be deactivated.

Static, Dynamic, or Streaming Text Message

The displayed text message is either static, i.e., not changeable by the selected participant or is dynamic. With a dynamic text message, additional typing by the selected participant will show up automatically.

In one example, the text is static. In this case, the status of the participant in the participant panel 510 will automatically reset to the default "present" gray state once the text message is released and displayed (along with the attendees name or screen name).

The dynamic text alternative case requires an additional state for the status icon, such as blue, indicating a text stream is active from the selected participant. This state then must be cleared by an additional control by the speaker or facilitator when the interaction is completed, such as clicking or tapping the participants' icon a second time.

Releasing the Floor

If a participant has raised their hand (yellow status), the facilitator can choose to select the participant by clicking, tapping, or other control. In this case, the video server 103 is directed to take the video/audio stream from the selected participant, or audio stream for an audio only connection, and redirect it to all participant interfaces, including the facilitator interface, as described below in reference to FIG. 6. This action is referred to as releasing the floor to another participant. A facilitator always retains control, however. At any point, a facilitator can return the floor to themselves, either by clicking or otherwise selecting (actually "deselecting") the participant that has the floor, or by selecting their own icon, or pressing a keyboard shortcut or other control.

The facilitator or participant currently having the floor of course can always release the floor no matter if another participant has their hand up or not. One of the functions of the system of the present disclosure is to automatically transfer the floor to another participant that has a raised hand when the floor is released by the current speaker, assuming no other action by the speaker or a facilitator has taken place, such as the current speaker selecting the next speaker, or the facilitator transferring the floor to themselves or another speaker. This is called Manual Conversation Flow Control. For the multiple raised hands case, the system automatically selects the first person that raised their hand. This action will take place automatically in one example, and is called Automatic Conversation Flow Control. In another example, this feature may be turned off by the facilitator.

Any participant can locate their information in the participant panel 510 by looking for their name, or by some other graphical indication. In FIGS. 5, 6, 7, 8, and 9, the name of the participant that is currently speaking is shown in bold. Other graphical identifications will be apparent to one skilled in the art. An alternate method is described below in conjunction with FIG. 13.

Voting

In one scenario, a vote or poll is requested by the current speaker, and the voting is performed by a raising of hands (even if one or more participants have text messages pending). In one example, the raised hand state may take precedence over the text message pending. However, once the hands are lowered, either by facilitator or attendee action, the pending message status resumes. Alternatively, a distinct action button may be presented for raising hands (voting). The results of the poll or vote can be displayed within the graphical user interface, as one skilled in the art will appreciate. An example of this is described in association with FIG. 13 below.

Thus, the example of the described facilitator interface 500 allows a facilitator to: present information (speak), or browse text messages and respond as desired, or allow a participant to speak for interactive discussion (including video questions and comments from all participants). This is all accomplished without echoes or start-stop interactions, thus allowing smooth and rapid group interactions. Finally, in one example, the facilitator has the ability to present slides to the attendees. In this case, the slide panel will appear in the attendees interface (not shown), or in a separate window, and may also appear in the video display 502 of the facilitator.

In one example, the presentation is launched by a facilitator, using a control (not shown). The presentation slide will then automatically appear in the designated area, or a graphic icon will be presented in the interface to notify the participants that a slide presentation is available. When a participant clicks or taps the icon, the slides will appear. In the case of a small screen device, such as a smart phone, this may activate an alternative panel that the participant can access via touch or gesture to view the current slide. Likewise, the participant may access the video panel via touch or gesture. Other aspects of the operation of this feature will be apparent to one skilled in the art, and will not be described in any further detail herein. In other examples, slides may be sent as a video stream, or may be sent as documents (for reduced overhead).

Simple Control ("Dominant" Action Button)

A very important feature of the one example is the simplicity of control. In FIG. 5, the Action Button 504 indicates a single action that a participant (the facilitator in this case) can take—that is, to release the floor (stop speaking, and perhaps automatically transfer the floor to another participant). This "dominant" action button always has a single function (which may vary dependent upon the context), as will be apparent in the discussion below, and optionally has an easy keyboard shortcut. This action button is described as "dominant" because it may be used to perform the majority of interactions during a conference. This action button may also be described as a primary action button, or key action button.

In one example, the keyboard shortcut for the "dominant" action button is the spacebar for keyboard-based Internet devices. This is desirable because using a pointing device and graphically selecting the action button 504 requires additional actions, such as grabbing the mouse, moving the cursor over the action button 504, and clicking the mouse. These additional steps take time and concentration. The specific action will depend on the implementation and control for any given Internet device. For example, a touch screen graphical user interface requires physically touching the action button (a more direct action by the participant than maneuvering a mouse, but still requiring focus and careful hand control, thus taking more time than pressing a fixed-location shortcut button such as a space bar on a keyboard, or a function button on a touch-screen device, or a single key, such as the * key on a telephone).

The single action functions preferably available for all participants using the action button or related shortcut are as follows:

TABLE 1

SINGLE ACTION FUNCTIONS (ACTION BUTTON)

| Attendee Status | Action |
|---|---|
| Listening (someone else speaking) | Raise Hand |
| Listening (no one speaking) | Take Floor[2] |
| Hand Raised[3] | Lower Hand |

TABLE 1-continued

SINGLE ACTION FUNCTIONS (ACTION BUTTON)

| Attendee Status | Action |
| --- | --- |
| Message Pending[3] | Raise Hand[1] |
| Speaking | Release Floor |

[1]For a facilitator, the action is Take Floor in the one example
[2]Not available for a text-only attendee: the action in that case is Raise Hand
[3]Not available for a facilitator in the one example By using the spacebar for keyboard-based Internet devices such as desktop and laptop computers, the attendee or facilitator can rapidly take the specified action. Virtually all of a videoconference interaction process can be controlled by this single button (or its keyboard shortcut). In one example, the action button is a graphical button ("soft key") that changes the graphic depending on the available action in order to make it very obvious what current action is available. In FIGS. 5, 6, 7, 8, and 9, the action button is shown as a standard text button that only changes its text value to reflect the available action.

Text Entry

The text entry system for the present disclosure will now be described, with support from FIG. 5, FIG. 8, and FIG. 9. In the one example, text messages from a facilitator are not set as pending, but rather are always sent as described in FIG. 12 below. Briefly skipping ahead, FIG. 8 is provided as a view from an attendee, Tom Wittier, who has posted a text message. The interface can be seen as Tom's view because his status icon 809 includes bold text of Tom's name next to it. In an alternate example, the facilitator's text messages can also be set to pending when someone else has the floor.

Space Bar (Function Depends on Context)

The keyboard shortcut that is easiest and fastest to access for keyboard-based Internet devices—the space bar—is also required for text input. Preferably, the text input system is configured to allow the space bar to be used for video conference operation (as a shortcut for the dominant action key) as well as for text input (depending upon the circumstances)

Text Entry Mode (Enter/Exit)

Specifically, the text input area 506 is inactive unless activated by the attendee. Activation is by clicking in the text input area 506 to get a blinking cursor, or by pressing the TAB key to get the blinking cursor. When activated, the text input are 506 is highlighted graphically, to reinforce the state change for the user, such as displaying a color background in the text entry area, or drawing a colored line around the text area.

When the text input area 506 is active, the space bar is strictly a text space bar, and is not available for interaction with the "dominant" action button 504. Conversely, when the text input area is inactive, then the space bar is strictly available for interaction with the "dominant" action button, but is not available as a text space bar. This detailed logic makes keyboard interaction much more user friendly.

Once the text input area 506 active, the attendee can type a message, and use standard editing keys, such as backspace, arrow keys, copy, paste, undo, etc. to create a text message. The space bar is used to generate spaces in the text. Preferably, when there is an incomplete message (some text entered, but not yet sent) in the text input area 506, both the Send button and Clear button 507 will be active (bold, black text rather than dimmed text). The state of a button may also be indicated by highlighting, changing color, or changing the graphical appearance of the button.

The attendee may exit the text entry mode with an incomplete text message at any time by pressing the TAB key, or by clicking on the action button 504. This feature is not shown in Table 1. The text input area highlight and blinking cursor will disappear, reinforcing the mode change for the user. The text input Clear button 507 will retain its existing state (dimmed or not dimmed) for both active and inactive state for the text input area 506, thus allowing an already entered or pending message to be cleared even if the text input area 506 is not active. In an alternate example, the Send button (and its related keyboard shortcuts) also retains its existing state, allowing a text message that has not been sent to be sent without reactivating the text entry area 506.

The attendee may return to the text entry mode by pressing the TAB key, or clicking in the text entry area, or by other controls.

The attendee may exit the text entry mode and simultaneously send the message to the server at any time by pressing the Return or Enter key, or clicking on the Send button 507. In this case, the Send button 807 will go dim (inactive), as shown in FIG. 8.

If the system is in group or subgroup mode, the sent text message will be displayed with the attendee name in the text display area 905 for all group or subgroup members, as shown in FIG. 9. In facilitated (Class) mode, the message will be pending (pending selection by the facilitator), as shown in FIG. 8, and will change the status of the sender to the message pending status, as shown by status icon 809. In this case, the text will remain in the text entry area 806 (preferably dimmed) until transferred to the text display areas of all attendees by facilitator action (as shown in FIG. 9, text display area 905), or until the attendee clicks on the active Clear button 807. The Clear button 807 will be active until the message is cleared or transferred. The ESC (Escape) key is a keyboard shortcut for the Clear button in one example.

As described above, the attendee can exit the text entry mode and simultaneously delete any incomplete text message at any time by clicking on the Clear button 507 or by pressing the keyboard shortcut ESC key. In this case, both text input buttons 507 will be inactive (dimmed), and any text in the text entry area 505 is cleared. The attendee can clear a pending message at any time by clicking on the Clear button or pressing the ESC key. The text input mode does not have to be active for this action to take place An alternate example removes both the Send and Clear buttons. In this case, a message can only be sent using the Return key, and clearing a message can only be accomplished by selecting it and using the cut or delete keyboard functions. Finally, another alternate example, either with or without the Send and Clear buttons, includes only a single mode for text entry and display is supported (typically the group mode). Optionally, a setting, available to a facilitator, could be provided to switch between the alternative examples.

The value of the facilitated text entry mode is especially valuable when working with large groups, where one facilitator manages the messages and the other manages the conversation flow.

FIG. 6 (Facilitator, Listening)

FIG. 6 is the facilitator user interface, with the facilitator listening to an attendee.

Referring to FIG. 6, the facilitator's user interface (with the facilitator listening) shows the interface response to the facilitator having selected Lisa Jones (from the participant panel 506) by using a control such as clicking, tapping, or by other controls apparent to one skilled in the art. The interface displays the selected attendee's video display 602 and speaker name 603. The status panel 608 is gray and displays "Listening . . . " as the current status for the facilitator. The selected speaker, Lisa Jones, is indicated by the red color of the status icon 609 of Lisa Jones. The facilitator's status icon is gray (present, not speaking), and the action button 604 for the facilitator is labeled Take Floor. The facilitator has additional actions not available to a non-facilitator. For example, the facilitator may click on his own icon to take back the floor, or the facilitator may use the default or "dominant" action indicated by action button 604. In an alternate example, the action button operates the same for a facilitator as for a non-facilitator. In that example, the action button would display "Raise Hand" to the facilitator.

This additional facilitator functionality may be provided in one example by providing a separate downloaded conference application 206a for a facilitator. An alternate example includes all functionality within a single downloaded application 206a where the additional facilitator functionality is enabled by status information transferred by the web application 305 to the downloaded application 206a as described above. An alternate example is to provide a graphic mechanism, such as a Settings button, for example, that allows a participant to view a settings panel. The button may only display for facilitators, or alternatively, the settings panel may show limited options for non-facilitators, and more options for facilitators. In yet another example, all options are shown to all participants in the settings panel, but options not available to a non-facilitator are dimmed out. This approach has the benefit of making all attendees aware of the available functionality of the system, thus potentially attracting them to facilitate their own meetings.

FIG. 7 (Attendee, Hand Raised)

FIG. 7 is an attendee user interface, with a hand raised.

Referring to FIG. 7, the attendee interface with hand raised shows the interface response to the attendee Lisa Jones having selected the default action "Raise Hand," either by clicking on the action button 704 or pressing the keyboard shortcut. Note that the Lisa Jones name is in bold in the attendee list, indicating we are viewing her view of the application interface, and that Hilda Spanner is currently the speaker. The status panel 708 and the Lisa Jones participant status icon 709 have changed color in response to the raise hand action, indicating that the attendee's hand is raised. The text in the status panel 708 also states "Hand Raised!" Finally, the action button 704 now indicates the primary or dominant action for the attendee: "Lower Hand." All attendees that have their hands raised will see a similar status on their interfaces, and can use the action button or keyboard shortcut to lower their hand, or click on their status icon to lower their hand. The current speaker also has the ability to click on another participant status icon, which transfers the floor to that participant (hand raised or not raised). In one example, transfer of floor from one participant to another also clears all raised hands automatically. Alternatively, the current speaker may only transfer the floor to another participant who has their hand raised.

FIG. 8 (Attendee, Message Pending)

FIG. 8 is an attendee user interface, with a message pending.

Referring to FIG. 8, attendee interface with message pending, the interface response to an attendee sending a message when not having the floor is shown via the status panel 808 and status icon 809. In this example, this is the interface viewed by Tom Wittier, as indicated by the bold text for Tom's name in the attendee list. In one example, messages from a facilitator or speaker are always transferred to the text display area for all subgroup or group members. In Class Mode, where all attendees are in the same group with a facilitator, all sent messages from attendees that are not the current speaker and not a facilitator are set as pending, with a status icon indication (change in color or the appearance of a Message Pending icon) and a status panel indication ("Message Pending . . . ") as shown in the user interface of the attendee. In an alternate example, when a pending message is accepted and displayed, all other pending messages are retracted, and returned to the Text Entry Area 806 of each attendee, respectively. This allows each attendee that has sent a message to re-evaluate and either clear the message or resend it.

When subgroups are active, and a facilitator is in the main conference room, facilitator text messages are delivered to all participants along with an alert sound. This function allows the facilitator to notify the subgroups that time is running out, or to deliver additional instructions. In an alternate example, received text messages are always delivered with an alert sound, unless the attendee has deactivated that feature using a settings panel or other way.

FIG. 9 (Attendee, Message Displayed)

FIG. 9 is an attendee user interface, with a message displayed.

Referring to FIG. 9, the attendee interface with message displayed shows the interface response to the current speaker (Lisa Jones) having clicked on the green message-pending status icon of Tom, thus releasing his message to all participants. The message is displayed in text area 905 for all participants, with the name of the person providing the text message (Tom Wittier in this case), and the action button 904, status panel 908, and status icon 909 revert to the default state for listening. In this case, the interface will display the message and remove the pending state. Lisa would now respond to the comment/question, and optionally give the floor to Tom. In an alternate example, only a facilitator can review and accept pending messages.

Class Mode (at Least One Facilitator)

The operation of the present disclosure has been described above in relation to a videoconference between one or more facilitators and a group of attendees (in a first mode referred to as Class Mode). In addition to Class Mode, two additional modes are supported by the present disclosure.

Group Mode (No Facilitator)

The second mode, referred to as the Group Mode, is supported when there is no designated facilitator. This group mode may be used when a participant schedules a meeting with other equal participants (rather than a facilitator scheduling a meeting with attendees). This group mode is also used in conjunction with the third mode.

Multi-Interactive Mode (Subgroup Mode)

The third mode, referred to as the Multi-Interactive Mode (or Subgroup Mode), supports multiple simultaneous subgroups with a facilitator for the overall group. For this subgroup mode, each subgroup preferably operates as a relatively independent small group (in group mode), with the facilitator of the overall group also overseeing the subgroups. These additional modes will be described below. Alternatively, the subgroups may operate in Class mode, with each subgroup having a subgroup facilitator.

In the Group Mode, there is no facilitator. However, there is preferably a "conference owner" (the participant that scheduled the conference). In one example, the conferencing system may give the same additional features and functions normally given to a facilitator to the conference owner, essentially making them identical to a facilitator. The conferencing system 100 preferably automatically gives the floor to the first participant at the beginning of the conference, as described below in conjunction with FIG. 12. Alternatively, the floor is open at the beginning of the conference. As described above, the interface for non-facilitators is illustrated by the interface shown in FIGS. 7, 8 and 9, and facilitator's interface, shown in FIGS. 5 and 6, may have additional functions (not shown). Also see the description below in conjunction with FIG. 13 for a different example of an interface.

FIG. 10 (Multiple Conference Modes)

FIG. 10 illustrates multiple conference modes.

Referring to FIG. 10, the Class Mode 1001 (top left portion of the figure) shows multiple participants comprising: a facilitator 1010 and some other participants (attendees) 1011. The Group Mode 1002 (top middle portion of the figure) shows only participants 1011, with no facilitator. Finally, the Multi-Interactive Mode 1003 (subgroup mode, bottom left portion of the FIG. 1003 shows three subgroups (each with three participants), a facilitator 1010, and one or more optional subgroup facilitator slot 1012 for each of the subgroups.

While FIG. 10 shows three subgroups (each subgroup having three participants) in the Multi-Interactive Mode 1003, the number of participants in each subgroup can be set to any number from two to ten (or more) by the facilitator, and thus the number of actual subgroups formed will vary, depending on how many participants are in the overall group. For example, if there are 24 participants, and the facilitator requests subgroups of size 4 (four participants maximum in each subgroup), then six subgroups of size 4 will be formed, as described below.

Referring back to FIG. 5, when in Group Mode in one example, the text interface (text display area 505, text entry area 506, and text input buttons 507) operate much like a standard chat room, i.e., anything typed and sent by the control (in FIG. 5 sent via a Send button click or by pressing the return or enter key) will show up (along with the participant's name or identifier) in the text display area 505 (as shown in FIG. 9, text display area 905). Once typed and sent, it cannot be recalled, and all participant text messages are displayed in real time. Like recalled email, it is possible to implement procedures to recall comments, but these recall procedures are not worth the overhead.

One problem that can occur in Group Mode is when a participant wants to talk for a long period, and not give the floor to other participants. There are a number of solutions for this. In one example, the text message function will provide a way for other attendees to remind the speaker to give others a chance to speak. Other examples will be apparent to one skilled in the art. For example, a majority of the participants may be able to steal the floor, or the conference owner may have the ability to take back the floor.

The Multi-Interactive Mode of the present disclosure is selected by a facilitator by using a provided control. For example, a button, or a drop-down menu from a right-click, a settings panel, or other control may be provided to the facilitator. The control device may provide a selection of previously defined static groups, along with the dynamic group option. The dynamic group option allows a facilitator to specify the subgroup ideal size, such as 2 per group, 4 per group, etc. Of course there may be additional participants that do not form a group of the desired size. For example, if there are 18 participants and a facilitator requests groups of 4, four groups of 4 will be generated, and there will be two participants left over.

Leftover Participants (Three Possible Preferences)

A preference setting may control how these "left over" participants are handled. In one example, the default preference is to distribute extra participants among the groups. Thus, two groups of 5 and two groups of 4 will be created in the example cited. This is referred to as the group size plus (+) preference. An alternative preference is to reduce the size of groups by one to build up the smaller leftover group. This is referred to as the group size minus (−) preference. In this example, one participant will be taken from a group of 4 in order to fill out the last group, resulting in 3 groups of 4 and 2 groups of 3. Finally, a third alternative is to keep the leftover participants together as a smaller group. This is referred to as the default group size preference.

Group Size Plus Preference (2+)

Returning to FIG. 10, the Multi-Interactive Participant List 1004 (bottom right portion of FIG. 10) shows how the class will be split up into subgroups when the facilitator has selected the "2+" group size preference. The preference is displayed by putting a + or − sign after the selected group size, or showing no sign after the selected group size, as can be seen in the header in the Multi-Interactive Participant List 1004. Also displayed in the header is the operating mode for the conference, shown here as Class Mode. This indicates that groups have been formed, but the entire set of participants and the facilitator are still together in the Class Mode. In this mode (actually a subgroup setup aspect of Class Mode), facilitators have the option of dragging and dropping participants to change the group layout, as desired. Other controls apparent to one skilled in the art can be utilized for editing group arrangement. In an alternate example, the facilitator may also change their mind and end the setup mode, or choose a predefined static group.

Subgroup Breakout (Optional Facilitator Visits)

Once a facilitator has instructed the class regarding what exercise or discussion is to take place within the subgroups, the mode can be switched to Multi-Interactive Mode using a control, such as clicking on the Participant list header 1004, or right-clicking and selecting an appropriate command from a drop-down menu, or selecting a command from a settings panel. Once this action has been taken (subgroup breakout), each subgroup is on its own, and is working within the Group Mode for its own subgroup. At that point, the subgroup members will only see their co-members in their participant list, or other participants in other groups will be displayed in a dimmed manner. Facilitators continue to see all groups in their participant list. The facilitator may at this point name this grouping and add it to the list of defined static groups for possible use later.

When the subgroup breakout function is initiated, the facilitator remains in the main conference room, and thus cannot hear or see anyone in the video display area (the "no speaker" or "Floor Open" notification video or graphic is displayed, since no one is currently speaking in the main conference room). This is akin to having a class break up into groups, each group going into a separate room nearby and closing the separate room's door, while the facilitator remains in the main auditorium. However, as shown in FIG. 10, Facilitator Slots 1012 exist within each subgroup. These slots simply indicate that a facilitator (or, for that matter, multiple facilitators) may temporarily (or permanently) join the subgroup. The slots are not currently populated, but are used here to show possible locations for the facilitator other than in the main conference room. Thus, a facilitator can enter any of the subgroup rooms and hear what is being said simply by clicking on an appropriate unpopulated facilitator slot, or clicking on the selected group header bar above the group in the Multi-Interactive Participant list 1004, or by some other control apparent to one skilled in the art. When entering a subgroup, the facilitator's icon appears in all subgroup participants' attendee lists (and then disappears when the facilitator leaves).

Once in a subgroup, a facilitator has the ability to take control, or remain passive. When the facilitator is present but remains passive, each participant continues to operate in effectively a Group Mode. The subgroup members will see the facilitator appear in their participant list, and thus will be aware that the facilitator is listening. However, the facilitator may take control of the group by taking the floor, or by being selected to speak by a subgroup member. When the facilitator leaves the floor, or transfer the floor to another participant, control returns to the group. Finally, a facilitator may leave the room and return to the main conference room by clicking on the facilitator icon 1001, or clicking on the Multi-Interactive Participant List 1004 header, or other control. Alternatively, the facilitator may leave a first subgroup and transfer directly to a second subgroup by clicking on an unpopulated facilitator slot of the second subgroup, or by clicking on the selected group header bar, or by other control.

Thus, while the subgroups are meeting during a breakout, a facilitator has the ability to "walk around" and listen in to subgroup activities, and enter the conversation, if desired. Alternatively, subgroup facilitators may be assigned or elected.

In one example, when a facilitator is in the main conference room, any message typed and sent by the facilitator will appear in all participants' text area 505. This allows a facilitator to give notice that the participants should finish up, or give them an update on how much time they have left. Also in one example, any such broadcast facilitator text message to subgroups will be accompanied by an alert sound (such as a bell). For examples that include a sound alert for all received messages, the alert sound from the facilitator may be a different sound to distinguish a message of higher importance has been received.

Any message typed by a facilitator when visiting a subgroup (while populating a subgroup facilitator slot) will only be seen in the subgroup text display areas. In an alternate example, a facilitator typing a message even in a subgroup will be seen by all participants. In an alternate example, the overall group facilitator may participate as a mere participant in a subgroup, perhaps to fill in a subgroup up to the desired number of participants.

Reconvene Conference

A facilitator can return the conference to the Class Mode (reconvene conference) by a control, such as selecting a command from a drop-down menu or panel or other controls apparent to one skilled in the art. In this case, all groups will be returned to the conference room, but (optionally) will still be displayed in a grouped manner in the attendee lists, as shown at the bottom right of FIG. 10. Thus, a facilitator can issue a new breakout command to have the same subgroups meet again for additional work, or can command the system to create new subgroups, or can select from a set of predefined static group definitions. This is one mechanism for operating with dynamic groups rather than static groups. By not creating a new group arrangement and using the existing one, the facilitator is using a static grouping. However, if the facilitator wishes to use a different group arrangement, and then return to the current one, the current arrangement should be saved by name into the pre-defined static group list.

An additional control for subgroup participants may be desired to enable them to indicate that they are done with whatever work was requested for the subgroup by the facilitator. This additional button is referred to as the Exit Subgroup button. This additional button appears in the interface of subgroup participants when in a subgroup during a Multi-Interactive Mode. An additional status icon status preferably also becomes available, so that all subgroup participants can see which participants are finished (have clicked on the Exit Subgroup button).

The exit function is preferably a toggle, and thus can be turned off if the participant changes their mind, and is also turned off automatically by any other action in the interface by the participant. When all subgroup members are finished (i.e., all have set the exit status), the subgroup is disbanded (effectively by unanimous decision), and subgroup members are either returned to the main conference room, or are reassigned by the system to another subgroup, such as in the case of a mill interaction. This additional exit action control can be provided in various ways other than a button, as will be apparent to one skilled in the art.

One example thus supports: a) a Class Mode similar to a classroom, with text message browsing, responding to raised hands, and allowing discussion under the control of one or more facilitators; b) a Group Mode, where a group of participants can interact on a peer-to-peer basis; and c) a Multi-Interactive Mode, where a conference is broken up into small subgroups, where facilitators can roam, listen in and participate with any subgroup, and communicate to the entire group via text messages.

An alternate example supports a Directed Meeting mode similar to Group Mode, with a facilitator that has full control. Specifically, the text entry function works like the Group Mode with a facilitator in the meeting. This example is described in conjunction with FIG. 13. Various combinations of these modes are possible in other examples, as will be apparent to one skilled in the art.

FIG. 11 (Action Commands)

FIG. 11 illustrates multiple action commands.

Referring to FIG. 11, a command table illustrates an exemplary set of commands (or requests) available to various types of parties, the types being indicated by columns. An "X" indicates that the command is allowed. Notes 1) through 6) at the bottom of the figure indicate additional information regarding certain allowances.

The illustrated parties are (columns from left to right): Facilitator VAT (with Video, Audio, and Text); Attendee VAT (with Video, Audio, and Text); Attendee AT (with Audio and Text only); and Attendee T (with Text only).

Other possible parties are not illustrated. For example: Attendee A (with Audio only); Attendee V (with Video only); Attendee VT (with Video and Text only). Under some circumstances, there may be more than one Facilitator.

For example, the "Extension" command is only allowed to the Facilitator. The "Subgroup Done" command is only allowed to the Attendees, and is not allowed to the Facilitator. However, the facilitator has a "Reconvene" command, which is not allowed to the Attendees.

A lock command prevents new attendees from entering the meeting. Unlock removes that restriction.

FIG. 12a (Conference Start Request)

FIG. 12a illustrates a first portion of a conference start request diagram.

Referring to FIG. 12a, a flow diagram for one example, in step 1200 the conference application starts by receiving a request for a video conference in step 1201 along with conference information, such as time and length of conference, and attendee list (the term "attendee" is used broadly in FIGS. 12a to 12d, as referring to participants including facilitators and non-facilitators). Alternatively, the attendee list is dynamically constructed as attendees arrive.

Validate

In step 1202 the system validates the request, such as by comparing the request with the conference schedule database, or by checking for available seats. If the request is not valid, the conference application exits in step 1203. Otherwise, in step 1204, the system determines the available data stream from the requestor (text only, text plus audio, or text, audio and video). This information is used to control the attendee type icon. The system also identifies at this point if this attendee is a facilitator, which is also used to control the attendee icon(s), as described previously. If the attendee is a text-only attendee, control is transferred to entry point SL to set the attendee as a listener. In the alternate example described below for step 1205, all new attendees are assigned as listeners.

Set Up as Speaker

Next, in step 1205, the attendee is set up as the speaker. Step 1205 is also the entry point SS for all cases where an attendee is to be set as the speaker, where the current group is identified, and all current group or subgroup members receive the data stream from the attendee/speaker. All temporary states (such as raised hands) are cleared, and the attendee lists for all attendees are updated with the new status. In an alternate example, the first attendee is always set as a listener (because there is nobody else available to speak to yet). In an alternate example, no speaker is automatically assigned the floor at the beginning of a conference. In this case, no conversation will occur until an attendee takes the floor. In an alternate example, raised hands are not cleared when a new speaker is assigned.

Attendee Request

In step 1206, also the entry point L for the Main Loop, the system checks for an attendee request. If one is found, control is transferred to entry point B in FIG. 12b. Otherwise, check for a request to add a new attendee in step 1207. If such a request is pending, go to step 1211 to process the request. Otherwise, check for conference over in step 1208. The conference is over if a timer has timed out, and no conference extension was requested or issued. In this case, exit the conference in step 1209. Next, in step 1210, check for a mill in process. If there is no mill in process, the main loop repeats by returning to entry point L. If a mill is in process, check for available unattached attendees and assign to new subgroups according to the mill process specified above. All new subgroups created start with no speaker assigned. Then the main loop is repeated.

Validity

For an add attendee request in step 1211, the request is checked for validity, and the lock status for the conference is also checked. If not valid, or the lock is set, the request is ignored (or expressly denied), and the main loop is repeated. If the request is valid and the conference is open (not locked), then the data stream type for the new attendee is received in step 1212.

Attendee Type

Next, the attendee type (facilitator or non-facilitator) is checked in step 1213. If not a facilitator, the new attendee is set as a conference listener in step 1214. Step 1214 is also the entry point SL for setting an attendee as a listener. Step 1214 sets the current data stream from the speaker in the current group or subgroup to be sent to the attendee, and updates the attendee status in attendee lists. If there is no speaker, the "no speaker" notification data stream is sent or the "Floor Open" graphic is displayed instead. Next, the main loop is repeated. If the new attendee is a facilitator, in step 1215 a check is made to see if there is a current speaker. If there is a current speaker, control is transferred to entry point SL (step 1214) to set the new facilitator as a listener. If no speaker is currently assigned, the facilitator is set as the current speaker via transfer to entry point SS (step 1205). Alternatively, as described earlier, all new attendees are assigned as listeners.

FIG. 12b

FIG. 12b illustrates a second portion of the conference start request diagram.

Raise Hand

Referring to FIG. 12b, entry point B for an attendee request, the possible requests are listed in FIG. 11. In step 1220, the request is checked for Raise Hand Request. In step 1221, a Raise Hand request is processed: the status for the attendee is changed, both in the attendee user interface and all attendee lists where the attendee is displayed. Next, the main loop is repeated. In one example, if this is the first hand raised (First Hand Up), an alert sound is generated for the speaker. The purpose of this alert sound it to enable the speaker to focus on the video camera rather than having to check to see if anyone has raised their hand. This alert sound should be distinctive, and different from other alert sounds.

Lower Hand

In step 1222, the request is checked for Lower Hand Request. In step 1223, a Lower Hand request is processed by updating the status for the attendee user interface and in all attendee lists where the attendee is displayed. If there is a pending text message from this attendee, that state is reasserted. Otherwise, the default present or listening state is asserted. Next, the main loop is repeated. In one example, if this is the last hand lowered (Last Hand Down), an alert sound is generated for the speaker, for the same reason as for the raised hand case. The alert sound for First Hand Up and Last Hand Down should be different, such as a rapid rising or falling tones Give Floor In step 1224, the request is checked for a Give Floor (Transfer Floor) request. In step 1225, the Give Floor request is processed by selected attendee to receive the floor is set as the attendee (unless the selected attendee is a text-only attendee), and transferring control to entry point SS to set the selected attendee as the speaker for the current group or subgroup in which the selected attendee is currently seated. If the selected attendee is text-only, the request is ignored, and the main loop is repeated (not shown Take Floor In step 1226, the request is checked for a Take Floor Request. In step 1227, the Take Floor Request is processed by first checking the attendee type. If the attendee is a facilitator, control is transferred to entry point SS to set the attendee as the speaker. If the attendee is not a facilitator, in step 1228 the conference application checks to see if there is already a speaker. If not, control is transferred to entry point SS to set the attendee as the speaker for the current group or subgroup. Otherwise, no action is taken, and the main loop is repeated. Alternatively, the Take Floor request when another attendee is speaking is handled as a Raise Hand request. A Take Floor request is ignored if the attendee is a text-only attendee (not shown in the diagram).

Text Message

In step 1229, the request is checked for a Text Message Request. In step 1230, the Text Message Request is processed by the conference application by first checking the type of the attendee. If the attendee is a facilitator, in step 1231, the text message is sent to all attendees in the group or subgroup tagged with the sender's name, and an alert is sounded if the message is from the facilitator in the main conference room during Multi-Interactive (subgroup) Mode. As described earlier, in alternate examples, messages are always sent to all attendees, and alert sounds are generated unless the attendee has turned them off. Next, the main loop is repeated. If the attendee is not a facilitator, in step 1232, a check is made by the conference application to see if the attendee is currently speaking. If so, control is transferred to step 1231 and the message is sent to all attendees in the current group or subgroup. If the attendee does not have the floor, the conference application checks the current mode. If not in Class Mode (i.e., in Group or Multi-Interactive Mode), the text message is treated as a chat message, and control is transferred to step 1231 and the message is displayed. Otherwise, in step 1234 the Pending Message status is established for the attendee in the attendee interface, and all subgroup or group member attendee lists are updated with the new attendee status. Next, the main loop is repeated.

Answer

In step 1235, the request is checked for Answer Request. This request is generated when a speaker clicks on an attendee in the attendee list with a pending message.

Answer Requests are processed in step 1236, where the pending message selected by the speaker is posted, along with the name of the attendee who sent the message, in all group or subgroup attendees' text display areas 505, and the message pending status for the selected message source attendee is reset or cleared. In one example, the Answer Request can only be sent by a speaker. All attendee lists are updated, and the main loop is repeated. In an alternate example, a facilitator can only send Answer Requests. In another example, when an Answer Request is received, all pending message states are cleared, and the sending attendees request is removed from the Text Input Area of the sender and displayed in all attendees Text Display Areas, and all other pending messages are returned to the respective Text Input Areas to enable the attendees to determine if they wish to resend the question or comment.

Extension

In step 1237, the request is checked for Extension Request. This request can only be generated by a facilitator or conference owner in one example, and represents a request to extend the time for the conference beyond the original set end time. The request may include an amount of time for the extension, or a default amount of extension may be assumed. In step 1238, the conference schedule is checked to see if conference seats are available for an extension. In step 1240, if not enough seats are available, the request is ignored, and the main loop is repeated. Otherwise, in step 1239, the extension is granted, the schedule database is updated, and the conference is extended. If remaining conference time is displayed in attendee interfaces, it is updated. Next, the main loop is repeated. In an alternate example, the account status of the conference owner is checked to see if an extension is covered by their account. For example, they many have an unlimited meetings account, which would allow them extensions. Alternatively, one or more seats may have been paid for, and an extension will require additional payment. This can be managed automatically via prepaid seat-hours. In this case, the extension time multiplied by the number of attendees that hold paid seats rather than subscription (unlimited) seats is computed and compared with available seat-hours in the owner's account. If there are insufficient seat-hours, the extension is rejected. Otherwise, the extension is granted, as described above, and the calculated number of seat-hours is deducted from the owner's or facilitator's account.

Lock

In step 1241, the request is checked for Lock Request. In step 1242, the request is processed by setting the conference lock on, and the main loop is then repeated. Note that in one example, only a facilitator can lock the conference, preventing new attendees from joining. Typically, for examples that support the Lock request, an Unlock request is also possible (described below).

Drop Attendee

In step 1243, the request is checked for Drop Attendee Request. This request is generated when an attendee Internet device 104-107 disconnects from the video streaming server 103 due to an interruption of the Internet connection 110, due to a failure or crash in the Internet device 104-107, or when the attendee closes the downloaded conference application 206*a* or conferencing application 206*b*. In one example, this situation is detected by the loss of a polling signal from the Internet device 104-107. In step 1244, the request is processed first by terminating any data stream to or from the dropped attendee, and removing the attendee from all attendee lists. In step 1245, if there are no more attendees (this was the last to drop out of a conference), then in step 1248 the conference is terminated. If there are still attendees in the conference, in step 1246 the status of the dropped attendee is tested. If the dropped attendee was not speaking, no further action is taken, and the main loop is repeated. If the dropped attendee was the current speaker, in step 1247 the data stream to all remaining members of the group or subgroup of the dropped attendee are sent the "no speaker" notification data stream, or a "Floor Open" graphic is displayed, and the main loop is repeated.

FIG. 12c

FIG. 12c illustrates a third portion of the conference start request diagram.

Give Up Floor (Release Floor)

Referring to FIG. 12c, in step 1250, the request is checked for Give Up Floor (Release Floor) Request. In step 1251, the request is processed first by checking the conference mode. If the request to release the floor was given in Class Mode, where a facilitator is present, in step 1252 the facilitator that most recently had the floor is set as the attendee and control is transferred to entry point SS to set the selected facilitator as speaker. In another example, this step is skipped, and processing continues in step 1253. Otherwise, in step 1253, the attendee status for all other attendees in the group or subgroup is checked to see if any attendee has a hand raised. If so, in step 1254, the first person that raised their hand is set as the attendee, and control is transferred to entry point SS to set them as the speaker. This feature requires that the system keep track of the time each attendee raises their hand, so the earliest action can be determined. This automatic transfer based on earliest hand up is called Automatic Conversation Flow Control. Otherwise, in step 1255, the number of attendees in the current group or subgroup is checked. If only 2 attendees are in the current group or subgroup, in step 1257 the other attendee is set as the attendee and control is transferred to entry point SS to set the other attendee as the speaker. If there are more than 2 attendees in the current group or subgroup, in step 1256, the floor is released, the "no speaker" data stream is sent to all attendees in the current group or subgroup or a "Floor Open" graphic is displayed, and the attendee lists and attendee interfaces are updated. The main loop is then repeated. In an alternate example, the two-attendee case is not detected or handled differently than the more than two attendee case.

Subgroup Exit

In step 1258, the request is checked for Subgroup Exit Request. This request can be issued by any subgroup member by clicking on the Exit Subgroup button, or by some other control.

In step 1259, the request is processed first by toggling the exit status for the attendee, and the attendee list status for the attendee is updated. In one example, the icon is gray, with a blue upward pointing arrow to indicate the exit state has been selected. In one example, if the attendee sends any other request after setting the Exit status, the exit status will also be revoked (not shown in the flow diagram). Also in step 1259, the exit status is checked for all other subgroup members. If all subgroup members have not set the exit status, no further action is taken, and the main loop is repeated. If all subgroup members have set the exit status, in step 1260 the conference application checks to see if a mill is currently running. If not, in step 1261, the attendees in the subgroup are released from the subgroup back into the main conference room, and receive the main conference room data stream. If no one is speaking in the main conference room, then the attendees receive the "no speaker" data stream or "Floor Open" graphic. All attendee lists are updated appropriately, and the main loop is repeated. If a mill is running, in step 1262 the subgroup attendees are set into a waiting state, and are made available to the mill processing step 1216 during the next iteration of the main loop.

In step 1263, the type of attendee making the current request is tested. If not a facilitator, the main loop is repeated. This eliminates testing for requests that cannot be sent by a non-facilitator.

Create Subgroup

In step 1264, the request is checked for Create Subgroup Request. This request is processed starting with step 1265, where the conference is locked, preventing additional attendees from joining. In an alternate example, a conference lock is not used, and additional attendees are added to subgroups that have less than the desired number of attendees or start a new group with some existing attendees, based on the Size +, Size − and Default described earlier. In step 1266, the type of subgroup formation is determined. Dynamic subgroup formation is handled by step 1267, where groups are formed according to the settings provided by the facilitator, including group size, group type (mill or standard), and with the preferences for how to deal with excess attendees (Size +, Size − or Default). In step 1269, the newly created subgroups are displayed in the attendee lists, and the main loop is repeated. Static subgroups are handled in step 1268, where the selected group specification is received and implemented. Static group specifications can be provided in a variety of ways apparent to one skilled in the art. Once status groups are formed, in step 1269 the static groups are displayed in the attendee lists, and the main loop is repeated.

Breakout Groups

In step 1270, the request is checked for Breakout Groups Request. Subgroup breakout is the event where groups previously formed according to the Create Subgroup Request are instantiated, i.e., each subgroup is set into their one, separate conference room. If no groups have been defined, the Breakout Group request cannot be sent, or is ignored (not shown). Next, in steps 1271 1272, and 1273, each of the defined breakout groups are created, one after the other. In step 1271, the request is processed by selecting a first formed subgroup to be broken out. In step 1272, the data streams to the subgroup attendees are set to the "no speaker" data stream. In step 1273, the subgroup members' attendee lists are updated to show only the current subgroup. The subgroup also disappears from all other group members lists, except for facilitators' attendee lists. In an alternate example, attendees not within the group are not removed from the list, but are dimmed. In step 1274, the conference application tests to see if all subgroups have been broken out. If not, the next subgroup is selected in step 1271. If all subgroups have been broken out, the main loop is repeated.

FIG. 12d

FIG. 12d illustrates a fourth portion of the conference start request diagram.

Join Subgroup

Referring to FIG. 12d, in step 1280, the request is checked for Join Subgroup Request. This request can only be sent by a facilitator, and allows the facilitator to join any selected subgroup to listen in and participate if desired. In step 1281, the request is processed first by setting the facilitator as a listener in the selected subgroup, and receives the current speaker data stream or the "no speaker" data stream or "Floor Open" graphic if no one is speaking. The subgroup attendee lists are updated to show that the facilitator is visiting. The facilitator attendee list is also updated. The main loop is then repeated.

Exit Subgroup

In step 1282, the request is checked for Exit Subgroup Request. This request is issued by the facilitator when leaving a subgroup, to return to the main conference. In step 1283, the request is processed first to determine if the facilitator was speaking, in which case the "no speaker" data stream or "Floor Open" graphic is displayed to all subgroup participants. The facilitator is removed from the subgroup attendee lists, and the main conference room data stream is received by the facilitator. If there is no speaker in the main conference room, the "no speaker" data stream or "Floor Open" graphic is displayed instead. The facilitator attendee list is also updated, and the main loop is repeated. In one example, the exit subgroup and join subgroup requests can be issued in rapid sequence, or the Join Subgroup request can be used to trigger both processes if the facilitator is currently in a subgroup when the Join request is received. This is to allow the facilitator to go directly from one subgroup to another.

Reconvene Conference

In step 1284, the request is checked for Reconvene Conference Request. The request is handled in step 1285 by setting all attendees into the main conference room, updating all of the attendee lists, setting all attendees other than the facilitator as listeners, and transferring control to entry point SS to set the facilitator as the speaker in the main conference room.

Unlock Conference

In step 1286, the request is checked for Unlock Conference Request. In step 1287, the request is processed first by checking the conference mode. If subgroups are active (Multi-Interactive Mode), the request is ignored and the main loop is repeated. Otherwise, in step 1288, the conference lock is turned off, allowing new attendees to join the conference, and the main loop is repeated. In an alternate example, Unlock is allowed, and the conference does not have to be locked in Multi-Interactive Mode. New attendees will appear in the main conference room, and can preferably wait there until the main conference is disbanded, or can be transferred into existing groups by a facilitator.

Move Subgroup Member

In step 1290, the request is checked for Move Subgroup Member (Move Attendee) Request. This request is processed beginning with step 1291, which checks to see if subgroups are active. If so, the request is ignored, and the main loop is repeated. If subgroups have not been broken out, in step 1292, the move request is executed, where the selected attendee is moved to the selected subgroup, and the attendee lists are updated, followed by repeating the main loop. In an alternate example, move requests will be honored even if subgroups are active.

Clear Hands

In step 1293, the request is checked for Clear Hands Raised Request. If the request check fails, the request has not been recognized, and is ignored by repeating the main loop and discarding the request. The request is processed in step 1294 by resetting the status for all attendees with raised hands in the current group or subgroup, and redisplaying the changes in the attendee lists. Next, the main loop is repeated.

FIGS. 13a and 13b

FIG. 13a illustrates an attendee interface, with one hand counted.

FIG. 13a illustrates a recent beta version prototype of the disclosed disclosure, and is somewhat different from the interfaces in FIGS. 5-9 discussed above. For example, in FIG. 13a a "hand" icon is used to illustrate a "hand raised" status, whereas a "hand not raised" status is illustrated by a lack of a "hand" icon.

Referring to FIG. 13b, an alternate example user interface for the present disclosure, the client application window is displayed. Record Indicator 1301 is displayed, indicating that the conference is being recorded. Meeting Title 1302 displays the title for the meeting set by the organizer, and Time Remaining 1303 shows how many hours, minutes, and seconds remain for the meeting. Clicking on the Settings button 1304, revealing the Settings Panel 1320 described below can access the less used controls.

The Video Panel 1305 displays either the current speaker's video (as shown), or a graphic "Floor Open" if no one has the floor, or a graphic "Audio Only" if the current speaker only has a microphone, and no webcam. The current Speaker Name 1307 is displayed at the bottom of the video in a bar where the video or graphic luminance is reduced 50%. Other icons can be displayed in this bar, such as the Hand Raised Indicator 1319 and the Presentation Button 1306 shown. Other items that may be displayed in the bar include a volume indicator (for the speaker only, not for all participants) so the speaker can be aware of the volume of their voice, including a text warning if insufficient volume is detected, such as "Warning: No Audio Signal."

The Presentation Button 1306 is presented when the facilitator launches a presentation. This approach requires the participant to click on the button to launch the presentation window. This approach, rather than an automatic launch of the presentation window is used to avoid issues related to security settings in the browser that has downloaded and launched the client application. For applications that are not browser-based, direct launch of the presentation window may be used.

The Action Button 1308 is the single control button for most functions, including Raise Hand, Lower Hand, Take Floor, and Release Floor (shown). Preferably, this button changes for each possible state, including text, text color, and graphic indicators. In the example shown, the graphic indicators are arrows. Different orientation of the arrows are used for each state: pointing inward for Take Floor, pointing up for Raise Hand, and pointing down for Lower Hand. Other graphic elements may be used in place of the arrows.

Text communication is carried out via the Text Window 1309 and the Text Entry Area 1310. In this example, the Text Window 1309 scrolls down to reveal the most recent message, unless the participant has scrolled away from the bottom of the text stream to view or capture information previously displayed. Simply clicking within the Text Entry Area 1310, typing a message, and pressing the <Return> or <Enter> key sends a text message to the conference participants. Normal editing functions, such as backspace and arrow keys work as usual. The text entry area may change to a color background to indicate it is active.

The number of participants in the conference is displayed via the Participant Count 1311, and the status of any vote or poll is displayed via the Voting/Polling Indicator 1312. In this case, a red block, indicating that less than 50% of the available hands are raised, surrounds the raised hand. The number of raised hands is indicated to the left of the indicator. If 50% of the participants have raised their hands, the block is amber, and if more than 50% have raised their hands, the block turns green, thus giving a quick indication of the vote to the facilitator.

In this example, there are two columns of icons to the left of each participant name in the Participant List 1313. The first column is used for Hand Raised Indicators 1319 and the current Speaker Indicator 1314. The second column of icons indicates the connection type for each participant, such as Video Participant Indicator 1316, Audio Participant Indicator 1317, and Text Participant Indicator 1318. A special icon is used as a Facilitator Indicator 1315. Typically, a facilitator is also a video participant. A raised hand icon may be presented in the video bar as shown to indicate one or more hands are raised. This is necessary because there may be more attendees than can fit in the participant list, and thus raised hands may not be visible in the list unless scrolled to the area where the participant whose hand is raised is located.

If the participant clicks on the Settings Button 1304, a Settings Panel 1320 is displayed, as shown in FIG. 13*b*. This panel has various controls, shown here from the facilitator point of view. A non-facilitator participant may see the same panel with control not accessible to them dimmed out, or may see fewer controls. Typically, only a facilitator may use controls such as Bandwidth Controls 1322, Extension Request 1324, Play Intro Video 1325, and Play Presentation 1326. The Misc Controls 1323 allow the participant to enable message alert sounds, enable text chat (facilitator only), and turn on or off the conference recorder (facilitator only). These are described in more detail in conjunction with FIG. 25.

When the facilitator clicks on the Play Intro Video 1325 button, a video is played in the Video Panel 1305 to all participants. This video may contain a presentation on how to use the conferencing system, designed for new users, and relives the facilitator from the chore of describing over and over again to new participants how the system works.

When the facilitator clicks on the Play Presentation 1326 button, the presentation window is launched, and the Presentation Button 1306 is displayed for all participants, allowing them to launch their own window to view the presentation. Presentation controls only appear for facilitators within the presentation window. Additional controls may appear in the Settings Panel, such as access to Flash Settings, Group Formation and Control, and other functions, not shown.

FIG. 14*a*

FIG. 14*a* is a first portion of a sign-in diagram. FIG. 14*b* is a second portion of a sign-in diagram. FIG. 14*c* is a third portion of a sign-in diagram.

The sign-in process begins in step 1401 in FIG. 14*a*. In this process, EC is used to represent an "Event Code" for accessing a specific videoconference event. This code is generated by the web application when an event is scheduled, and may be a unique combination of numbers and optionally other characters. For example, a 7-digit number from 0 to 9999999 could be used, allowing up to 10 million unique codes. These codes may be restricted to 1000000 to 9999999 to avoid leading zeros, and may be formatted in various ways, such as NNN-NNNN or NN-NN-NNN, where N represents a numerical digit. For a participant to access a videoconference, he must have the required event code (EC). The process takes place via a web browser that has been sent to the sign-in page of the web application that embodies the sign-in process. Other mechanisms for accessing a particular conference include a unique URL, or a URL with a specific QueryString value. Other ways of identifying a specific conference are well known to one of ordinary skill in the art, and will not be discussed further herein.

In step 1402, the web server session variable EC is checked for a valid value. If one exists, continue to step 1404 and enter the value in the text entry area automatically for the user. The validity of the session variable is simply that it exists as a string of the required length, or some other similar simple text. For example, checking to see if the format is NNN-NNNN. If no valid EC value exists in the session variable EC, then the user is presented with an empty text entry area in step 1403 to type in the value. Typically, the cursor is automatically moved to the text area input to make it easier for the participant to enter the code.

In step 1405, the user clicks on a button to check the event code. In this example, the button may be labeled "Check Event." In step 1406, the web application accesses the event database to see if the event code refers to an even that ends in the future. This includes events that have not yet started, as well as events that are ongoing, but does not included events that have already been completed. If no event exists with this code, or the event has already been completed, then an error is reported in step 1407, such as "No Such Event," and the process ends at step 1408. The user may at that point try a different value, starting again at step 1401.

If the event code matches a videoconference event that ends in the future, the process continues to step 1409, where the web application checks the database to see if this is a paid (Box Office) event. If not, the process proceeds to step B in FIG. 14*b*. If so, the process continues to step 1410, where a check is made to see if the participant has logged into an existing account. If not, the process continues to step 1411, which displays for the user two options: log in or create a new account. Note that it is necessary for a participant to have an account for Box Office events in order to relate a future e-commerce transaction to the account, and thus allow the participant access to the event after paying for it.

If the participant does not have an account, the process proceeds to step 1412 where the participant sets up an account. Of course, the participant may cancel the process at any time by closing the browser window. Once an account has been set up, the process continues to step 1413 where the participant is logged in automatically. If the participant does have an account in step 1411, the process proceeds to step 1413, where the participant logs into their account, typically by entering a user ID and a password.

Next, in step 1414, the web application checks the database to see if the participant has already purchased the Box Office ticket for the event. If so, the process continues to step B in FIG. 14*b*. If not, the user is presented with a shopping cart in step 1415, where the user follows a standard e-commerce checkout procedure in step 1416. This may occur on the web application server, or on a remote e-commerce server. In any case, an e-commerce provider processes the transaction, and appropriate information validating the transaction is posted back to the web application in step 1417. This information includes unique identifiers that allow the web application to access the participant's account and register the purchase of a Box Office ticket for the specified event.

Once the e-commerce transaction is completed, the participant may be returned to the sign-in page, as shown to enter the event. In this second pass, the participant is already logged in, and the ticket has been purchased, so the participant is quickly sent on to step B in FIG. 14*b*.

Alternatively, the participant closes the web browser, and returns at a later time. This is the case where the participant purchases the ticket several hours or days before the event to facilitate a quick entry to the event when the time arrives.

FIG. 14*b*

Referring now to FIG. 14*b*, step B, the sign-in process continues. In step 1420, the web application checks to see if the event is ongoing (started in the past), or is a future event. If a future event, in step 1422 a check is made to see if the event begins more than 15 minutes in the future. If not a future event, proceed to step 1421, described below. If step 1422 determines that the event starts more than 15 minutes in the future, the process continues to step 1424, where the duration of time between now and the start of the event is displayed, along with a message, such as "Please Check Event again 15 minutes before the start time" for example. Otherwise, in step 1423, the remaining time to when the event starts is displayed, and the process continues to step 1425.

The value of 15 minutes used here is arbitrary and can be set to any desired value, as long as care is taken to ensure that the participant's web server session does not expire, or some way is provided to avoid restarting the sign-in process if it does expire, such as the use of cookies or JavaScript® or other mechanisms well known to one of ordinary skill in the art. Typically, a web server session expires in 20 minutes, where all current state for the participant is lost.

The user may click the Check Event button again at any time—even after the session has expired, since the only value, the Event Code, still resides in the text entry area. However, if the user was logged in prior to the session expiration, the user account information will no longer be available.

If step 1420 determined that the event starts in the past, the sign-in process 1401 continues in step 1421. Since a validity check has already been made previously in step 1406, we know in step 1421 that the event is ongoing at this time. Thus, the number of minutes that have elapsed since the event began is displayed, such as "event started 25 minutes ago," for example. The process continues in step 1425.

Step 1425 is only reached if the event is currently ongoing, or if it starts in 15 minutes or less. Thus, the Event Code is stored in the session variable. This variable is used in the initial sign-in process (steps 1402, 1404) to eliminate the repetitive entry of the Event Code by the participant. Next, in step 1426, the web page is redisplayed, by replacing the welcome message with a message, such as "Click the Event Sign-In button to register," for example. Also, the Check Event button is redisplayed as an Event Sign-In button, and the Event Code is displayed as text rather than a text entry field. These changes are in addition to displaying any relevant messages, such as "Event began 2 minutes ago," for example. This change in the page is a convenient way to distinguish between situations where the event is not available and where it is available. Other methods may be used, as well understood by one of ordinary skill in the art, such as displaying a second web page instead of modifying a single web page as described in this example.

Also, by the use of JavaScript®, the web page may automatically click the Event Sign-in button after a short delay. In this case, the message displayed replacing the welcome message might be "Click the Event Sign-In button to register, or wait for automatic redirect in 5 seconds." This gives time for the participant to read the message the first time, and allows an experienced participant to immediately click the button without waiting.

In step 1427, the user clicks the Event Sign-In button, or the JavaScript® clicks the Event Sign-In button after a short delay. In step 1428, JavaScript® code related to the button launches a second page, sized exactly to fit the application window of the video conferencing client application, running on the Flash Player plug-in in other ways well understood by one of ordinary skill in the art, such as a Java® plug-in. This window does not yet contain the video conferencing application, but instead shows the registration window that will be described in relation to FIG. 15 below. The JavaScript® may also force the new window to the front after a short delay, to ensure that it is visible to the participant. This may be necessary if the sized window is smaller than the original sign-in window, and because the sign-in window may return to the front, hiding the new registration window.

At this point, in step 1429, the background sign-in window is redisplayed in its original form, with welcome message and text, and with the Event Code displayed as already entered in the text entry area. This allows the participant to re-enter the event easily if needed. The process then continues to the registration process described below in relation to FIG. 15.

In addition to accessing a videoconference event on the web server supporting the main conferencing website, it is also possible to allow remote access to videoconferencing within partner websites. One method for doing this is described below, but other methods will be obvious to one of ordinary skill in the art.

FIG. 14*c*

Referring to FIG. 14*c*, the upper blocks preferably take place on the partner website, and the lower blocks preferably take place on pages not visible to the participant on the main web application site. In step 1430, Remote Registration begins. In step 1431, the partner site does whatever they desire to register a participant. This may include e-commerce, creating an account on the partner's system, and supplying various pieces of information required by the partner. The process also may include validation steps, such as an email validation that includes the participant receiving an email and clicking on a link to validate their email address.

In step 1432, the partner web application generates a Registration Code (RC) to uniquely identify this participant. This code could be the account ID for the participant on the partner's website, for example. Next, in step 1433, a properly sized window is launched via JavaScript®, using a main web application URL provided to the partner. For this example, information is transferred to the main web application via the QueryString associated with the URL. Other methods, such as posting the information to a back-office page on the main web application site may also be used. In this example, the unique Registration Code and the unique Partner Code (PC) is provided.

The link between step 1433 and 1434 is shown as a dotted-line arrow, indicating that this is a transition from activity on the partner site to activity on the main we application site. In step 1434, the main web application retrieves the RC and PC values from the QueryString. In step 1435, this information is posted back to the partner site using a provided validation URL at the partner site. This information is provided to the main web application as one of the pieces of information associated with their partner account. In step 1436, the partner site responds with XML data at the validation URL that is read by the main web application. This operation is entirely invisible to the participant. The data can be in other formats, such as text or HTML, for example. The required minimum information being returned is the participant's name (or "handle"), to be displayed during the videoconference, plus the Event Code.

In step 1437, the main web application checks to see if the PC and EC values are valid. If so, the process continues in the registration process entry point A in FIG. 15. If the values are not valid, an error message is displayed in step 1438, and the process ends. Validity of the information is typically determined by accessing the database associated with the video conferencing main web application.

FIG. 15

FIG. 15 is a registration procedure diagram.

The sign-in process continues to registration in FIG. 15. In step 1502, the participant's browser cookies are examined to determine if a cookie containing the Attendee ID (AID) exists. This is a unique code assigned to a participant when they have completed the registration process. It is then stored as a cookie on the participant's computer that expires at the end of the conference so the participant does not need to register more than once, in case of technical difficulties (such as a computer crash, accidentally closing the browser window, etc.).

If the cookie does not exist, continue to step 1504. If the cookie does exist, in step 1503 a check is made to see if the AID code relates to the Event Code EC. This is determined by looking up the AID code in the participant database, which includes information such as the user name and the Event Code. If a proper match is found, the web application does a bypass of the registration process by going directly to step 1516. If the EC does not match, than the AID cookie is left over from some other event, and the process continues in step 1504.

In step 1504, the web application retrieves the registration requirements for this event, using the Event Code. Requirements are set by the conference organizer, and may include email, post office address, phone number, or other information. Some of the information may require validation, such as the email address. Validation may also be set as unnecessary by the organizer, as well, during the conference setup process.

In step 1505, the required blank information fields are presented to the participant. In this example, the participant's name is always required, but the conference organizer may also require other information. The participant fills in the required information in step 1506 and clicks the Submit button. In step 1507, the information is checked for validity. This may include looking up the information via online databases, such as an address check, or phone number check, or may simply be a check to see if some reasonable content has been provided. For example, if no data is entered in a field, or if the entry is too short to be valid are some simple checks. Phone numbers can be checked against a formula, such as (NNN) NNN-NNNN, for example, where N represents any digit. If the data provided is deemed to be invalid, an error message is displayed in step 1508, and the process returns to step 1506 for data entry.

Once valid data is received, the process continues to step 1509, where it is determined if an email address is required, and specifically, that it must be verified. It is also possible to not verify the email address (not shown). If no email address was required, the process continues in step 1514. Otherwise, the process continues in step 1510, where the web application checks to see if this participant has logged in. In this case, the participant has an account on the system, and the email can be retrieved by using the validated email in the participant's account. In an alternate example, the email could have been automatically entered in step 1506, eliminating the need for the participant to re-enter it each time during registration.

If the participant is logged in, the web application in step 1515 retrieves the participant's validated email address from their account, and continues to step 1514. If the participant is not logged in, in step 1511 the web application sends an email to the provided email address with a validation link. A validation link can consist of various elements well understood by one of ordinary skill in the art, such as a page URL with additional information in the QueryString that can be used by the referenced page to validate the email address for this participant. In this example, that information might include a unique registration code, for example. The referenced page would then use the registration code to associate the validation process with the specific participant. In an alternate example (not shown), this registration code could be the proposed AID code to be assigned to the participant in step 1514.

The web application then presents a message to the participant in step 1512, such as "Validation Email has been sent. Please check both your inbox and your junk mail or spam folder. Click on the link provided to validate your email. Once you have done this, click on the Continue button below."

When the participant clicks on the Continue button, the validation state for the participant is checked in step 1513. If the validation has not been received, the participant is returned to step 1512. If the participant's email has been validated, the participant is registered in step 1514 using the data provided in step 1506, and a unique AID code is associated with the participant. This unique AID code may be a value used in the validation process as described above, or may be generated as an index into the participant database table. The primary requirement is that it be unique to this participant for this videoconference event.

Also in step 1514, the assigned AID code is saved on the participant's machine as a cookie. This process allows rapid re-entry to the event for the participant in the event of some technical difficulties, as described above. Finally, in step 1516, the video conferencing client is launched in the correctly sized window that was launched by JavaScript® in step 1428 of FIG. 14*b*. Step 1516 may include an additional step or two, such as offering the participant files to be downloaded, if provided by the conference organizer, and an opportunity to set various connection options, such as connection mode (video-audio-text, audio-text, or text-only) and other features, such as use of a proxy server, for example. The final step is to launch the video conferencing client application to allow entry into the conference at the completion of sign-in and registration.

Step 1514 also represents an entry point from FIG. 14*c* step 1437 to complete the process of remote registration and launch of the video conferencing client application.

FIG. 16

FIG. 16 is a mobile/partner sign-in/registration.

FIG. 16 depicts an alternate example of a process for mobile device or partner website to sign in and register for a videoconference. The process begins in step 1601. In step 1602, a participant, using either a mobile device or a web browser in an internet-enabled device, enters an Event Code. In alternate examples, this code may be provided by the partner website in some manner, or provided automatically as part of processing an invitation. If the mobile device or partner site requires it, a user ID and password may be entered in step 1603.

The collected information (EC and UID and password, if applicable) is then posted to the main web application in step 1604. Additional information, such as a partner ID may also be passed. This is shown as a gray arrow between steps 1604 and 1605, which indicates this is a passing of information between two separate applications over the Internet.

In step 1605, the main web application checks to see if the provided EC is valid, i.e., represents a conference that ends in the future. Other checks may be made, such as is the conference related to the partner's account. This type of check depends on the passing of a partner ID. Also, the ability to operate the system remotely may be a feature that only certain account types have access to, and this type of check can also be made, ensuring that only partners that have the correct type of account may use this remote function. If any of the validity checks fail, the process continues in step 1606, where the web application reports back the error to the partner site or mobile application. This can be done in a number of ways well understood by one of ordinary skill in the art, such as returning a value in XML or in other ways.

The error code travels over the Internet, as shown in the gray arrow between steps 1606 and 1607, and is received and reported to the partner site or mobile application and to the participant in step 1607. Control then returns to step 1602, where the participant or the partner site or mobile application provides an EC code.

If the validity checks in step 1605 are successful, a check is then made for a user ID and password in step 1608. If step 1608 determines that no user ID and password are provided, control is passed to step 1613, described below. If step 1608 determines that a user ID and password were provided, the information is then checked for validity in step 1609. If the validity check fails, in step 1610 the partner site or mobile application returns an error to the main web application, in a similar manner as described for step 1606 and 1607. Otherwise, in step 1612, available information is extracted from the participant's account for registration purposes, such as the participant's name.

Next, in step 1613, the event status and any required registration information is returned to the partner site or mobile application. The required registration information is found using EC.

The partner site or mobile application receives the returned status and registration information over the Internet in step 1614, and requests missing information from the participant in step 1615. One piece of required information is the participant name. The conference organizer, as described above, may require other information. Once the participant has entered the required information, it is then checked as described above. In step 1616, if an email address was requested, the email address is validated in step 1617. This may include sending an email to the participant's email account with a validation link, as described earlier. If the participant has a verified email address in their account that was accessed using their user ID and password, no additional validation is required.

Once the email is validated in step 1617, or no email was requested, in step 1618 a determination is made for a Box Office purchase for the conference. If this is a Box Office required ticket purchase, and the participant has not already purchased a ticket, in step 1619 the required e-commerce process is completed.

Once any Box Office purchase is handled by step 1619, or if the participant has already purchased a ticket, or if this is not a Box Office conference, in step 1620 the registration information collected, plus any required e-commerce information is passed back to the main web application. The registration information typically includes the participant's name. The e-commerce information, if available, may be stored with the participant's account to avoid requesting a second payment. Alternatively, the participant purchase information is maintained in the partner site application or mobile application, and is used to determine if a Box Office transaction has already been completed.

Next, in step 1621, the main web application creates a participant record for the conference, and creates an AID code. Registration information may be written in a database table associated with the AID code, and may also include the EC. The AID code is then returned to the mobile application or partner site in step 1622, along with an appropriate URL in the main web application that allows the mobile application or partner site to access the videoconference.

In step 1623, the mobile application or partner site launches the videoconferencing client using EC, AID, and the data access URL. The videoconferencing client then proceeds to connect to the video streaming server (Connect to Server), described below in conjunction with FIG. 18.

FIG. 17

FIG. 17 is an embedded conference.

FIG. 17 shows a very similar process as described above for FIG. 16. Specifically, FIG. 17 is a variation of FIG. 16 for an embedded conference or a variation on a mobile application. Rather than repeat the entire process, we will focus on the primary differences between FIG. 16 and FIG. 17.

The embedded case is where the videoconference actually appears right on a page from the partner site, rather than a separate window launched from the partner site that is tied to the main web application. The same approach described here would also work for a mobile application. For this description, we will focus on the embedded application case, with the understanding that the same process could be used for a mobile application, as well.

Each of the blocks in FIG. 17 have a related number to the blocks in FIG. 16. For example, block 1704 in FIG. 17 relates directly to block 1604 in FIG. 16. The primary difference between the two figures relates to the collection of and filing of information for registration purposes. Specifically, the embedded application has a relationship with the participant, and not with the videoconferencing provider. Thus, the methods they use to allow a participant into a specific conference is not relevant to the main web application, and no doubt will be handled differently for each partner or application.

Thus, in steps 1702/1703, information is received for registration purposes. The only required information from the main web application point of view is the participant's name, the event code, and perhaps the partner or application ID, which can be used to validate that the desired event is actually related to the partner account. This information is gathered by the embedded application in some way, and passed to the main web application in step 1704. Skipping over the description for the main web application steps 1705 to 1713, in steps 1714 and 1715 any information not already provided must be entered. However, it is most likely that all information was provided to complete the registration process for the participant as far as the main web application is concerned right at the beginning (step 1702/1703), and no additional processing is required by the embedded application in step 1714 thru 1720. In effect, this would make it possible to bypass steps 1713 through 1720, and post all required information back to the main web application without additional interaction with the participant. As stated above, the main web application requires only the participant name, EC, and perhaps the partner or application number in order to generate the required AID code and URL to the client application code that will be loaded into the partner website page.

So in conclusion, FIG. 17 shows a very similar process to a partner or mobile sign-in and registration, but for an embedded case, and that it is highly likely that all registration information is already available at the start, thus allowing step 1704 to post the required information that is then received in step 1721, eliminating all of the intermediate steps.

FIG. 18

FIG. 18 is a flow diagram of a client connecting to server.

FIG. 18 is an example of the client connecting to the streaming server. In step 1801 the client makes a connection request with the streaming server passing it the following information: user ID, used as the unique identifier for clients; conference ID, the unique identifier for a conference; user name, used for display purposes in the user interface; facilitator; a variable designating if the client has facilitator privileges in both the client side program and the streaming server; record, used to determine if the conference has the ability to be recorded; hardware (hw) setup, used to determine the device configuration of the client (e.g. microphone, camera). Proceed to step 1802.

In step 1802 the streaming server receives the information from the client request and determines if this is the first client to connect to the conference. If this is the first client proceed to FIG. 21—Validate Conference. If this is NOT the first client then proceed to step 1803.

In step 1803 the streaming server checks to see if the conference is valid which is determined in the Validate Conference flowchart. This is set to true when the conference starts so that clients that connect before validation completes are allowed in. If the conference is valid, proceed to step 1804. If the conference is not valid proceed to step 1809.

In step 1804 the streaming server increases the total user count, used to keep track of the total number of connected clients. Proceed to step 1805.

In step 1805 all of the connected clients are updated with the information regarding the new user. This is used by the clients to update their UIs. Proceed to step 1806.

In step 1806 the streaming server determines if the user ID already exists. Since the system maintains unique user identifiers it is possible for different reasons that a client connects with a user ID that already exists. An example would be if the client opened up the system in one browser and launch the video conferencing in another browser. If the user ID already exists proceed to step 1811. If the user ID does not exist proceed to step 1807.

In step 1807 the streaming server returns a Client Accepted message which informs the client that it is connected to the Video Conferencing System. Proceed to step 1808.

In step 1808 the client receives the Client Accepted connection. This is the end of the process.

FIG. 19

FIG. 19 is a flow diagram of a client manage connection.

FIG. 19 is an example of the client process that manages the connection to the streaming server. The process begins when a successful connection is made with the streaming server (see FIG. 18—Client Connect to Server). Both the client and the streaming server have a process to manage a connection. Every two seconds (preferably) the client sends a check-in message to the server and if the server receives this message it will respond back. If the client does not get a server response back after 3 attempts (preferably) the connection is reset and if there is a successful reset connection to the server the process begins again. The first step 1901 sets the check_in_tries variable to 0. Proceed to step 1902.

In step 1902 the client waits 2 seconds to allow time for server to respond to check-in. Proceed to step 1903.

In step 1903 the client checks to see if check_in_tries is greater than 2. This step is to check if the max number of failed check-ins has been reached. If check_in_tries is greater than 2 then proceed to step 1908. If check_in_tries is less than or equal to 2 than proceed to step 1904.

In step 1904 the client increments the check_in_tries variable. Proceed to step 1905.

In step 1905 the client 'pings' the streaming server to check in. After sending the ping two steps follow asynchronously. Proceed to step 1906 to continue the streaming servers response of the ping and also proceed to step 1902 where the client waits 2 seconds for the server to respond with an asynchronous callback.

In step 1906 the server receives the ping and sets the last_check_in_time for this client to the current time. Proceed to step 1907.

In step 1907 the server returns success from the ping call. Proceed to step 1909.

In step 1908 the client displays a dialog informing the client that it is attempting to reconnect to the streaming server. Proceed to FIG. 18—Client Connect to Server. If the client is successful in that process then the FIG. 19 process begins again.

In step 1909 the client receives the response back from the server and sets the check_in_tries to 0 which indicates that the client has 3 new attempts to check connection with server.

FIG. 20

FIG. 20 is a flow diagram of a server manage connection.

FIG. 20 illustrates an example of the server process that manages the connection to the connected clients. The process begins when the streaming server application launches. Both the client and the streaming server have a process to manage a connection. Every 5 seconds the server checks the last check-in time for all of the connected clients. If any connected client has not checked-in before each 5 second check, that client is disconnected. In step 2001 the server waits 5 seconds before checking the connections. Proceed to step 2002.

In step 2002 the streaming server retrieves the connected client list. Proceed to step 2003.

In step 2003 the streaming server gets the first client off of the list. Proceed to step 2004.

In step 2004 the server checks if the current client has checked in within 5 seconds. If the client has checked in proceed to step 2005. If the client has not check in proceed to step 2007.

In step 2005 the server checks to see if there are any more clients in the list to check. If there are, proceed to step 2006. If not, proceed back to step 2001.

In step 2006 the server gets the next client off of the list. Proceed to 2004.

In step 2007 the server calls the 'disconnect' call on the client object which makes sure the client is disconnected from the server perspective as well as removes the client from the server maintained list of connected clients. Proceed to step 2005.

FIG. 21

FIG. 21 validates a conference.

An example of the server process that validates the videoconference. This process is executed when the streaming server application is launched, almost always when the first user connects to the system. In step 2101 the Conference Valid variable is set to 'YES' allowing clients to join until the conference has been validated. Proceed to step 2102.

In step 2102 the streaming server validates the conference with the web server passing it a conference ID. Proceed to step 2102.

In step 2103 the web server receives the request and determines whether the conference is a valid conference. If it is a valid conference, proceed to step 2104. If it is not a valid conference, proceed to step 2105.

In step 2104 the web server checks to see if the conference is not only a real conference, but also that the conference start time is less than or equal to the current time AND the conference end time is greater than the current time. If those three criteria are met then the conference is valid, if not then the conference is invalid. Proceed to step 2105.

In step 2105 the success value is returned to the calling streaming server. Proceed to step 2106.

In step 2106 the streaming server receives the results and if the conference is valid proceeds to 2107. If the conference is not valid proceed to step 2108. If the response was never received proceed to 2111 which requests the validation again.

In step 2107 the process ends with the server setting the Conference Valid to 'YES'.

In step 2108 the streaming server disconnects all currently connected users because the conference is NOT valid. Proceed to step 2109.

In step 2109 the streaming server sets the Conference Valid to 'No' so that all future clients connecting can be refused. This is the end of the process.

In step 2111 the streaming server waits 3 seconds before making another validation request to the web server.

FIG. 22

FIG. 22 shows a first and second audio/video stream connection.

The flow of data and control for a 2-attendee or participant conference is shown in FIG. 22. The upper portion of the FIG. 2201-2204) shows the case where Attendee/participant 1 is speaking and attendee/participant 2 is listening. The lower portion of the FIG. 2211-2214) shows the same configuration, but with the case where attendee/participant 2 is speaking and attendee/participant 1 is listening.

The base configuration includes the web server 2202, 2212 and the video-streaming server 2201, 2211. Additionally, a database server (not shown) may be included to manage user account data from the web server 2202, 2212. The streaming server and web server may be a single server, although this is not required.

Web server 2202, 2212 provides the browser-based user interface for setting up accounts, paying for accounts, setting up and managing videoconferences, and other housekeeping chores, as described above in relationship to FIG. 3. Typically, account, conference, and attendee/participant information and records are preferably kept in a separate database on the database server (not shown). Web server 2202, 2212 also provides the mechanism for the browser to load the client applications 2203, 2213 and 2204, 2214 that proceed to interact with the web server 2202, 2212 for account and conference information, as well as connecting with and communicating with the streaming server software described in relationship with FIG. 4, running on streaming server 2201, 2211.

Thus, control information flows between the web server 2202, 2212 and streaming server 2201, 2211 as shown in the diagram, as well as between the client applications 2203, 2204 and both servers 2201, 2211 and 2202, 2212, as shown in the diagram.

FIG. 22 depicts two audio/video streams between the client application 2203, 2213 and 2204, 2214 and the streaming server 2201, 2211. However, depending on which of the two cases described above, only one of the audio/video streams is active ("Active A/V Stream") between each client and the streaming server, and one is inactive ("Inactive A/V Stream"), as shown. Thus, audio/video data flows only in one direction—left to right in the upper case (attendee 1 speaking), and right to left in the lower case (attendee 2 speaking). The term "inactive A/V Stream" used herein refers to the possibility of a stream existing, but not to an actual stream.

Thus, control and information flows in both directions, as shown in the control/Status arrows on FIG. 22, while audio/video data only flows unidirectionally, the direction depending on who has the floor.

Note that if neither attendee/participant has the floor, then all A/V streams are inactive (not shown).

FIG. 23

FIG. 23 shows a third and fourth audio/video stream connection.

In FIG. 23, the case for three attendees is shown. The upper diagram (2301-2305) shows attendee/participant 1 speaking, and attendees/participants 2 and 3 listening. The lower diagram shows attendee/participant 2 speaking and attendees/participants 1 and 3 listening.

As in FIG. 22, control and status information flows in both directions between the streaming server 2301, 2311 and web server 2302, 2312, as well as between attendee client applications 2303, 2304, 2305, 2313, 2314, 2315 and the streaming server 2301, 2311 and the web server 2302, 2312.

However, also as in FIG. 22, A/V streams are unidirectional. In the upper diagram, A/V data flows from attendee/participant 1 2303 and the streaming server 2301, and from the streaming server 2301 and both attendee/participant 2 2304 and attendee/participant 3 2305. The reverse direction A/V streams are inactive.

The lower diagram in FIG. 23 shows the second case, with A/V data flowing from attendee/participant 2 2314 to streaming server 2311, and from streaming server 2311 to both attendee/participant 1 2313 and attendee/participant 3 2315.

As with FIG. 22, all A/V streams would be inactive if no one had the floor (was speaking).

A fifth case (not shown) similarly occurs when Attendee 3 is speaking, and Attendees 1 and 2 are listening.

FIG. 24

FIG. 24 shows a take floor interface.

FIG. 24 shows a grey version of a full color example 2400 of the client application 206a or 206b from FIG. 6 of the present disclosures, and is similar to FIGS. 13a and 13b with few minor differences. For example, a red flag 2401 is used to indicate a facilitator in addition to the icon change in the next column to the right. This is an alternate way of indicating a facilitator, and can be used in conjunction with a standard video, audio, or text icon in the second column, rather than the special icon shown. Another difference is that no speaker identification bar showing the speaker name 1307 is shown in FIG. 25.

As in FIGS. 13a and 13b, the interface includes a Settings button 2402. When clicked, a settings panel scrolls down from below the title bar, and is shown in FIG. 25.

FIG. 25

FIG. 25 is a settings panel.

The settings panel 2500 is one example of a mechanism to provide additional controls to either participants or facilitators. Other mechanisms are well known by a person of ordinary skill in the art, such as a menu bar, and will not be discussed herein.

The settings panel 2500 has two views: one for a facilitator (shown), and one for a participant (not shown). The participant settings panel may only include controls that the participant may use, or it may show all controls, with those not available to a participant dimmed out. The advantage of the second approach is to enable a participant to view features available to a facilitator, and thus the second approach acts to some extent as a promotion of features to potential future customers (and as familiarization for future facilitators).

The settings panel 2500 has several sections, including connection controls 2501, bandwidth selection controls 2502, and other tools 2503. In addition, a button to access Flash Settings 2504 is provided, in case the participant or facilitator is not aware that a right-click will provide access to a menu that includes Flash settings. Also included is an optional Close button 2505, in case the participant or facilitator is not aware that clicking on the Settings button 2402 will both open and close the Settings Panel 2500.

Connectivity controls 2501 may include a Reset Audio/Video button and a Reset Network button. These buttons are typically seldom if ever needed, and can be eliminated. Bandwidth controls 2502 allow a facilitator to change the bandwidth allowed for the audio/video stream. In this case, we show three values, but any number of values may be provided. The usefulness of this feature is that when one or more participants is connecting via a slow internet connection, or has an older computer that can't handle a full bandwidth signal, the facilitator may reduce the bandwidth of the conference.

FIG. 26

FIG. 26 initiates a floor change.

FIG. 26 is an example of a video conference client initiating a 'floor change.' In step 2601 the participant clicks on the 'Action Button'.

In step 2602 the state of the floor is checked for the state 'LISTEN'. This state indicates that the participant does not have the floor and also does not have a hand raised. If the state of the floor is 'LISTEN', then proceed to FIG. 27—Hand Raise/Take Floor, step 2700. If the state of the floor is not 'LISTEN', then proceed to step 2603.

In step 2603 the state of the floor is checked for 'HAND RAISED'. This state indicates that the client has a "HAND RAISED". If the current state of the floor is 'HAND RAISED', then proceed to FIG. 28-Lower Hand, step 2800. If the state of the floor is not 'HAND RAISED', then proceed to FIG. 29-Release Floor which assumes that the client has the floor and is now going to release it.

FIG. 27

FIG. 27 raises hand and takes floor.

FIG. 27 illustrates an example of a video conference participant sending a 'Raise Hand/Take Floor' request to the streaming media server. In step 2701 the participant (client) sends a 'Request Floor' message to the streaming media server.

In step 2702 the streaming server receives the request and checks to see if the floor is 'OPEN', which indicates that no client currently has the floor. If the floor is open, proceed to step 2703. If the floor is not open, which indicates another client has the floor, proceed to step 2709.

In step 2703 the client the streaming server determines if the client has a microphone and/or camera. If the client has a microphone and/or camera then the client can stream audio/video and thus is able to have the floor. If this is the case proceed to step 2704. If the participant does not have a microphone or camera, then the participant is only able to send text messages and thus cannot have the floor. If this is the case proceed to step 2709. Preferably a microphone and a camera are both required to be able to take the floor, but a conference of deaf participants may use American Standard Sign Language for "speaking," and thus would not need necessarily need microphones for taking the floor and "speaking" using sign language.

In step 2704 the streaming server sets the internal client status to FLOOR and sets the internal Floor Owner to the current client. These variables are used to determine floor ownership. Proceed to step 2705.

In step 2705 the streaming server updates all connected clients (participants) with the status change of the current client. This is done so that the connected clients can update their UIs. Proceed to step 2706.

In step 2706 the streaming server sends back a Floor Received response to the client which lets the client know that the client now has the floor. The client can now stream audio/video and make appropriate UI changes.

In step 2709 the streaming server sets the client's state to Hand Raised and then in step 2710 increases the total hand raise count. This total is used to inform connected clients of the total number of clients that have hands raised. Proceed to step 2711.

In step 2711 the streaming server informs all connected clients of the status change of the current client, which is that the client's hand is raised. Proceed to 2712.

In step 2712 the streaming server sends a Hand Raised response back to the client to inform the client that the floor is owned by another client, but the requesting client's hand is raised. Proceed to step 2713.

In step 2713 the client receives the Hand Raised message from the server and makes the appropriate UI changes.

FIG. 28

FIG. 28 lowers hand.

FIG. 28 illustrates an example of a video conference client (participant) sending a 'Lower Hand' request to the streaming media server. In step 2801 the client sends a 'Lower Hand' message to the streaming media server.

In step 2802 the streaming server receives the request and checks to see if the client has a hand up. If the client does not have a hand up, the process ends at 2809. If the client does have a hand up, then proceed to step 2803.

In step 2803 the streaming server sets the client's state to LISTEN which indicates the client does not have the floor and has no hand raised. Proceed to step 2804.

In step 2804 the streaming server reduces the total hand raised count. This count is used to keep track of the total number of clients with hands raised. Proceed to step 2805.

In step 2805 the streaming server updates all connected clients with the new status change of the current client. This update is used to refresh the UIs of the connected clients. Proceed to step 2806.

In step 2806 the streaming server sends a "Hand Lowered" message to the client. Proceed to step 2807.

In step 2807 the client receives the "Hand Lowered" message and makes the appropriate UI changes. This ends the process.

FIG. 29

FIG. 29 releases the floor.

FIG. 29 illustrates an example of a video conference client (participant) sending a 'Release Floor' request to the streaming media server. In step 2901 the client preferably stops sending the audio/video stream to server. This is done before the server is notified that the floor has been released because of the buffering that occurs in video streaming. Proceed to step 2902.

In step 2902 the client waits for 1 second after the audio/video streaming has been stopped. This is related to the video buffering issue above. Proceed to step 2903.

In step 2903 the client sends a Release Floor message to the streaming server notifying it that the client is no longer streaming audio/video and no longer wants the floor. Proceed to step 2904.

In step 2904 the streaming server receives the message and determines if the client has the floor. If the client does not have the floor, the process ends. If the client does have the floor, proceed to step 2905.

In step 2905 the Floor Owner, an internal server variable, is cleared to show that no client has the floor.

In step 2906 the streaming server sets the client's state to Listen, meaning the client no longer has the floor. Proceed to step 2907.

In step 2907 the streaming server updates all clients regarding the status of the requesting client informing them that the client no longer has the floor. Proceed to FIG. 30a-Next Speaker which will select a client with a hand raised and then proceed to step 2908.

In step 2908 the streaming server sends a Floor Released message to the client informing it of its new floor state. Proceed to step 2909.

In step 2909 the clients receives the Floor Released message and makes the appropriate UI changes. The release floor process ends here.

FIGS. 30a and 30b

FIG. 30a shows a first portion of going to the next speaker.
FIG. 30b shows a second portion of going to the next speaker.

FIGS. 30a and 30b are an example of the process on the streaming server to find the next client (participant) with a hand raised and give that client the floor. In step 3001 the server retrieves the client list which is maintained by the streaming server. Proceed to step 3002.

In step 3002 the streaming server retrieves the first client name from the list. A client on the list includes variables that are native to the streaming server, but also variables that can be added unique to the application (e.g. floor state, hardware setup, and most importantly for our purposes here, time when hand was raised). Proceed to step 3003.

In step 3003 the streaming server determines if the current client's floor state is Hand Raised. If the current client has its hand raised, then proceed to 3004. If the client does not have a hand raised, then proceed to step 3006 where the server checks to see if there are any more clients in the list.

In step 3004 the server determines if this is the first raised hand found in this list. If it is, proceed to step 3008. If it is not the first raised hand found, proceed to step 3005.

In step 3005 the streaming server checks to see if the current client's hand was raised before the First Hand client variable. This variable is set in step 3008 and is set to the client that has raised its hand earlier than any of the others in the list. If the current client's hand was raised before the First Hand client proceed to step 3006. If the current client's hand was not raised before the First Hand client proceed to step 3006.

In step 3006 the streaming server determines if there are more clients in the list to be checked. If there are more clients proceed to step 3007. If there are no more clients proceed to step 3009.

In step 3007 the streaming server retrieves the next client found in the client list. This retrieved client becomes the current client. Proceed to step 3003.

In step 3008 the streaming server sets the First Hand client variable to the current client either because this is the first client found in the list with a hand raised, or this is currently the client that has raised its hand earlier than all other clients checked. Proceed to step 3006.

In step 3009 the streaming server checks to see if the variable First Hand is set to a client. If the variable is not set, which indicates no client has a hand raised, then proceed to step 3016. If the variable is set, proceed to step 3010.

In step 3010 the client assigned to First Hand is set to the Floor Owner variable maintained by the application. Proceed to step 3011.

In step 3011 the streaming server decrements the total hand raised count as the First Hand client has become the floor owner and its hand is lowered. Proceed to step 3012.

In step 3012 the streaming server sets the First Hand client's state to FLOOR. Proceed to step 3013.

In step 3013 the streaming server sends a Floor Received message to the First Hand client. Proceed to 3014.

In step 3014 the First Hand client receives the "Floor Received" message and is now able to stream audio/video and make the appropriate UI changes. This is the end of the process.

In step 3016 the streaming server sends a Floor Open message to all connected clients informing them that the floor can now be taken by any interested clients. This is the end of the process.

Other Examples

In one example, the conference account owner has additional options to control access to a scheduled conference. These additional options may be associated with various different account levels, based on pricing or some other factor. One additional option is called Open Seating. This option allows additional participants into the conference beyond the number set by the conference owner. The acceptance of additional participants using this option may depend on available conference center seating as well as available funds in the owner's account.

Another option is called PrePay Boost. This feature is designed to allow the owner to expand the number of seats in a scheduled conference beyond the maximum number contracted for, based on available funds in his account and conference center seating. This differs from Open Seating because seats are guaranteed, rather than being dependent on available seating, such as in the case where the conference center is full from many other ongoing conferences. The advantage of Open Seating, however, is that the owner only has to pay for seats actually occupied. For PrePay Boost, the seats are paid for and guaranteed even if not used in the conference.

Another option is called Box Office. This feature allows the owner to set a price for attending the conference. The price is extracted from the participant using e-commerce in a manner that is well understood by one of ordinary skill in the art. The received funds or a portion thereof may be deposited in the owners account. A percentage of the funds may be taken out for the service provided.

Another option is Registration Options. Here, the owner may specify what information he requires from participants, such as email, phone, or address. The email address may be validated before allowing the participant into the conference by sending a validation email, where the participant must click on a link to validate the email. Phone and address may also be validated, based on the participant's name, which also may be required. This feature allows the conference owner to collect verified information about the participants for other uses, such as marketing.

Another option is to relate a package of documents and/or presentations to a conference. A package contains one or more documents or presentations. The documents are then made available for participants to download to their computer, either before, during, or after the conference. If presentations are included in the package, a conference facilitator may launch the presentation system using a control, such as a button in the settings panel. This action may generate a visible icon in the participants graphical user interface, informing them that a presentation is available for viewing. The participant may click on this icon to launch a local copy of the presentation. Alternatively, when a facilitator launches the presentation system, the presentation window or panel is opened for all participants automatically. Facilitators have controls in their presentation window, such as presentation selector, slide selector, first slide, last slide, previous slide, and next slide. The non-facilitator participants see only a slide number and title of the presentation in place of the facilitator controls. Other controls may be included for both facilitators and non-facilitators, such as window sizing controls and window closing controls.

Another option a facilitator may have is the ability to modify the bandwidth of the video/audio streams for all participants. This is useful if one or more of the participants have insufficient internet bandwidth to handle the video/audio stream. This option is controlled by a control, such as a radio selector in the settings panel.

Another option is called Secure Meeting. This option is useful for meetings where there is concern of someone intercepting the video streams and recording or listening to the conversation. If this option is selected, all audio/video streams are encrypted using mechanisms that are well understood by one of ordinary skill in the art.

SUMMARY

The present disclosure has been described above with reference to one example. Much of the description centers around the use of a keyboard and mouse, but other examples, such as touch-screen-based tablets and smartphones are also envisioned, where gestures or touches are used rather than mouse clicks and typing. These and other examples will be apparent to those skilled in the art in light of this disclosure. For example, the present disclosure may readily be implemented using configurations other than those described in the one example above, such as using fixed hard-wired connections via a switched network rather than the Internet. Additionally, the present disclosure may effectively be used in conjunction with systems other than the one described above. Therefore, those and other variations upon the various examples are intended to be covered by the present disclosure, which is limited only by the appended claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A video teleconferencing method comprising:
generating a facilitator user interface on a display associated with a facilitator user device comprising a plurality of participant icons corresponding to a plurality of participant user devices for a conference, wherein each of the plurality of participant icons is a single combined icon indicating a participant type and a participant status;
forming a plurality of subgroups comprising a first subgroup of the plurality of participant user devices and a second subgroup of the plurality of participant user devices;
generating a participant user interface on each screen display associated with the first subgroup and the second subgroup for controlling interaction with a respective subgroup;
linking each participant user device within the first subgroup with a first video stream; and
linking each participant user device within the second subgroup with a second video stream.

2. The video teleconferencing method as recited in claim 1 further comprising controlling a first size of the first subgroup and a second size of the second subgroup from the facilitator user interface.

3. The video teleconferencing method as recited in claim 1 further comprising controlling a participant user device composition of the first subgroup and the second subgroup from the facilitator user interface.

4. The video teleconferencing method as recited in claim 1 further comprising communicating a message to each of the plurality of subgroups through the facilitator user interface.

5. The video teleconferencing method as recited in claim 1 further comprising communicating a message to each of the participant user devices of the plurality of subgroups through the facilitator user interface.

6. The video teleconferencing method as recited in claim 1 wherein forming the plurality of subgroups comprises randomly forming the plurality of subgroups.

7. The video teleconferencing method as recited in claim 1 wherein forming the plurality of subgroups comprises forming the first subgroup by comparing a first profile to characteristics associated with the plurality of participant user devices and forming the second subgroup by comparing a second profile to characteristics associated with the plurality of participant user devices.

8. The video teleconferencing method as recited in claim 1 wherein the plurality of subgroups are formed for a predetermined time and thereafter a third subgroup and fourth subgroup is formed from the participant user devices of the conference.

9. The video teleconferencing method as recited in claim 1 further comprising sequentially accessing the first subgroup and the second subgroup from the facilitator user interface so that the facilitator user device first participates in the first subgroup and, thereafter participates in the second subgroup.

10. The video teleconferencing method as recited in claim 1 further comprising controlling the first subgroup from the facilitator user interface and relinquishing controlling the first subgroup to a first participant user device after the facilitator user device exits the first subgroup.

11. The video teleconferencing method as recited in claim 1 further comprising controlling a subgroup from a first participant user device in the first subgroup.

12. The video teleconferencing method as recited in claim 11 further comprising removing the first participant user device from controlling the first subgroup with an action from a second participant user device of the first subgroup and a third participant user device of the first subgroup.

13. The video teleconferencing method as recited in claim 12 further comprising removing the first participant user device from controlling the subgroup with the facilitator user device.

14. The video teleconferencing method as recited in claim 1 wherein forming a plurality of subgroups comprises forming a plurality of dyads.

15. The video teleconferencing method as recited in claim 14 wherein forming a plurality of dyads comprises forming the plurality of dyads in a mill.

16. The video teleconferencing method as recited in claim 15 further comprising controlling the mill to randomly form dyads.

17. The video teleconferencing method as recited in claim 16 wherein controlling the mill comprises controlling the mill to form dyads based on participant user device compatibility.

18. The video teleconferencing method as recited in claim 14 wherein forming a plurality of dyads comprises forming a first dyad from a first participant user device and a second participant user device, and dissolving the dyad by control of either the first participant user device, the second participant user device or both.

19. The video teleconferencing method as recited in claim 1 wherein the participant type is one a text, audio, video, or facilitator.

20. The video teleconferencing method as recited in claim 1 wherein participant status is one present, hand raised, text message pending, or speaking.

* * * * *